(12) United States Patent
Possee et al.

(10) Patent No.: US 12,461,263 B2
(45) Date of Patent: Nov. 4, 2025

(54) GRAPH BASED MULTI-SURVEY HORIZON OPTIMIZATION

(71) Applicant: Landmark Graphics Corporation, Houston, TX (US)

(72) Inventors: Daniel James Possee, Southampton (GB); Graham Baines, Abingdon (GB)

(73) Assignee: Landmark Graphics Corporation, Houston, TX (US)

( * ) Notice: Subject to any disclaimer, the term of this patent is extended or adjusted under 35 U.S.C. 154(b) by 474 days.

(21) Appl. No.: 17/950,995

(22) Filed: Sep. 22, 2022

(65) Prior Publication Data

US 2024/0103192 A1   Mar. 28, 2024

(51) Int. Cl.
   *G01V 1/30*   (2006.01)
(52) U.S. Cl.
   CPC ...... *G01V 1/302* (2013.01); *G01V 2210/6161* (2013.01); *G01V 2210/643* (2013.01)
(58) Field of Classification Search
   CPC ........... G01V 1/302; G01V 2210/6161; G01V 2210/643
   See application file for complete search history.

(56) References Cited

U.S. PATENT DOCUMENTS

| | | | |
|---|---|---|---|
| 6,138,076 A | 10/2000 | Graf et al. | |
| 6,757,615 B2 | 6/2004 | Zauderer et al. | |
| 7,283,911 B2 | 10/2007 | Fitzsimmons et al. | |
| 7,523,024 B2 | 4/2009 | Endres et al. | |
| 8,213,261 B2 | 7/2012 | Imhof et al. | |
| 8,566,069 B2 | 10/2013 | Pauget et al. | |
| 9,759,826 B2 | 9/2017 | Mallet | |
| 9,817,142 B2 | 11/2017 | Bornhurst et al. | |
| 9,869,783 B2 | 1/2018 | Jin et al. | |
| 10,215,868 B2 | 2/2019 | Nguyen et al. | |
| 10,339,709 B1 | 7/2019 | Mallet et al. | |
| 2003/0158669 A1 | 8/2003 | Davidson | |
| 2006/0253759 A1* | 11/2006 | Wei | G01V 1/282 714/738 |
| 2008/0015784 A1 | 1/2008 | Dorn et al. | |
| 2010/0214870 A1 | 8/2010 | Pepper et al. | |
| 2011/0118985 A1 | 5/2011 | Aarre | |
| 2011/0307178 A1 | 12/2011 | Hoekstra | |

(Continued)

FOREIGN PATENT DOCUMENTS

| | | |
|---|---|---|
| GB | 2592203 | 8/2021 |
| KR | 20200075727 | 6/2020 |

(Continued)

OTHER PUBLICATIONS

"U.S. Appl. No. 17/951,250 Final Office Action", Jun. 18, 2025. 29 pages (Year: 2025).*

(Continued)

*Primary Examiner* — Mi'schita' Henson
(74) *Attorney, Agent, or Firm* — DeLizio, Peacock, Lewin & Guerra LLP

(57) ABSTRACT

A method for processing seismic data by a seismic data system. The method comprises acquiring a plurality of first traces each corresponding to a respective first trace location. The method comprises expressing the first traces as first vertices in a first graph in which first edges connect the first vertices, wherein the first edges indicate positioning of the first vertices.

18 Claims, 30 Drawing Sheets

(56) References Cited

U.S. PATENT DOCUMENTS

| | | |
|---|---|---|
| 2013/0235697 A1 | 9/2013 | Szydlik et al. |
| 2015/0066460 A1 | 3/2015 | Klinger et al. |
| 2015/0103623 A1 | 4/2015 | Gersztenkorn |
| 2015/0293260 A1 | 10/2015 | Ghayour et al. |
| 2016/0124117 A1 | 5/2016 | Huang et al. |
| 2017/0242141 A1 | 8/2017 | Cotton et al. |
| 2019/0243017 A1 | 8/2019 | Klinger |
| 2019/0302309 A1 | 10/2019 | Li et al. |
| 2020/0166664 A1 | 5/2020 | Bin Gubair et al. |
| 2022/0091292 A1* | 3/2022 | Nguyen ................. G01V 1/307 |
| 2023/0085023 A1 | 3/2023 | Possee et al. |
| 2023/0161061 A1* | 5/2023 | Denli ....................... G01V 1/30 702/14 |
| 2024/0111067 A1 | 4/2024 | Possee et al. |

FOREIGN PATENT DOCUMENTS

| | | |
|---|---|---|
| WO | 2018065684 | 4/2018 |
| WO | 2023042476 | 3/2023 |
| WO | 2024063803 | 3/2024 |
| WO | 2024064424 | 3/2024 |

OTHER PUBLICATIONS

"PCT Application No. PCT/US2021/071473, International Preliminary Report on Patentability", Mar. 28, 2024, 5 pages.

"U.S. Appl. No. 17/951,250, Non-Final Office Action", Jun. 6, 2024, 17 pages.

"PCT Application No. PCT/US2022/077032, International Search Report and Written Opinion", Jun. 9, 2023, 10 pages.

"PCT Application No. PCT/US2023/065971, International Search Report and Written Opinion", Jul. 27, 2023, 10 pages.

"U.S. Appl. No. 17/447,604, Final Office Action", Dec. 21, 2022, 13 pages.

Wang, et al., "3D Seismic Horizon Extraction with Horizon Patch Constraints", Paper presented at the 2015 SEG Annual Meeting, New Orleans, Louisiana, Oct. 2015, Oct. 18, 2015, 5 pages.

"PCT Application No. PCT/US2021/071473, International Search Report and Written Opinion", Jun. 14, 2022, 8 pages.

"U.S. Appl. No. 17/447,604, Non-Final Office Action", Sep. 6, 2022, 11 pages.

Branch, et al., "A Subspace, Interior, and Conjugate Gradient Method for Large-Scale Bound-Constrained Minimization Problems", SIAM Journal on Scientific Computing, vol. 21, 23 pages, 1999.

Ferreira, et al., "Seismic Graph Analysis to Aid Seismic Interpretation", Interpretation, vol. 7, Issue 3, May 28, 2019, 12 pages.

Hale, "Dynamic Warping of Seismic Images", Geophysics, vol. 78, Issue 2, Mar. 1, 2013, pp. 233-244.

Hale, "Methods to Compute Fault Images, Extract Fault Surfaces, and Estimate Fault Throws From 3D Seismic Images", Geophysics, vol. 78, Issue 2, Mar.-Apr. 2013, pp. O33-O43.

Höllt, et al., "Interactive Seismic Interpretation with Piecewise Global Energy Minimization", 2011 IEEE Pacific Visualization Symposium, Hong Kong, Mar. 4, 2011, 8 pages.

Kidd, "Fundamentals of 3D Seismic Volume Visualization", Offshore Technology Conference, Houston, TX, May 3-6, 1999, 13 pages.

Pauget, et al., "A Global Approach in Seismic Interpretation Based on Cost Function Minimization", SEG Technical Program Expanded Abstracts, 2009, pp. 2592-2596.

Wu, et al., "Horizon vols. with interpreted constraints", Geophysics, vol. 80, No. 2 (Mar.-Apr. 2015), 13 pages.

Wu, et al., "Least-squares horizons with local slopes and multi-grid correlations", Geophysics, vol. 83; Jun. 2018, 15 pages.

"U.S. Appl. No. 17/951,250 Non-Final Office Action", Nov. 7, 2024, 19 pages.

* cited by examiner

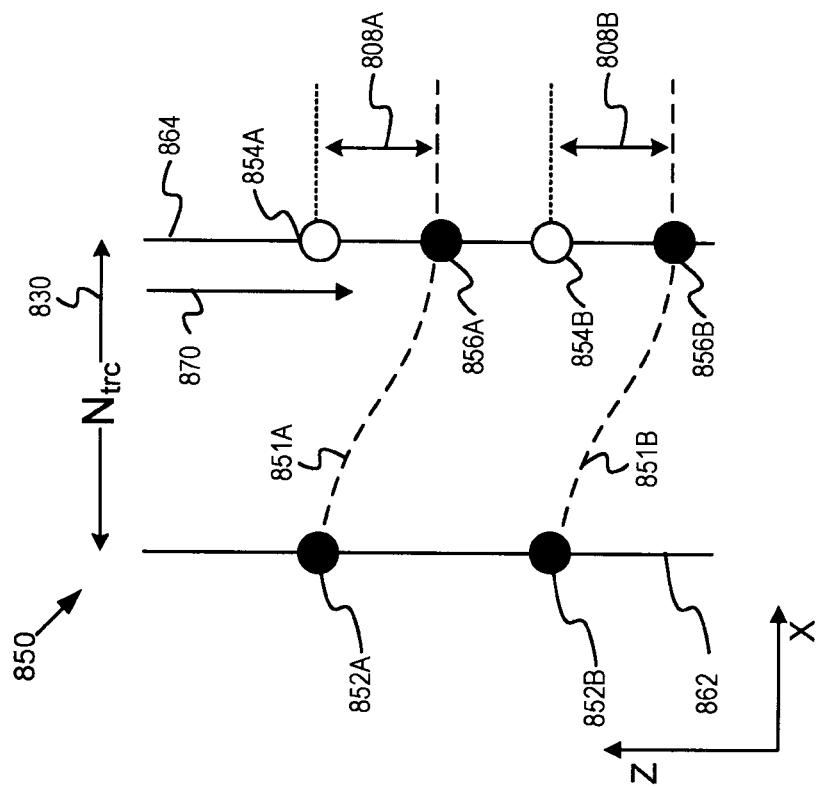
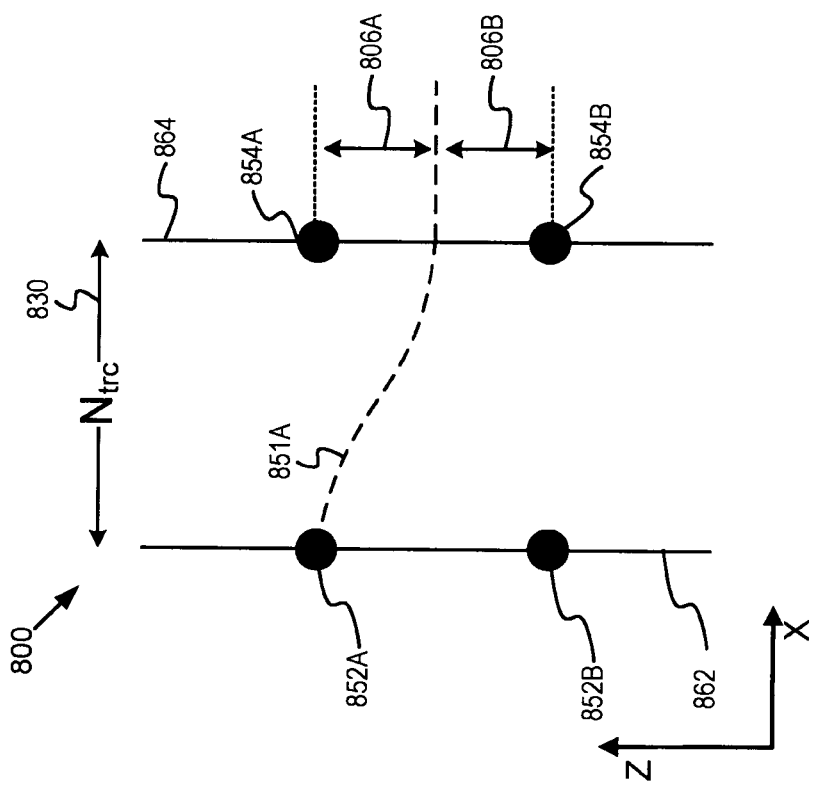
FIG. 8B
FIG. 8A

GRAPH BASED MULTI-SURVEY HORIZON OPTIMIZATION

BACKGROUND

Evaluation of subsurface formations can include locating horizons and faults within such subsurface formations. Identification and interpretation of subsurface layers can aid in geological feature identification (e.g., faults, fans, channels, etc.), geological dating of relative strata, and location and identification of reservoirs.

BRIEF DESCRIPTION OF THE FIGURES

The present invention is illustrated by way of example and not limitation in the Figures of the accompanying drawings in which:

FIGS. 8A and 8B depict example diagrams of dip optimization operations, according to some embodiments.

DESCRIPTION OF THE EMBODIMENTS

Figure 1A:
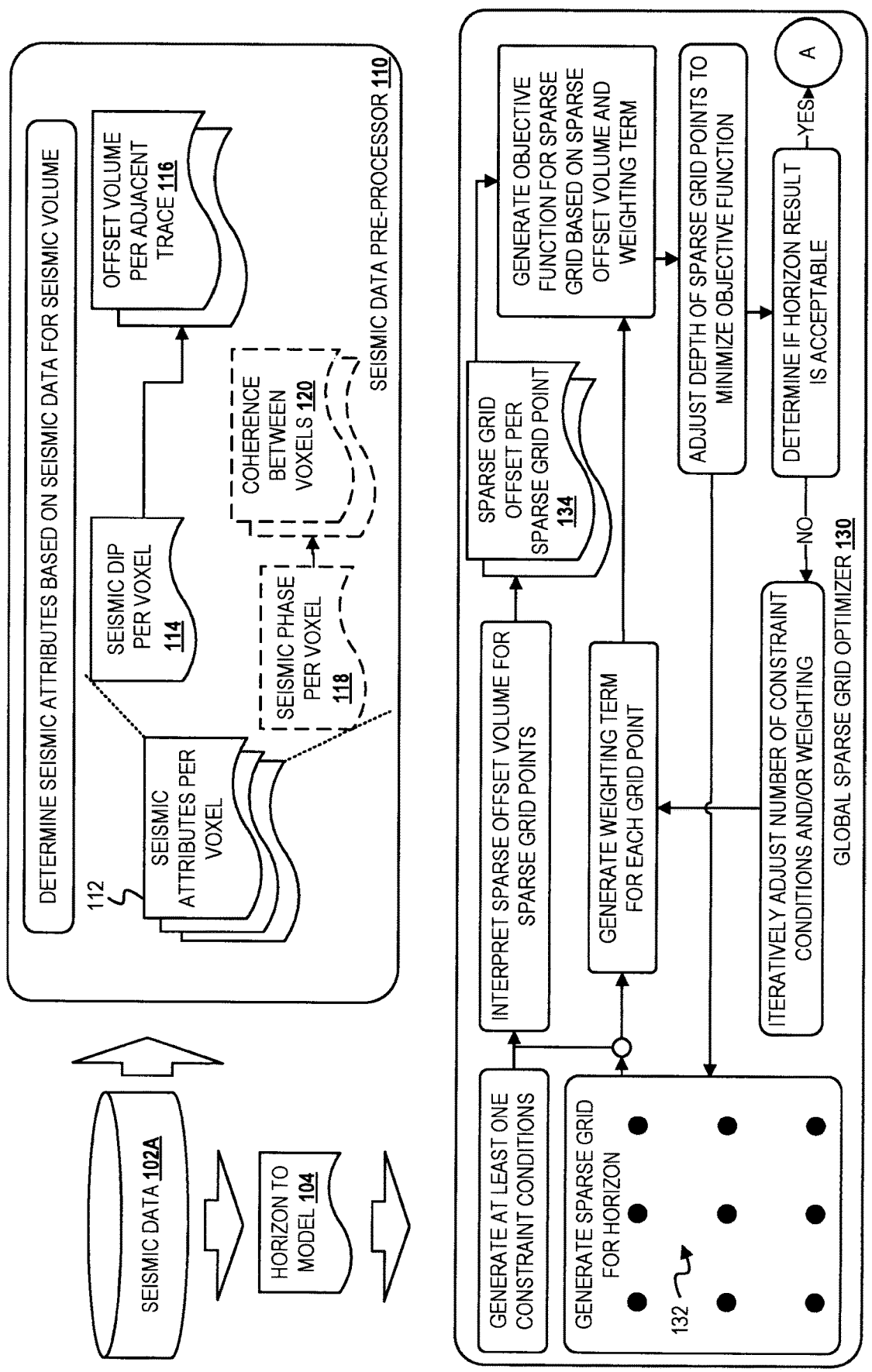
FIGS. 1A-1B depict an example system for seismic horizon mapping with multi-scale optimization, according to some embodiments.

In operations for hydrocarbon recovery, operators may utilize seismic data to evaluate subsurface formations. Based on insights gleaned from the seismic data, operators may perform particular operations for recovering hydrocarbons. Seismic data may represent geological formation layers in a seismic survey (i.e., a space beneath an area of the Earth's surface). Some embodiments of the inventive subject matter provide techniques for representing seismic data in a format unconstrained by geometry of the seismic survey. For example, some embodiments include a computerized seismic data processor that may format seismic data as a graph that includes vertices representing seismic traces and edges representing spatial information about the vertices (e.g., spatial information about the seismic traces relative to the subsurface formation). In some instances, seismic data for a seismic survey may include more than one seismic data set. The seismic data processor may format each seismic data set into graph format. After each seismic data set is represented in the graph format, the seismic data processor may combine two or more graphs into a composite graph representing all the seismic data sets.

In some implementations, the seismic data in graph format may be used to perform a subsurface operations in one or more subsurface formation. For example, a downhole operation may be initiated, modified, or stopped based on the graph-formatted seismic data. Examples of such downhole operations may include completion of the wellbore, updating drilling operations, perforating, fracking, logging operations, additional sampling of the subsurface formation, etc. For instance, the graph-based seismic data may indicate hydrocarbons located at a different location in the subsurface formation than what was originally predicted. Accordingly, subsurface operations may be adjusted to maximize recovery of these hydrocarbons.

Before describing techniques and systems that generate and utilize seismic data in graph format, the disclosure will describe techniques for mapping seismic horizons using seismic data. These techniques and systems for mapping seismic horizons using seismic data relate to FIGS. 1-19. After discussing these techniques and systems with respect to FIGS. 1-19, this disclosure will describe the above-noted techniques for representing seismic data in graph format. Hence, the description of components and operations that may be used in representing seismic data in graph format begins with the discussion of FIG. 20. Despite the organization of this patent application, one of ordinary skill in the art having benefit of this disclosure should recognize that embodiments that generate and utilize seismic data in graph format (e.g., embodiments described with reference to FIGS. 20-27) may be used in concert with any other embodiments in this disclosure (e.g., embodiments described with reference to FIGS. 1-19).

Seismic Horizon Mapping

The description that follows includes example systems, methods, techniques, and program flows that embody embodiments of the disclosure. However, it is understood that this disclosure may be practiced without these specific details. For instance, this disclosure refers to seismic dip in illustrative examples. Embodiments of this disclosure can be also applied to other measures of horizon directionality or gradients. In other instances, well-known instruction instances, protocols, structures, and techniques have not been shown in detail in order not to obfuscate the description.

Example embodiments can be used for formation evaluation for subsurface formations. For example, some embodiments can assist in recovery of hydrocarbons from a subsurface formation in which a wellbore was created. Formation evaluation can include identification of horizons in seismic data of the subsurface formations in order to provide a detailed geologic interpretation of these formations. However, extraction of horizons from such seismic data can be a difficult task. In particular, the overall structure of a horizon in a complex geological environment can be hard to interpret across a seismic volume. As a result, manual extraction of a single horizon in a large three-dimensional dataset can be time-consuming and therefore costly. As workflows (such as in reservoir characterization and stratigraphic studies) advance, there is an increasing need to extract large numbers of seismic horizons from any given dataset. Therefore, methods that can help automatically extract seismic horizon from any given dataset can be extremely valuable.

Example embodiments can include a new global method for seismic horizon interpretation, which can be based on multi-scale grids and constrained linear optimization. Example embodiments can optimize seismic reflector dips to achieve a globally consistent horizon interpretation. In some implementations, horizon interpretation can include three main operations. The first operation can be a pre-processing operation, whereby a dip volume is abstracted onto a sparse global grid. The second operation can include optimizing the horizon interpretation on this sparse global grid. The third operation can include executing local optimizers to return the horizon interpretation to full input resolution.

By separating into these three operations, example embodiments can provide for accurate seismic horizon interpretation while being less computationally intensive (and thus providing faster results) than conventional approaches. As further described below, the first and third operations can be computationally intensive because such operations are processing at the resolution of the seismic data. However (as further described below), the second operation can much less computationally intensive and extremely efficient because less data (a sparse grid) is being processed. For example, in the second operation, every nth trace in the two horizontal directions can be processed (thereby reducing the complexity of the global optimization by $n^2$).

Therefore, n can be scaled in order to ensure the global optimization stage works in seconds, regardless of data size and/or computational power available. Thus, example embodiments can include seismic interpretation that can make changes and add new constraints to the horizon interpretation, while seeing the changes to the global grid in a reduced time. Also, after the global grid has been created, the third operation can be executed to generate a final horizon at full resolution. Thus, example embodiments can include seismic interpretation that focuses on refining the global structure of the horizon interactively in real time and allows the local high-resolution structure to be populated automatically (as described herein).

Thus, example embodiments can map seismic horizons of formations based on multi-scale optimization. For example, example embodiments can determine seismic dip and, optionally, other seismic attributes for each voxel of an acquired seismic volume. Seismic dip can be defined as a measure of the gradients or angle of a reflector or seismic horizon or other feature of the seismic data with respect to the earth's surface. A sparse global grid can then be determined for a selected horizon, where the sparse global grid contains at least one constraint point. Based on the sparse global grid and the seismic dip, a sparse offset dip volume can be determined which accounts for the change in orientation of the seismic horizon across the seismic volume. An objective function for the sparse global grid can then be minimized iteratively over the sparse global grid based on the sparse offset dip volume, where the objective function is a function of the depth at each of the grid points of the sparse global grid, in order to iteratively approximate the seismic horizon at depths throughout the seismic volume. The seismic horizon mapped using the global sparse grid can be used to identify any areas to be further refined and allow adjustment of the sparse global gird, where adjustments of the sparse global grid occur before significant computing power is expended.

Local grids, which account for individual seismic trace data, can be generated based on the sparse global grid. The objective function for the local grid edges, where local grid edges are contained in more than one local grid, can then be minimized iteratively based on the offset (or dip) volume interpreted for adjacent traces. The objective function for each of the local grids can then be minimized iteratively based on the sparse offset dip volume in order to generate the seismic horizon mapped to units as small as individual seismic traces. Various example embodiments also include iterative minimization of the objective function based on an additional seismic attribute, such as seismic phase, seismic coherence, etc., in addition to seismic dip.

Based on a mapped seismic horizon, additional seismic horizons can be mapped with multi-scale optimization. For additional seismic horizons, the depth of the sparse global grid can be constrained by neighboring mapped seismic horizons. The depth of the sparse global grid can also be predicted by using dynamic time warping (DTW) applied, as an additional seismic attribute with seismic dip. DTW can also be used instead of seismic dip to generate a depth offset for points of a grid (e.g., the sparse global grid or a local grid) based on a warping path relationship between various vertical traces of a seismic volume. By mapping a plurality of seismic horizons in a seismic volume, a continuous relative geologic time volume can be produced. For various example embodiments, the uncertainty of the model can also be determined, such as based on a covariance matrix.

As further described below, example embodiments differ from conventional approaches for seismic horizontal mapping because of incorporation of a global interpretation of a seismic horizon (that can include simultaneous assessment of available data to find a best fitting solution for a horizon). In contrast, conventional approaches are limited to performing local tracking outward from a constraint point (or seed point). Such conventional approaches only assess local data and can, therefore, be more susceptible to providing an incorrect or in complete solution.

Thus, example embodiments can allow for efficient and automated extraction of horizons from a seismic volume. In addition, the efficiency of the global optimization stage on a sparse grid allows for a seismic interpretation that can include added constraints and can provide updates in real time or near real time to ensure horizon interpretations are accurate. Also, the decomposed nature of example embodiments can be more scalable than conventional global horizon interpretation approaches, resulting in better performance on larger datasets.

Example System

Figure 1B:
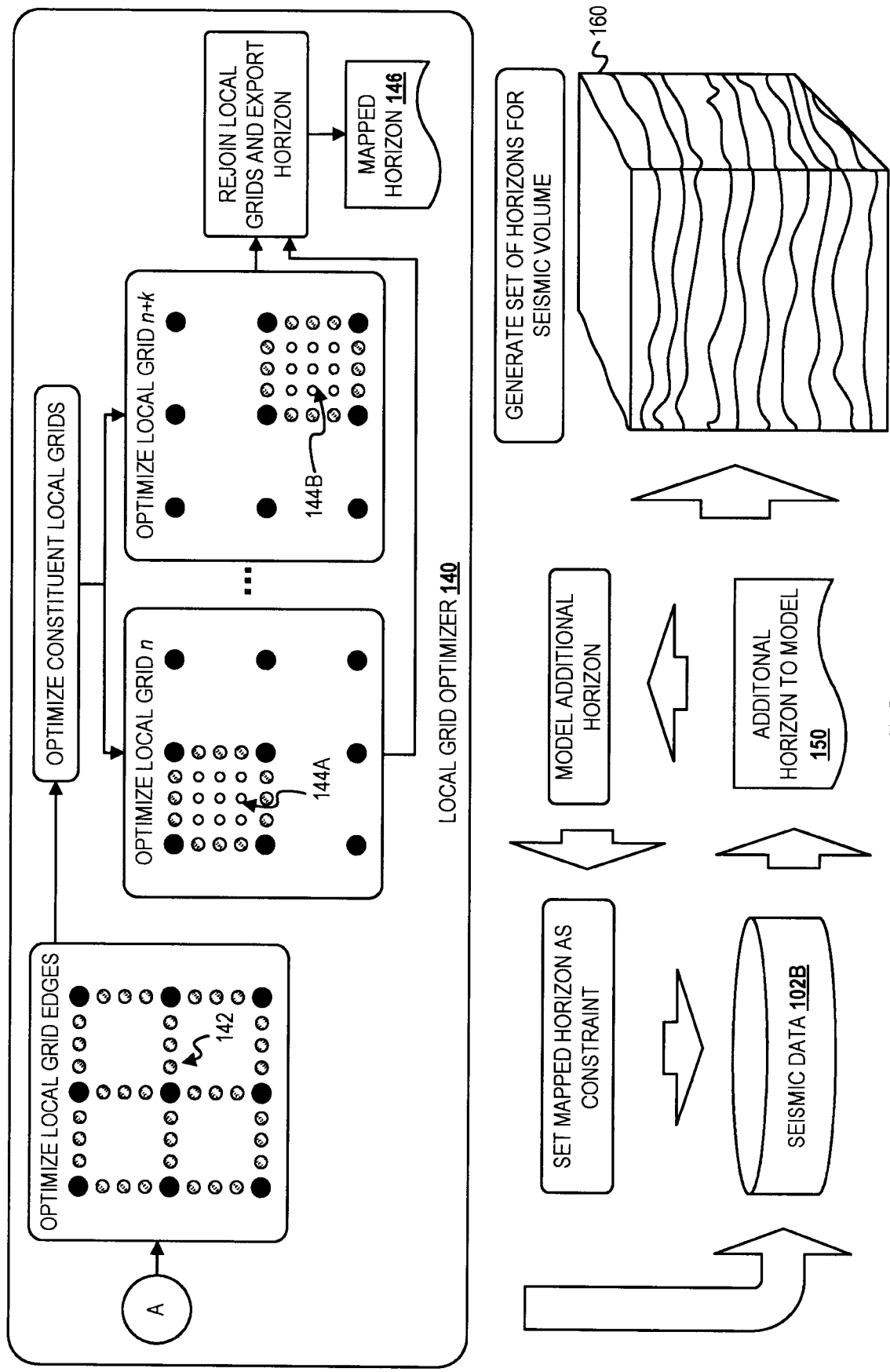

FIGS. 1A-1B depict an example system for seismic horizon mapping with multi-scale optimization, according to some embodiments. FIGS. 1A-1B illustrate a seismic data pre-processor 110, a global sparse grid optimizer 130, and a local grid optimizer 140.

For a set of seismic data 102A (which can be a seismic volume or a set of seismic traces approximating a seismic volume and can include information about seismic phase, seismic frequency, seismic amplitude, etc.), the seismic data pre-processor 110 determines seismic attributes based on the seismic data of the seismic volume. The seismic data pre-processor 110 can determine seismic attributes per voxel 112, where a voxel represents the discrete three-dimensional (3D) elements into which the seismic volume is divided. The seismic attributes per voxel 112 can include seismic dip per voxel, where seismic dip is a measure of the gradient of seismic reflectors corresponding to seismic horizons in the seismic volume and can be calculated using an image tensor or other appropriate method. The total collection of seismic dip per voxel can be referred to as a "dip volume", which is the dip for each voxel of the seismic volume. Based on the seismic dip per voxel 114, an offset volume per adjacent trace 116 can be calculated. The offset volume per adjacent trace 116 is a measure of seismic dip occurring between adjacent traces and a measure of the distance (in one, two or three dimensions) between the adjacent traces for which seismic dip is determined. The offset volume per adjacent trace 116 measures the seismic dip per voxel 114 and accounts for the granularity of the data acquisition (i.e., distance between measurements).

The seismic attributes per voxel 112 can also include measures of a seismic phase per voxel 118 (where seismic phase can include relative phase, such as in relation to the seismic source, absolute phase, etc.). The seismic attributes per voxel 112 can also include a measure of coherence between voxels 120, where the coherence between voxels 120 can be determined for each voxel with respect to each other voxel or can be determined for each voxel with respect to a reference voxel. The coherence between voxels 120 can be determined with respect to phase, amplitude, and/or frequency between the seismic signals of the respective voxels. The seismic attributes per voxel 112 can also include any other appropriate seismic attributes, including fault locations, distance to a fault, etc.

From the seismic data 102A, a horizon to model 104 is selected. The horizon to model 104 (hereinafter the "modeling horizon 104") can be selected from the seismic volume, such as based on intensity of reflection, intensity of amplitude, based on distance from other previously modeled horizons, etc. The global sparse grid optimizer then generates at least one constraint condition and a sparse grid 132 for the modeling horizon 104. The constrain condition can be a constraint point (or seed point), where a constraint point is an identified location of the horizon in the seismic volume. The constraint point is defined by a vector or coordinate in the three-dimensions of the seismic volume (which may be trace number by trace number by time, distance by distance by depth, or any other appropriate seismic volume dimensional scheme). Hereinafter "depth" is used to refer to the third dimension of the seismic volume, which can be physical depth, time, etc. The constraint point is located on the modeling horizon 104 and on the sparse grid 132, and identifies the modeling horizon 104 which has been selected.

The sparse grid 132 is a collection of points in the seismic volume at the approximate depth of the modeling horizon 104. The sparse grid 132 can be generated at the depth of the constraint point, if one constraint point is used, or on a plane between or surface between multiple constraint points, if multiple constraint points are used. The sparse grid 132 is shown as a square grid, but other types of grids can be used including triangular grids, mesh grids (including variable spacing mesh grids), etc. The depth of the points of the sparse grid 132 are adjusted by the sparse grid optimizer 130 to conform with the depth of the seismic horizon within the seismic volume.

The global sparse grid optimizer 130 interprets the offset volume per adjacent trace 166 based on the sparse grid 132 to generate a sparse grid offset per sparse grid point 134. The sparse grid offset per sparse grid point 134 abstracts the values of the offset volume per adjacent trace 116 for the voxels between the grid points of the sparse grid 132 into a single value for each of the grid points of the sparse grid 132. Values of the sparse grid offset per sparse grid point 134 can be contained within a sparse offset volume, where the sparse offset volume is a collection the values of the sparse grid offset per sparse grid point 134 evaluated at the locations of the points of the sparse grid 132 and various depths which make up the seismic volume.

The global sparse grid optimizer 130 also generates a weighting term for each grid point of the sparse global grid 132. The weighting term can include a contribution from a spatial weighting term, a coherence weighting term (e.g., coherence along a given trace, coherence between two points, etc.), a data quality weighting term, a fault proximity weighting term, etc. The spatial weighting term can be a weighting term based on spatial proximity to at least one constraint point.

The global sparse grid optimizer 130 generates an objective function for the sparse grid based on depths of the points of the sparse grid 132, the sparse grid offset per sparse grid point 134, and the weighting term. The global sparse grid optimizer 130 then adjusts depth of the points of the sparse global grid 132 to minimize the objective function. The global sparse grid optimizer 130 can then determine if the seismic horizon map represented by the points of the global sparse grid 132 is acceptable. The global sparse grid optimizer 130 can determine if the seismic horizon map is acceptable based on a number of iterations, a value of the objective function, a value of an error estimate (such as generated by a covariance matrix), etc. If the depths of the points of the global sparse grid 132 are acceptable as a map of the seismic horizon, flow then continues through transition point A to FIG. 1B and operations of the local grid optimizer 140. If the depths of the points of the global sparse grid 132 are not acceptable as a map of the seismic horizon, then the global sparse grid optimizer 130 can iteratively adjust the number of constraint conditions and/or weighting.

The global sparse grid optimizer 130 can add one or more constraint points, prompt an operator or interpreter to generate one or more constraint points, etc. and adjust the global sparse grid 132 based on the additional one or more constraint points. The global sparse grid optimizer 130 can also generate one or more constraint conditions, which can be depth minimums, depth maximums, neighboring seismic horizon map exclusionary zones, etc., for the global sparse grid 132. The global sparse grid optimizer 130 can also adjust the weighting term for each grid point of the sparse global grid 132 or a component of the weighting term. For example, the global sparse grid optimizer 130 can, based on the seismic data 102A or additional seismic attributes or interpretation, identify one or more faults within the seismic volume. The global sparse grid optimizer 130 can then generate or adjust a fault proximity weighting term to decrease contributions to the objective function of the points of the sparse global grid 132 which are within a tolerance distance of a fault. The global sparse grid optimizer 130 can also adjust the number or concentration of the points of the global sparse grid 132. The global sparse grid optimizer 130 then generates the objective function for the sparse grid based on depths of the points of the sparse grid 132, the sparse grid offset per sparse grid point 134, and the weighting term as iteratively adjusted. The global sparse grid optimizer 130 can compute the value of the sparse grid offset per sparse grid point 134 based on the depths of the points of the sparse grid 132. Alternatively, the seismic data preprocessor 110 can generate or pre-compute the sparse grid offset per sparse grid point 134 for each of the locations of the sparse grid 132 and various depths such that values of the sparse offset are stored as the sparse offset volume for multiple possible depths of the points of the sparse grid 132.

The global sparse grid optimizer 130 can then adjust depth of the points of the sparse global grid 132 to minimize the objective function and determine if the seismic horizon map represented by the points of the global sparse grid 132 is acceptable, as previously described.

If the depths of the points of the global sparse grid 132 are acceptable as a map of the seismic horizon, the sparse global grid optimizer 130 outputs the points and depths of the global sparse grid 132 to the local grid optimizer 140. The local grid optimizer 140 can then optimize the map of the seismic horizon points along the points corresponding to local grid edges 142.

The local grid optimizer 140 can generate multiple local grids 144A, 144B and the local grid edges 142. The local grid optimizer 140 can first generate the local grid edges 142 between the points of the global sparse grid 132. For example, the local grid optimizer 140 can generate the local grid edges 142 based on vectors which run between the points of the global sparse grid 132. The local grid optimizer 140 can then populate the local grid edges 142 with grid points to form the multiple local grids 144A, 144B.

Alternatively, the global sparse grid optimizer 130 can populate the sparse global grid with grid points and assign some of the grid points to local grid edges 142 and divide other grid points among the multiple local grids 144A, 144B. For example, the global sparse grid optimizer 130 can generate the multiple local grids 144A, 144B with a grid point separation based on the granularity of the seismic data 102A (i.e., with M points where M is the number of seismic traces) and select N number of points of the one or more local grid 144 as points of the global sparse grid 132 (where N<M). In another example, the global sparse grid optimizer 130 can select every n points of the multiple local grids 144A, 144B as points of the global sparse grid 132. The depths of the points of the local grid edges 142 can be optimized to map the seismic horizon using an objective function minimization, as described in reference to the global sparse grid optimizer 130. The local grid optimizer 140 may add additional constraint conditions during optimization as previously described.

The local grid optimizer 140 can then optimize the map of the seismic horizon points over each of the K local grids, where K is the number of the multiple local grids 144A, 144B which make up the global sparse grid 132. The local grid optimizer 140 can optionally generate the multiple local grids 144A, 144B with variable point spacing, such that a first local grid can contain more points than a second local grid. For example, a local grid which contains a fault can have fewer points or a larger spacing between points than a local grid which does not contain a fault. The depths of the points of the multiple local grids 144A, 144B can be optimized to map the seismic horizon using an objective function minimization, as described in reference to the global sparse grid optimizer 130. The local grid optimizer 140 may add additional constraint conditions during optimization. The local grid optimizer 140 can also optionally operate multiple optimizations in parallel or operate as multiple local grid optimizers 140 in parallel—the local grid optimizer 140 can operate on each of the multiple local grids 144A, 144B separately or concurrently. The local grid optimizer 140 can use distributed computing, parallel processing, concurrent computing, etc. in order to reduce operational time for optimization of the multiple local grids 144A, 144B. The local grid optimizer 140 can rejoin each of the K local grids into a mapped horizon 146, which contain the points and depths of the global sparse grid 132, the local grid edges 142, and the multiple local grids 144A, 144B and is a map of the modeling horizon 104. The mapped horizon 146 can then be exported for interpretation.

The mapped horizon 146 can also be added to or associated with seismic data (i.e., the seismic data 102A) for the seismic volume to generate seismic data 102B, where the seismic data 102B contains information about the mapped horizon 146 and, optionally, other mapped horizons. Based on the seismic data 102B, an additional horizon to model 150 can be selected and modeled. The sparse global grid optimizer 130 can generate additional constraint conditions for the sparse global grid 132 of the additional horizon to model 150 based on the mapped horizon 148. Seismic horizons, which can be assumed to have zero or negligible thickness, correspond to geological depositional features (i.e., sedimentary layers, volcanic events, etc.) and generally occur in the same relative orientation as a function of depth. In rare cases, seismic horizons can be inverted in order and because of the generally stable relationship between seismic horizons, the mapped horizon 146 can be used as a constrain (i.e., upper bound or lower bound) for a neighboring additional horizon to model 150.

Once the additional horizon to model 150 has modeled as a mapped horizon, it too can be added to the seismic data 102B and function as a constraint condition for any further modeling horizons. In such a manner, a set of horizons can be generated for the seismic volume 160. The set of horizons can then be interpreted, together with geological age data, as a map of continuous relative geological time for the seismic volume 160.

Example Operations

Figure 2:
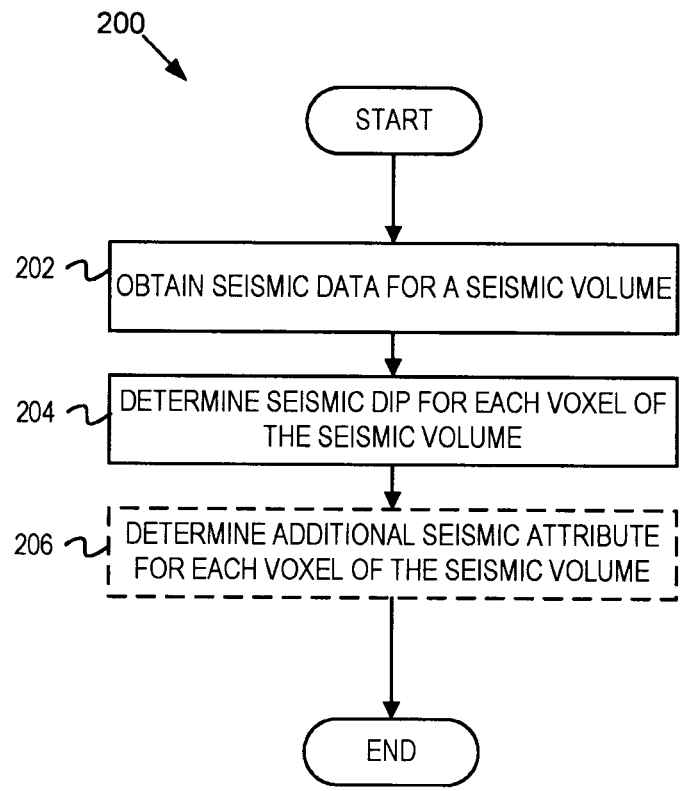
FIG. 2 depicts a flowchart of example operations for seismic data pre-processing, according to some embodiments.
Figure 3:
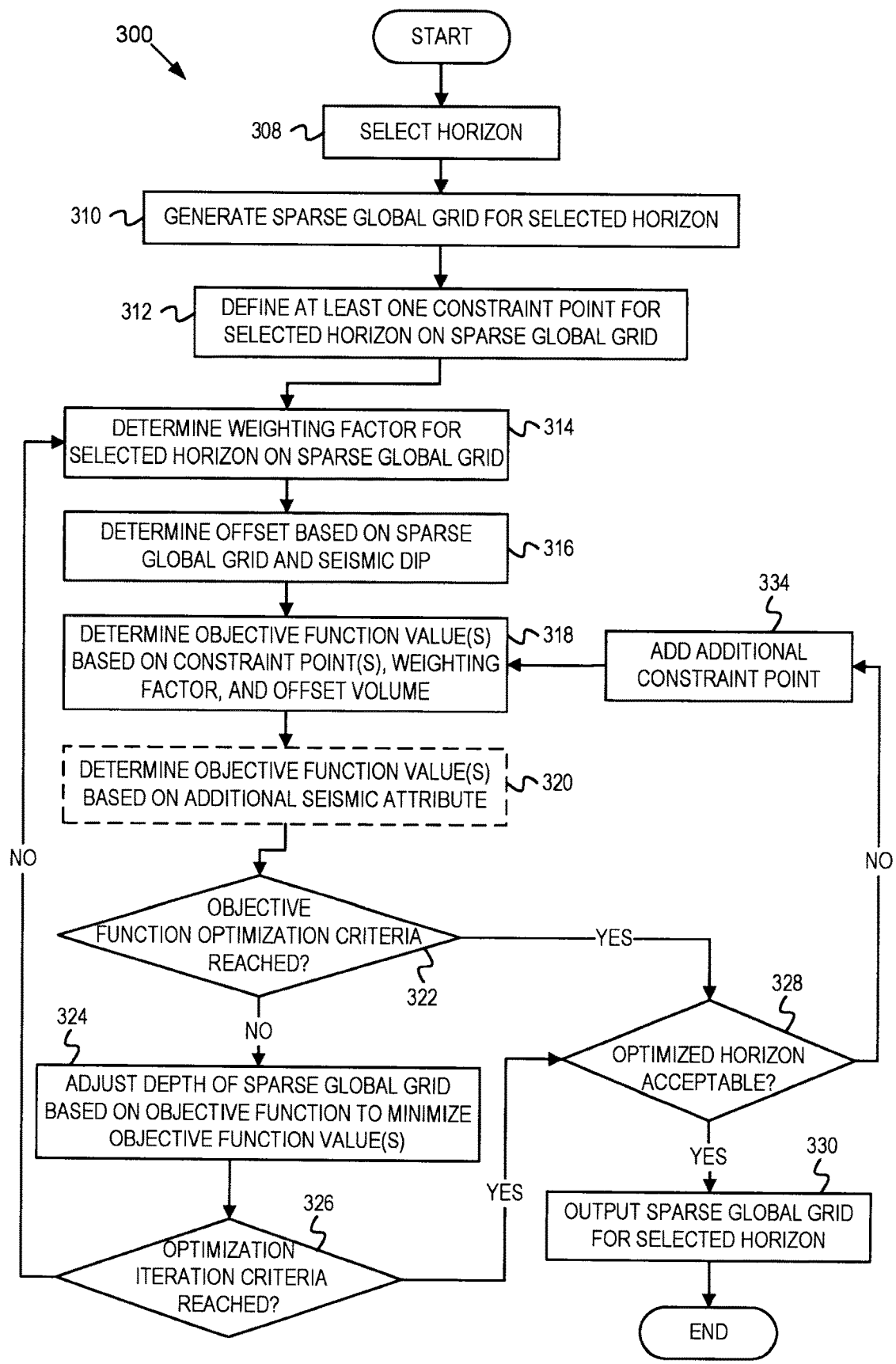
FIG. 3 depicts a flowchart of example operations for optimization of a horizon on a global sparse grid, according to some embodiments.
Figure 4:
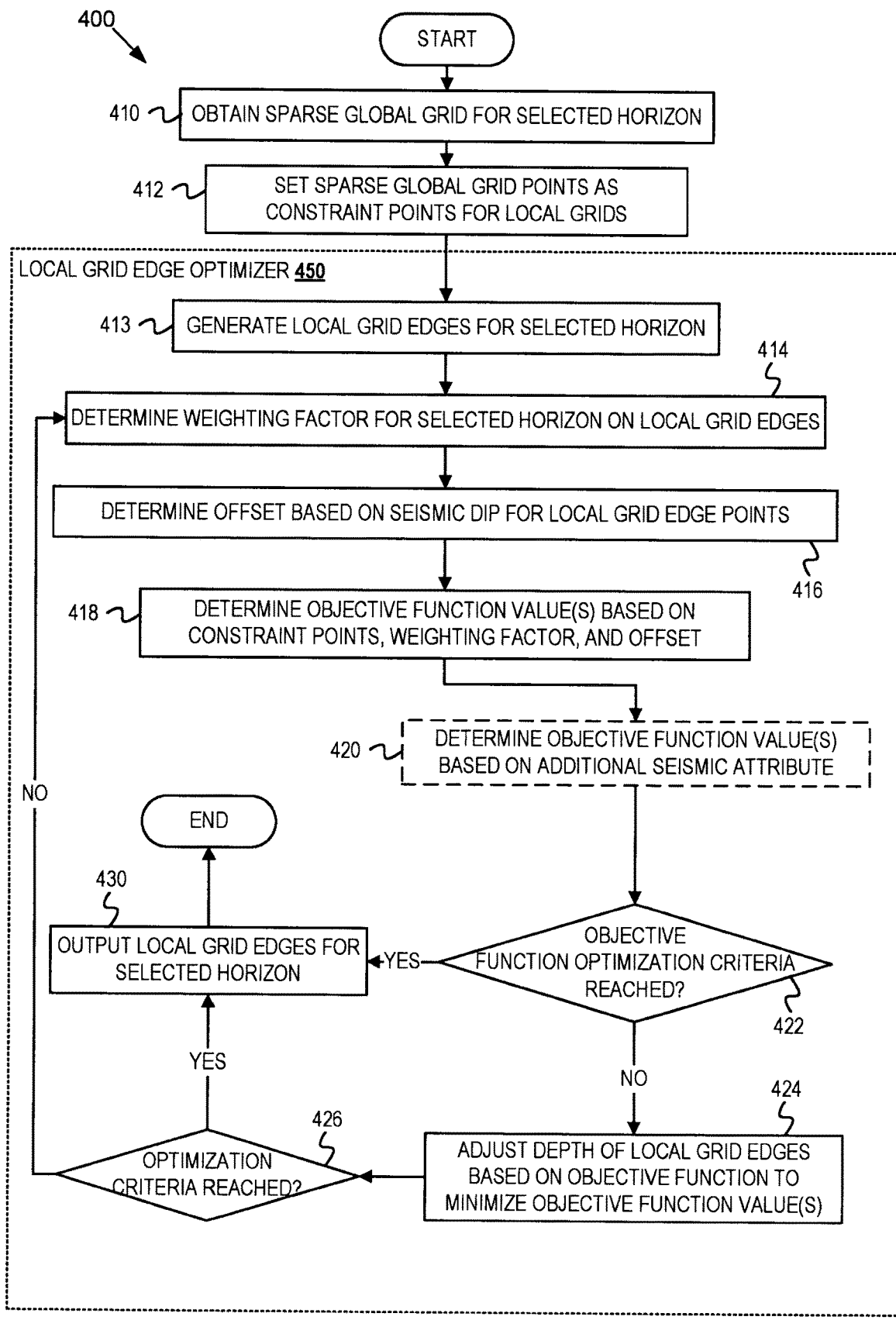
FIG. 4 depicts a flowchart of example operations for optimization of a horizon over edges of local grids, according to some embodiments.

Example operations are now described in reference to FIGS. 2, 3, 4, and 5. FIG. 2 depicts a flowchart of example operations for seismic data pre-processing. FIG. 3 depicts a flowchart of example operations for optimization of a horizon on a global sparse grid. FIG. 4 depicts a flowchart of example operations for optimization of a horizon over edges of local grids and FIG. 5. depicts a flowchart of example operations for optimization of a horizon on a local grid. Additionally, the example operations are described with reference to the example system of FIGS. 1A-1B.

FIG. 2 depicts a flowchart of example operations for seismic data pre-processing, according to some embodiments. A flowchart 200 of FIG. 2 includes operations described as performed by the seismic data pre-processor 110 for consistency with the earlier description. Such operations can be performed by a controller or processor, hardware, firmware, software, or a combination thereof of one or more computers, including asynchronously. However, apparatus component naming, division, organization, and program code naming, organization, and deployment can vary due to arbitrary operating choice, ordering, programmer choice, programming language(s), platform, etc. Additional, operations of the flowchart 200 are described in reference to the seismic data 102A of FIGS. 1A-1B. The flowchart includes the operations described as performed by the seismic data pre-processor 110, but one or more of the operations may instead or additionally be performed by the global sparse grid optimizer 130 or the local grid optimizer 140.

At block 202, seismic data is obtained for a seismic volume. For example, with reference to FIGS. 1A-1B, the seismic data pre-processor 110 can obtain the seismic data for the seismic volume. The seismic data can be a collection of seismic traces collected during a two dimensional (2D) or multiple 2D seismic surveys, during a 3D seismic survey, during a 4D seismic survey, etc. The seismic data can be generated from multiple 2D seismic surveys of either correlated to form a 3D seismic survey. In some embodiments, the seismic volume may be a seismic area. The seismic data can be obtained at multiple receivers or sensors in response to a charge or shot deployed to generate a seismic signal. The seismic data can be obtained along two axes of earth's surface, which may or may not be orthogonal. The seismic volume may not be regularly shaped (i.e., have orthogonal axes) but can be any shape. The seismic data can be obtained for a geological formation unit, which can be a region, reservoir, basin, field, etc. The seismic data can be obtained for a field containing drilling wells, including exploration wells, production wells, injection wells, abandoned wells, etc. The seismic data can be obtained for a subsea geological formation, for example via a seismic vessel.

At block 204, seismic dip for each voxel off the seismic volume is determined. For example, with reference to FIGS. 1A-1B, the seismic data pre-processor 110 determines the seismic dip for each voxel of the seismic volume. The voxel can be the smallest unit of the seismic volume, such as the volume defined by individual seismic traces and a resolution limit of the seismic sensors. The voxel can be defined in an appropriate dimension, such as trace by trace by time, length by length by depth, etc. The voxel can be any appropriate division of the seismic volume or the seismic data for which seismic attributes can be determined.

Seismic dip is a measure of the gradient of seismic reflectors which generate seismic horizons or other features of the seismic volume and can be calculated using an image tensor or other appropriate method. The seismic dip can be calculated using an image structure tensor, which can be determined using any appropriate equation such as Equation 1, below:

$$T(x) = \begin{bmatrix} \langle g_1(x)g_1(x) \rangle & \langle g_1(x)g_2(x) \rangle \\ \langle g_1(x)g_2(x) \rangle & \langle g_2(x)g_2(x) \rangle \end{bmatrix} \quad (1)$$

where $g_1(x)$ and $g_1(x)$ represent the horizontal components of the image gradient $g_1(x)$ in each of the horizontal directions, and the brackets <•> represent a two-dimensional (2D) smoothing of each component of the structure tensor field, such as a Gaussian filter. Seismic dip can be calculated for each voxel of the seismic volume.

At block 206, optionally an additional seismic attribute is determined for each voxel of the seismic volume. For example, with reference to FIGS. 1A-1B, the seismic data pre-processor 110 determines the additional seismic attribute for each voxel of the seismic volume. The seismic data pre-processor 110 can determine one or more additional seismic attribute, such as coherence, relative coherence, phase, relative phase, intensity, relative intensity, etc. using any appropriate method. The seismic data pre-processor 110 can also obtain one or more additional seismic attribute from another source, such as a fault map, or based on a comparison of the data of the seismic volume to a reference point or other seismic data. For example, the seismic data pre-processor 110 can compare the phase of the seismic signal at each voxel to the seismic signal of its nearest neighbors to determine a signal to noise or coherence ratio. The seismic data pre-processor 110 can also compare the amplitude of the seismic signal at each voxel to the amplitude of the seismic source to determine a strength of the seismic reflector.

FIG. 3 depicts a flowchart of example operations for optimization of a horizon on a global sparse grid, according to some embodiments. A flowchart 300 of FIG. 3 includes operations described as performed by the global sparse grid optimizer 130 for consistency with the earlier description. Such operations can be performed by a controller or processor, hardware, firmware, software, or a combination thereof of one or more computers, including asynchronously. However, apparatus component naming, division, organization, and program code naming, organization, and deployment can vary due to arbitrary operating choice, ordering, programmer choice, programming language(s), platform, etc. Additional, operations of the flowchart 300 are described in reference to the seismic data 102A, modeling horizon 104, and seismic data pre-processor 110 of FIGS. 1A-1B. The flowchart includes the operations described as performed by the global sparse grid optimizer 130, but one or more of the operations may instead or additionally be performed by the seismic data pre-processor 110 or the local grid optimizer 140.

At block 308, a horizon is selected. For example, with reference to FIGS. 1A-1B, the global sparse grid optimizer 130 can select a horizon. the global sparse grid optimizer 130 can select a horizon based on operator input, such as based on an operator identified constraint point, seed point, starting point, etc. The global sparse grid optimizer 130 can select a horizon based on previously mapped horizons—i.e., the global sparse grid optimizer 130 can proceed through a seismic volume selecting horizons as a function of depth (where depth can also correspond to geological age). The global sparse grid optimizer 130 can select a horizon based on relative strength or coherence of the horizon as compared to other horizons of the seismic volume.

At block 310, a sparse global grid is generated for the selected horizon. For example, with reference to FIGS. 1A-1, the global sparse grid optimizer 130 can generate the sparse global grid for the selected horizon. The global sparse grid optimizer 130 can generate the sparse global grid based on the voxels of the seismic data—for example as generating a grid point for the sparse global grid every n voxels, where n is greater than one. In example embodiments, n may be five (5) or six (6), but n can be these or any other appropriate value. As the objective function is a set of linear equations in N variables, where Nis the number of grid points (for a volume of dimensions of m by m where N=m$^2$), solving for the objective function involves a set of N=m$^2$ equation. Complexity of a minimization of the objective function is reduced as the number of points over which the minimization is performed are reduced. For a value of n, the complexity of the minimization of the objective function is reduced by a factor of n$^2$, where the number of equations are now $$\frac{m}{n} * \frac{m}{n} = \frac{m^2}{n^2} = \frac{N}{m^2}.$$

The global sparse grid optimizer 130 can therefore select an n which is large enough to simplify the minimization of the objective function while still including features of the selected horizon within the global sparse grid.

The global sparse grid optimizer 130 can generate the sparse global grid at a depth in the seismic volume, such that each point on the grid has the same depth or a depth defined by a constraint point or constraint surface. The global sparse grid optimizer 130 can generate the sparse global grid in two dimensions, such that a depth is added to the sparse global grid once a constraint point is selected.

The global sparse grid optimizer 130 can also generate a sparse offset volume based on the sparse global grid. Once the grid points of the sparse global grid are determined in the horizontal directions, sparse offset values can be determined for the grid points at the depths in the seismic volume. The sparse offset volume can then be generated which contains the sparse offsets for the locations of the grid points of the sparse global grid and each depth the grip points can occupy.

At block 312, at least one constraint point for the selected horizon is defined on the sparse global grid. For example, with reference to FIGS. 1A-1B, the global sparse grid optimizer 130 can define the at least one constraint point for the selected horizon on the sparse global grid. The global sparse grid optimizer 130 can select the constraint point based on the selected horizon. Optionally, at least one constraint point can be selected, and the horizon selected by virtue of selecting the at least one constraint point—i.e., the constraint point is within the selected horizon so selecting a constraint point can select a horizon by default. The global sparse grid optimizer 130 can define the at least one constraint point based on a previously mapped horizon, where the at least one constraint point can be a constraint plane or upper and lower bound for depths of the sparse global grid. The global sparse grid optimizer 130 can define a constraint point based on operator input or manual identification. In some embodiments, the global sparse grid optimizer 130 can define a depth or set of depths for the sparse global grid based on the selected at least one constraint point.

At block 314, a weighting factor is determined for the selected horizon on the sparse global grid. For example, with reference to FIGS. 1A-1B, the global sparse grid optimizer 130 can determine the weighting factor for the selected horizon on the sparse global grid. The global sparse grid optimizer 130 can determine a weighting factor or a combined weighting factor based on one or more of individual weighting factors—i.e., spatial weighting factors, discontinuity weighting factor, a seismic attribute weighting factor (such as a coherence weighting factor, a phase weighting factor, etc.), signal to noise weighting factor, etc. The global sparse grid optimizer 130 can determine weighting factors for the sparse global grid based on additional information or information not contained within the seismic data or the seismic volume, such as manually identified faults or folds. The global sparse grid optimizer 130 can determine the weighting factors based on the depths of the points of the sparse global grid, and can then update or recalculate the weighting factors if the depths of the points of the sparse global grid are changed or updated.

A spatial weighting factor can be introduced to increase the influence of values of the objective function for grid points proximate to a constraint point versus values of the objective function for grid points distant from the one or more constraint point. The spatial weighting term can be calculated for each grid point using Equation 2, below:

$$W_{i,j} = \max\left\{ \begin{array}{c} 0.5 \\ \exp\left[-\frac{d(S, P_{i,j})}{2\beta^2}\right] \end{array} \right. \qquad (2)$$

where $W_{i,j}$ is the spatial weighting term, 0.5 is the minimum spatial weighting term, $d(S, W_{i,j})$ is the Euclidean distance between the nearest constraint point (or seed point S) and a grid point P at (i,j), and β is distance weighting factor for a distance distribution, which can be a Gaussian or normal distribution, which adjusts the size of the weighting factor for a given distance between a point and the nearest constraint point.

Additional weighting factors can be determined based on other additional seismic attributes, such as phase, coherence, etc. A fault weighting factor can be generated in a similar manner to the spatial weighting factor of Eq. 2, where sparse grid points near a fault line or other discontinuity (such as within a threshold distance) can be down weighted in the optimization.

At block 316, a sparse offset is determined based on the sparse global grid and the seismic dip. For example, with reference to FIGS. 1A-1B, the global sparse grid optimizer 130 can determine the sparse offset based on the sparse offset volume, which has values based on the sparse global grid and the seismic dip. For example, the global sparse grid optimizer 130 can look up values from the sparse offset volume for the depths of the points of the sparse global grid. The sparse offset volume describes the structure of the seismic data (e.g., the seismic dip) between two adjacent points (or traces) on the sparse global grid. The sparse offset volume is a determined by the seismic dip between each of the points (e.g., the traces of the seismic volume or the grid points of the local grid) on the sparse global grid and is therefore an estimate of the amount of change in depth between the points of the sparse global grid. Alternatively, the global sparse grid optimizer 130 can determine the sparse offset values for each of the points of the sparse global grid based on their depths. The global sparse grid optimizer 130 calculate the sparse offset based on the seismic dip determined by the seismic data pre-processor 110.

The relationship between depth of the horizon at adjacent grid points (which may be sparse grid points or local grid points) is given by Equation 3, below:

$$x_i + d_i = x_{i+1} \quad (3)$$

where $x_i$ represents the depth of the horizon at point i, $x_{i+1}$ represents the depth of the horizon at point i+1, and $d_i$ represents the vertical offset between points i and i+1. The depth $x_i$ can be determined based on manual interpretation of the horizon, but such a method can be financially costly and resource intensive. The depth $x_i$ can be estimated based on seismic dip of the horizon for the local grid, and based on the sparse offset volume for the sparse global grid.

The difference between the depth at the point $x_i$ and at the point $x_{i+1}$ can be estimated using the seismic dip evaluated over the distance between the point $x_i$ and the point $x_{i+1}$. A dip offset volume can be measured where the dip offset is the difference between the depth estimate for the point $x_{i+1}$ and the depth of the point $x_{i+1}$ over the distance between the point $x_i$ and the point $x_{i+1}$. The sparse offset volume is the dip offset volume evaluated for the sparse global grid points. By adjusting the locations of various points $x_i$ of the global grid to minimize the sparse offset volume—i.e., by adjusting the locations of the points $x_i$ to lie at the depth of the horizon—a horizon can be located or optimized for.

At block 318, an objective function value(s) is determined based on the constraint point(s), the weighting factor, and the offset volume. For example, with reference to FIGS. 1A-1B, the global sparse grid optimizer 130 can determine the objective function value(s) based on the constraint point(s), the weighting factor, and the offset volume. The global sparse grid optimizer 130 can determine the objective function based on any appropriate method, such as the one described below.

The horizon optimization is then given by a minimization of the total offset as given by the objective function of Equation 4, below:

$$f = \frac{1}{N} \sum_{i=0}^{N_i-1} \sum_{j=0}^{N_j-1} W_{i,j} \left[ (X_{i,j} + DI_{i,j} - X_{i,j+1})^2 + (X_{i,j} + DJ_{i,j} - X_{i+1,j})^2 \right] \quad (4)$$

where $f$ is the objective function to be minimized, N is the total number of points over which the minimization is to be determined, $N_i$ and $N_j$ are the number of points in each of the horizontal directions, $X_{i,j}$ is the horizon depth at grid point (i, j), $DI_{i,j}$ and $DJ_{i,j}$ are the vertical offset estimated from calculated dip in each of the horizontal directions, and $W_{i,j}$ is the combined weighting term for each point on the grid.

The optimization problem can then be solved for a horizon using a generalized linear matrix equation such as Equation 5, below:

$$WAx = WB \quad (5)$$

where A is the coefficient matrix of size (2N+M, N) where N is the number of points on the grid and M is the number of constraint points and x is the (N, 1) matrix containing depths $X_{i,j}$ of horizon at the N points on the grid. B is the (2N+M, 1) matrix containing the dependent variables (i.e., the reflection dip value of the current iteration) and W is the diagonal weighting matrix of size (2N+M, 2N+M) which contains the combined weighting terms—i.e., fault weighting, spatial weighting, other seismic attribute weighting, etc.

The objective function of Eq. 4 can then be written as Equation 6, below:

$$f = \|WB - WA\,x\|^2 \quad (6)$$

using the matrices of Eq. 5.

To solve for a single solution, at least one constraint point is required. The total number of constraint points is given by the number M, where additional constraint points can refine the solution but also increase the complexity of computation—as seen in the sizes of the matrices defined in relationship to Eq. 5. For each constraint point, the horizon is identified at a grid point with location (i, j) and constrained to that depth as given by Equation 7, below:

$$X_{i,j} = \text{Depth}_{i,j} \quad (7)$$

This relationship forces or pins the horizon solution to intersect with the constraint points at the constrained depth.

At block 320, optionally, the objective function value(s) is determined based on an additional seismic attribute. For example, with reference to FIGS. 1A-1B, the global sparse grid optimizer 130 can determine the objective function value(s) based on the additional seismic attribute. The global sparse grid optimizer 130 can include an additional seismic attribute, such as the one or more additional seismic attributes determined by the seismic data pre-processor 110 at block 206 of FIG. 2. In some embodiments, the global sparse grid optimizer 130 can determine an additional seismic attribute in any other appropriate manner. The global sparse grid optimizer 130 can adjust the objective function value(s) based on the additional seismic attribute in any appropriate manner, such as those described below.

Eqs. 4 and 6 describe using dip to minimize the objective function $f$, such as via a least mean square method. Additional seismic attributes (e.g., seismic attributes in addition to dip) can be included in the objective function h in order to improve horizon optimization. The seismic attribute y can be described as a function of location i,j, $X_{i,j}$ where (i,j) is the coordinate of the location along the horizontal axes and $X_{i,j}$ is the depth in the vertical direction. The value of the seismic attribute is then given by Equation 8, below, as:

$$y = h(i, j, X_{i,j}) \quad (8)$$

where y can be a seismic attribute such as coherence, relative coherence, phase, relative phase, intensity, relative intensity, etc. The seismic attribute can vary based on all three dimensions of the seismic volume (i.e., i, j and $X_{i,j}$) or can vary based only on one or two dimensions of the seismic volume.

The value of the seismic attribute can be expressed as a matrix (such as that shown in Equation 9 below), a vector (such as that shown in Equation 10 below) or any other appropriate expression or in any other appropriate dimension.

$$y = h(i, j, X_{i,j}) = \qquad (9)$$

$$\begin{bmatrix} h(1, 1, X_{1,1}) & h(1, 2, X_{1,2}) & \ldots & h(1, j, X_{1,j}) \\ h(2, 1, X_{2,1}) & h(2, 2, X_{2,2}) & & \vdots \\ \vdots & & \ddots & h(i-1, j, X_{i-1,j}) \\ h(i, 1, X_{i,1}) & \ldots & h(i, j-1, X_{i,j-1}) & h(i, j, X_{i,j}) \end{bmatrix}$$

$$y = h(x) \qquad (10)$$

where $h(i,j,X_{i,j})$ is the value of the seismic attribute $y=h(i,j,X_{i,j})$ evaluated at the depth d of the grid point $X_{ij}$. $h(x)$ is then a generalized function to sample seismic attributes at the grid points on the seismic horizon in vector form.

The objective function of Eq. 6 can then be modified to minimize the objective function while simultaneously optimizing for one or more additional seismic attribute. This gives rise to Equation 11, below:

$$f = \|WB - WAx\|^2 + w\|C - D\ h(x)\|^2 \qquad (11)$$

where D is a matrix of size (L, N), C is a vector of matrix size (L, 1), L is the number of attribute values which are considered, and w is a weighting factor that defines the relative weight of the attribute y compared to the seismic dip. L can equal the number of points in the grid (e.g., N) or can be greater or fewer. For example, L can have a value for each point in the grid, or values for every two points in the grid, or two or more values for each point in the grid (such as for each point relative to a nearest neighbor). In this example, $h(x)$ is a vector matrix of size (N, 1). It should be understood that matrices of different sizes (e.g., D, C, and $h(x)$ be applicable based on the selection of the attribute and the attribute form (i.e., vector, matrix, etc.).

The values and forms of C, D, and $h(x)$ can be selected in order to optimize for both a minimization of the sparse offset volume and constrain the additional seismic attribute. For example, in order to optimize for a horizon having a constant phase $\varphi$ of $\pi/2$, which corresponds to a peak in the seismic data, the seismic attribute can be defined by Equation 12, below:

$$h(x) = (\varphi_1, \varphi_2, \ldots, \varphi_{N-1}, \varphi_N)^T \qquad (12)$$

where $\varphi_i$ is the phase at the grid point i. To select for a constant phase $\varphi$ of $\pi/2$, the vector C can be defined by Equation 13, below:

$$C = \left(\frac{\pi}{2}, \frac{\pi}{2}, \ldots, \frac{\pi}{2}, \frac{\pi}{2}\right)^T \qquad (13)$$

where the value of phase for which the objective function is minimized is the peak phase p of $\pi/2$. Further, D can be an identify matrix as given by Equation 14:

$$D = \text{diags}(1,1, \ldots, 1,1) \qquad (14)$$

where each of the diagonal values are unity.

Because the attribute y may have a non-linear relationship to the depth of the grid points $X_{i,j}$, optimization can be solved for iteratively based on an initial solution and the attribute $y=h(i,j,X_{i,j})$ evaluated for the seismic volume or at the grid points.

The gradient of the objective function $f$ as described in Eq. 11 is given by Equation 15 below:

$$grad = \qquad (15)$$
$$2\left(A^T W^T W B - A^T W^T W A x + w D^T C \frac{\partial}{\partial x} h(x) - w D^T D h(x) \frac{\partial}{\partial x} h(x)\right)$$

where $\partial/\partial x\ h(x)$ is the derivative of the seismic attribute $y=h(i,j,X_{i,j})$ or elements of the seismic attribute vector or matrix $y=h(x)$ with respect to the depth at the grid point $X_{i,j}$.

Equations 11 and 15 can then be combined to generate a best fit solution, where minimization of the objective function can be performed using any appropriate iterative solver such as the conjugate gradient method, the limited memory Broyden-Fletcher-Goldfarb-Shanno algorithm (L-BFGS), etc.

Additionally, extension of the principles of Eq. 8 and 11 give a general equation for consideration of multiple attributes and multiple conditions. This can be given by any appropriate formula, such as that of Equation 16, below:

$$f = \|WB - WAx\|^2 + \sum_{k=1}^{k=K} w_k \|C_k - D_k h_k(x)\|^2 \qquad (16)$$

where K is the number of conditions, $w_k$ is the weighting factor that defines the relative weight of the attribute y compared to the seismic dip for the condition k, $C_k$, $D_k$, and $h_k$ are the matrices for the condition k.

At block 322, it is determined if the objective function optimization criteria is reached. For example, with reference to FIGS. 1A-1B, the global sparse grid optimizer 130 can determine if the objective function optimization criteria is reached. The global sparse grid optimizer 130 can determine that the objective function optimization criteria is reached based on a threshold value for the objective function or for elements of the objective function corresponding to the points of the sparse global grid. The global sparse grid optimizer 130 can determine that the objective function optimization criteria is reached based on an additional seismic attribute, such as coherence or phase, or based on a threshold based on an additional seismic attribute. The global sparse grid optimizer 130 can optionally set no threshold for the objective function optimization iteration and only determine if the objective function optimization iteration criteria is reached at block 326. If the global sparse grid optimizer 130 determines that the optimization criteria is reached, flow continues to block 328 where it is determined if the optimized horizon is acceptable. If the global sparse grid optimizer 130 determines that the optimization criteria is not reached, flow continues to block 324.

At block 324, the depth of the sparse global grid is adjusted based on the objective function to minimize the objective function value(s). For example, with reference to FIGS. 1A-1B, the global sparse grid optimizer 130 can adjust the depth of the sparse global grid based on the objective function to minimize the objective function value(s). The global sparse grid optimizer 130 can minimize the objective function in any appropriate manner, such as those described below. The global sparse grid optimizer 130 can minimize the objective function by adjusting the depth of each of the grid points of the global sparse grid. The global sparse grid optimizer 130 can then recalculate the value of the objective function at the new depths of the points of the global sparse grid. As the depth of each of the points is related by the seismic offset volume, the objective function operated to align the depth of each of the points with the selected horizon. The global sparse grid optimizer 130 can adjust the depth of the sparse global grid using any appropriate method. The global sparse grid optimizer 130 can minimize the objective function using any appropriate method.

The objective function can be minimized using the least squares solution based on the matrix containing the linear system of equations for the solution (as shown in Eq. 6). The objective function need not be visualized or optimized as a matrix, but as it is a system of linear equations matrix manipulation may be used in minimizing or solving. Any appropriate solution to the linear system of equations can be used, such as a least squared solution, and any iterative appropriate iterative solution can be used, such as L-BFGS.

At block 326, it is determined if the optimization iteration criteria is reached. For example, with reference to FIGS. 1A-1B, the global sparse grid optimizer 130 can determine if the optimization iteration criteria is reached. The global sparse grid optimizer 130 can determine that the optimization iteration criteria is reached based a number of iterations performed and/or a time of computation. The global sparse grid optimizer 130 can also determine that the optimization iteration criteria is not reached based on a threshold value of the objective function (as described in reference to block 322) in combination with a number of iterations performed and/or a time of computation. The global sparse grid optimizer 130 can determine additional iterations could improve optimization of the objective function. The global sparse grid optimizer 130 can optionally set no threshold for the optimization iteration and only determine if the objective function optimization criteria is reached at block 322. If the global sparse grid optimizer 130 determines that the optimization iteration criteria is reached, flow continues to block 328. If the global sparse grid optimizer 130 determines that the optimization criteria is not reached, flow continues to block 314, where an additional iteration of the minimization of the objective function is performed beginning with a determination of the weighting factor for the points of the sparse global grid at the adjusted depths.

At block 328, it is determined if the optimized horizon is acceptable. For example, with reference to FIGS. 1A-1B, the global sparse grid optimizer 130 can determine if the optimized horizon is acceptable. The global sparse grid optimizer 130 can determine if the optimized horizon is acceptable based on one or more constraint points or constraint boundaries. The global sparse grid optimizer 130 can determine if the optimized horizon is acceptable based on agreement with other mapped horizons. The global sparse grid optimizer 130 can determine if the optimized horizon is acceptable based on operator or interpreter input-such as by outputting the optimized horizon to a user or operator and generating a trigger to determine if the operator or user would like to add another constraint point or asking if the user finds the optimized horizon to be acceptable. In some cases, a user can have additional knowledge or access to additional data which can influence the acceptable shapes of a horizon. The global sparse grid optimizer 130 can determine if the optimized horizon is acceptable based on behavior across a discontinuity or fault. The global sparse grid optimizer 130 can determine if the horizon is acceptable based on two or more of the methods previously described in combination. The global sparse grid optimizer 130 can determine if the optimized horizon is acceptable in either a qualitative or quantitative manner. If the global sparse grid optimizer 130 determines that the optimized horizon is acceptable, flow continues to block 330. If the global sparse grid optimizer 130 determines that the optimized horizon is not acceptable, flow continues to block 334, where at least one additional constraint point is added.

At block 330, the sparse global grid for the selected horizon is output. For example, with reference to FIGS. 1A-1B, the global sparse grid optimizer 130 can output the sparse global grid for the selected horizon. The global sparse grid optimizer 130 can output the sparse global grid to the local grid optimizer 140 of FIGS. 1A-1B. The global sparse grid optimizer 130 can output the sparse global grid to an operator or user. The global sparse grid optimizer 130 can output the sparse global grid to a set of seismic data or otherwise attach the sparse global grid to a set of seismic data.

At block 334, an additional constraint point can be added. For example, with reference to FIGS. 1A-1B, the global sparse grid optimizer 130 can add an additional constraint point. The global sparse grid optimizer 130 can add a constraint point using any appropriate method, such as those described in reference to block 312. Additionally, the global sparse grid optimizer 130 can request a constraint point from an operator or manual interpreter. In some embodiments, the global sparse grid optimizer 130 can generate an additional constraint point which is separated from any original constraint points by a fault. That is, the global sparse grid optimizer 130 can add a constraint point for a portion of the horizon separated from the original constraint point by a fault in order to identify discontinuous portions of the horizon with the sparse global grid.

FIG. 4 depicts a flowchart of example operations for optimization of a horizon over edges of local grids, according to some embodiments. A flowchart 400 of FIG. 4 includes operations described as performed by the local grid optimizer 140 for consistency with the earlier description. Such operations can be performed by a controller or processor, hardware, firmware, software, or a combination thereof of one or more computers, including asynchronously. However, apparatus component naming, division, organization, and program code naming, organization, and deployment can vary due to arbitrary operating choice, ordering, programmer choice, programming language(s), platform, etc. Additional, operations of the flowchart 400 are described in reference to the seismic data pre-processor 110 and the sparse global grid optimizer 130 of FIGS. 1A-1B. The flowchart includes the operations described as performed by the local grid optimizer 140, but one or more of the operations may instead or additionally be performed by the seismic data pre-processor 110 or the global sparse grid optimizer 130. The flowchart includes the operations depicted as performed by a local grid edge optimizer 450. It should be understood that the local grid edge optimizer 450 can be a component of the local grid optimizer 140 or can be in communication with the local grid optimizer 140.

At block 410, the sparse global grid for the selected horizon is obtained. For example, with reference to FIGS. 1A-1B, the local grid optimizer 140 can obtain the sparse global grid from the global sparse grid optimizer 130 or an output of the global sparse grid optimizer 130. The local grid optimizer 140 can access the sparse global grid from data storage. The local grid optimizer 140 can also be in communication with the global sparse grid optimizer 130 or a component of the global sparse grid optimizer 130 can operate on the data of the global sparse grid optimizer 130.

At block 412, the sparse global grid points are set as constraint points for the local grids. For example, with reference to FIGS. 1A-1B, the local grid optimizer 140 can set the sparse global grid points as constraint points for the local grids. The local grid optimizer 140 can set the points of the sparse global grid as constraint points using any appropriate method, such as those described in reference to block 312 of FIG. 3.

At block 413, local grid edges are generated for the selected horizon. For example, with reference to FIGS. 1A-1B, the local grid optimizer 140 can generate local grid edges for the selected horizon. The local grid optimizer 140 can generate local grid edges and constituent points for the local grid edges based on locations of the points of the sparse global grid. The local grid optimizer 140 can generate the local grid edges and points of the local grid edges between each of the adjacent points of the sparse global grid. The local grid optimizer 140 can generate local grid edges along vectors or surfaces connecting each of the points of the sparse global grid. The local grid optimizer 140 can space the points of the local grid edges equally between the adjacent points of the sparse global grid, where the points can be spaced equally in distance between two of the adjacent points of the sparse global grid, equally in depth, or equally in one of the horizontal directions. The local grid optimizer 140 can generate a number of edge points based on the relative intensity of the change in depth between the points of the sparse global grid—i.e., the local grid optimizer 140 can generate more or less points along the local grid edges based on the magnitude of the change in depth between the points of the sparse global grid. For example, the local grid optimizer 140 can generate fewer points along a local grid edge which formed between two points of the sparse global grid which fall on separate sides of a fault. That is, the number of points for the local grid edge (and by extension the local grid) can be weighted based on seismic data. The local grid optimizer 140 can also generate points of the local grid edge at the granularity of the data. That is, the local grid optimizer 140 can generate a point for each trace in each of the horizontal directions, for each voxel, or otherwise at the smallest measurement unit available for the seismic data. The points for the local grid edge can also optionally or alternatively be generated by the global sparse grid optimizer 130, such as at block 310 of FIG. 3.

At block 414, the weighting factor is determined for the selected horizon on the local grid edges. For example, with reference to FIGS. 1A-1B, the local grid optimizer 140 can determine the weighting factor for the selected horizon on the local grid edges. The local grid optimizer 140 can determine the weighing factor for the points on the local grid edges using any appropriate method, such as those detailed in reference to block 314 of FIG. 3. The local grid optimizer 140 can determine the weighting factors based on the depths of the points of the local grid edges, and can update or recalculate the weighting factors if the depths of the points on the local grid edges are changed or updated. The local grid optimizer 140 can also apply the weighting factor, a component of the weighting factor, or an average or composition of the weighting factor of the points of the sparse global grid to the points of the local grid edges between those points of the sparse global grid instead of calculating or re-calculating the weighting factor.

At block 416, offset for the local grid edge points is determined based on the seismic dip. For example, with reference to FIGS. 1A-1B, the local grid optimizer 140 can determine the offset based on the seismic dip for the local grid edges. The local grid optimizer 140 can determine the offset for each point of the local grid edges. The local grid optimizer 140 can determine the offset based on the seismic dip for each voxel of the seismic volume, such as that determined at block 204 of FIG. 2 by the seismic data pre-processor 110 of FIGS. 1A-1B. The local grid optimizer 140 can determine the offset in any appropriate manner, such as those described in reference to block 316 of FIG. 3.

At block 418, the objective function value(s) is determined based on the constraint points, the weighting factor, and the offset. For example, with reference to FIGS. 1A-1B, the local grid optimizer 140 can determine the objective function value(s) based on the constraint points, the weighting factor, and the offset. The local grid optimizer 140 can determine the objective function value(s) in any appropriate manner, such as those described in reference to block 318 of FIG. 3. The local grid optimizer 140 can also interpolate or estimate the value(s) of the objective function based on the values of the objective function at the points of the sparse global grid which bookend the local grid edges. The local grid optimizer 140 can also interpolate or estimate the value(s) of the objective function based on the values of the objective function at the points of the sparse global grid which bookend the local grid edges and on values of one or more additional seismic attributes.

At block 420, optionally, the objective function value(s) is determined based on an additional seismic attribute. For example, with reference to FIGS. 1A-1B, the local grid optimizer 140 can determine the objective function value(s) based on the additional seismic attribute. The local grid optimizer 140 can determine the objective function value(s) in any appropriate manner, such as those described in reference to block 320 of FIG. 3. The local grid optimizer 140 can also interpolate or estimate the value(s) of the objective function with the additional seismic attribute based on the values of the objective function or the values of the additional seismic attribute at the points of the sparse global grid which bookend the local grid edges.

At block 422, it is determined if the objective function optimization criteria is reached. For example, with reference to FIGS. 1A-1B, the local grid optimizer 140 can determine if the objective function optimization criteria is reached. The local grid optimizer 140 can determine if the objective function optimization criteria is reached in any appropriate manner, including those described in reference to block 322 of FIG. 3. If local grid optimizer 140 determines that the objective function optimization criteria is reached, flow continues to block 430 where the local grid edges are output for the selected horizon. If local grid optimizer 140 determines that the objective function optimization criteria is not reached, flow continues to block 424.

At block 424, the depths of the local grid edges are adjusted based on the objective function to minimize the objective function value(s). For example, with reference to FIGS. 1A-1B, the local grid optimizer 140 can adjust the depth of the local grid edges based on the objective function to minimize the objective function value(s). The local grid optimizer 140 can adjust the depth of the points of the local grid edges in any appropriate manner, such as those described in reference to block 324 of FIG. 3.

At block 426, it is determined if the optimization iteration criteria is reached. For example, with reference to FIGS. 1A-1B, the local grid optimizer 140 can determine if the optimization iteration criteria is reached. The local grid optimizer 140 can determine if the optimization iteration criteria is reached in any appropriate manner, including those described in reference to block 326 of FIG. 3. If local grid optimizer 140 determines that the optimization iteration criteria is reached, flow continues to block 430 where the local grid edges are output for the selected horizon. If local grid optimizer 140 determines that the objective function optimization criteria is not reached, flow continues to block 414, where the weighting factor is determined.

At block 430, the local grid edges for the selected horizon are output. For example, with reference to FIGS. 1A-1B, the local grid optimizer 140 can output the local grid edges for the selected horizon. The local grid optimizer 140 can output the local grid edges to a local grid interior optimizer 550 of FIG. 5. The local grid optimizer 140 can also continue operations on the local grid edges, such as via the operations which will be described in reference to FIG. 5. The local grid optimizer 140 can output the local grid edges to an operator or user. The local grid optimizer 140 can output the local grid edges to a set of seismic data or otherwise attach the local grid edges to a set of seismic data.

Figure 5:
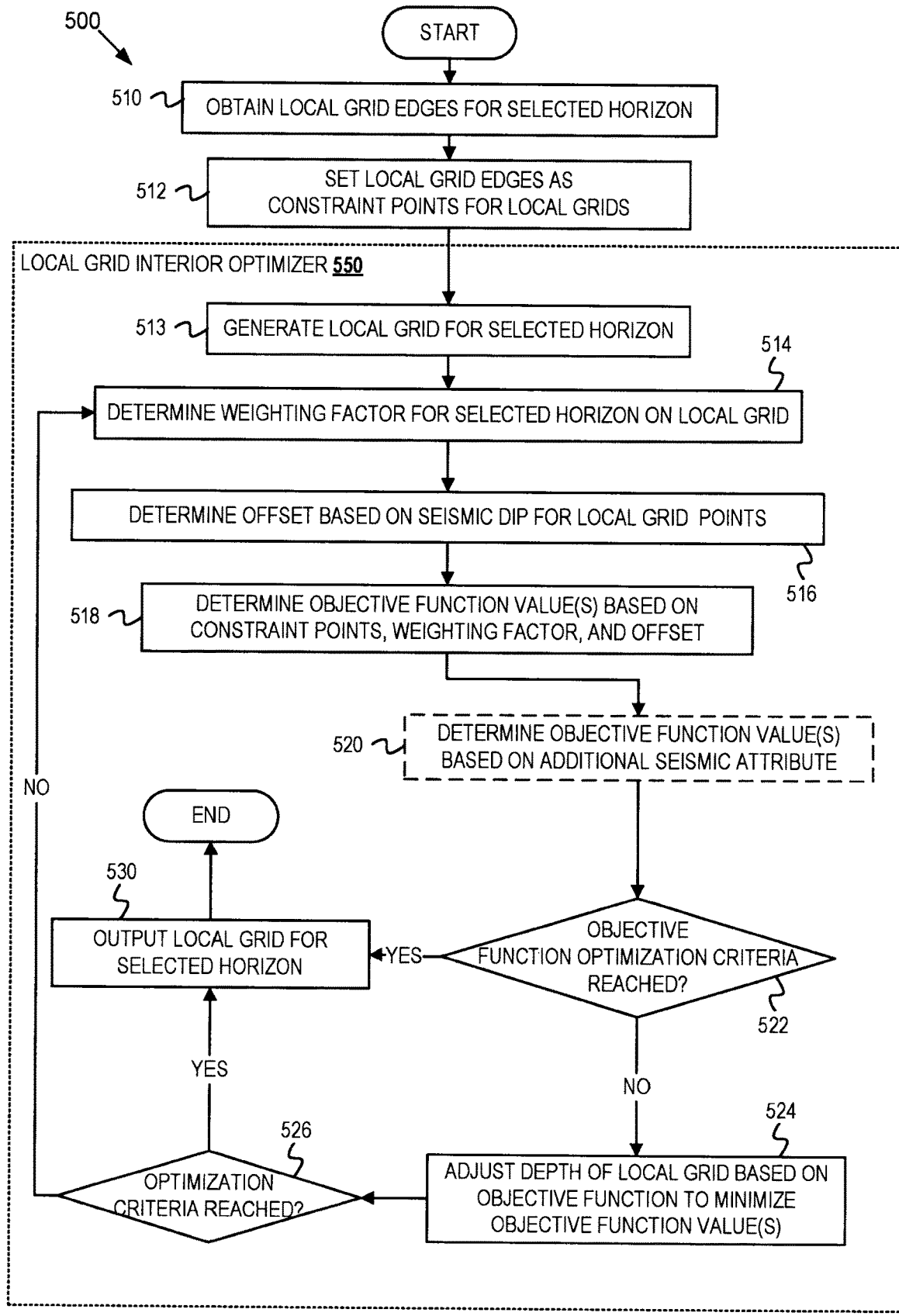
FIG. 5 depicts a flowchart of example operations for optimization of a horizon on a local grid, according to some embodiments.

FIG. 5 depicts a flowchart of example operations for optimization of a horizon on a local grid, according to some embodiments. A flowchart 500 of FIG. 5 includes operations described as performed by the local grid optimizer 140 for consistency with the earlier description. Such operations can be performed by a controller or processor, hardware, firmware, software, or a combination thereof of one or more computers, including asynchronously. However, apparatus component naming, division, organization, and program code naming, organization, and deployment can vary due to arbitrary operating choice, ordering, programmer choice, programming language(s), platform, etc. Additional, operations of the flowchart 500 are described in reference to the seismic data pre-processor 110 and the sparse global grid optimizer 130 of FIGS. 1A-1B. The flowchart includes the operations described as performed by the local grid optimizer 140, but one or more of the operations may instead or additionally be performed by the seismic data pre-processor 110 or the global sparse grid optimizer 130. The flowchart includes the operations depicted as performed by the local grid interior optimizer 550. It should be understood that the local grid interior optimizer 550 can be a component of the local grid optimizer 140 or can be in communication with the local grid optimizer 140.

The local grid optimizer 140 can operate on one local grid at a time, on more than one local grid at a time, on the local grids in parallel, or on the local grids in sequence. In some embodiments, more than one local grid optimizer 140 can operate, such as via distributed computing, in order to reduce computational burned on each local grid optimizers. It should be understood that the operations described for the local grid optimizer 140 can be performed instead by multiple local grid optimizers.

At block 510, the local grid edges for the selected horizon are obtained. For example, with reference to FIGS. 1A-1B, the local grid optimizer 140 can obtain the local grid edges from the global sparse grid optimizer 130 or an output of the global sparse grid optimizer 130. The local grid optimizer 140 can also obtain the local grid edges from storage or from the local grid edge optimizer 450. The local grid optimizer 140 can also be in communication with the local grid edge optimizer 450 or a component of the local grid edge optimizer 450. The local grid optimizer can also obtain the local grid edges from the output of block 430 of FIG. 4 or operate on the output of block 430.

At block 512, the local grid edges are set as constraint points for the local grids. For example, with reference to FIGS. 1A-1B, the local grid optimizer 140 can set the local grid edges as constraint points for the local grids. The local grid optimizer 140 can set the points of the sparse global grid and the local grid edges as constraint points using any appropriate method, such as those described in reference to block 312 of FIG. 3.

At block 513, a local grid is generated for the selected horizon. For example, with reference to FIGS. 1A-1B, the local grid optimizer 140 can generate the local grid for the selected horizon. The local grid optimizer 140 can generate the local and constituent points for the local grid based on locations of the points of the sparse global grid and the points of the local grid edges. The local grid optimizer 140 can generate the local grid and points of the local grid between as infill rows and columns based on the adjacent points of the spares global grid and the local grid edges. The local grid optimizer 140 can generate the points of the local grid along vectors or surfaces connecting each of the points of the local grid edges. The local grid optimizer 140 can space the points of the local grid equally between the adjacent points of the local grid edges, where the points can be spaced equally in distance between two of the adjacent points, equally in depth, or equally in one of the horizontal directions. The local grid optimizer 140 can generate a number of points based on the relative intensity of the change in depth between the points of the sparse global grid or the local grid edges—i.e., the local grid optimizer 140 can generate more or less points along the local grid based on the magnitude of the change in depth between the points of the sparse global grid and the local grid edges. For example, the local grid optimizer 140 can generate fewer points in the local grid formed over separate sides of a fault. That is, the number of points for the local grid can be weighted based on seismic data. The local grid optimizer 140 can also generate points of the local grid at the granularity of the data. That is, the local grid optimizer 140 can generate a point for each trace in each of the horizontal directions, for each voxel, or otherwise at the smallest measurement unit available for the seismic data. The points for the local grid can also optionally or alternatively be generated by the global sparse grid optimizer 130, such as at block 310 of FIG. 3.

At block 514, the weighting factor is determined for the selected horizon on the local grid. For example, with reference to FIGS. 1A-1B, the local grid optimizer 140 can determine the weighting factor for the selected horizon on the local grid. The local grid optimizer 140 can determine the weighing factor for the points on the local grid using any appropriate method, such as those detailed in reference to block 314 of FIG. 3. The local grid optimizer 140 can determine the weighting factors based on the depth of the points of the local grid, and can update or recalculate the weighting factors if the depth of the points of the local grid are changed or updated. The local grid optimizer 140 can also apply the weighting factor, a component of the weighting factor, or an average or composition of the weighting factor of the points of the sparse global grid or the points of the local grid edges to the points of the local grid between those points instead of calculating or re-calculating the weighting factor.

At block 516, offset for the local grid points is determined based on the seismic dip. For example, with reference to FIGS. 1A-1B, the local grid optimizer 140 can determine the offset based on the seismic dip for the local grid points. The local grid optimizer 140 can determine the offset for each point of the local grid. The local grid optimizer 140 can determine the offset based on the seismic dip for each voxel of the seismic volume, such as that determined at block 204 of FIG. 2 by the seismic data pre-processor 110 of FIGS. 1A-1B. The local grid optimizer 140 can determine the offset in any appropriate manner, such as those described in reference to block 316 of FIG. 3.

At block 518, the objective function value(s) is determined based on the constraint points, the weighting factor, and the offset. For example, with reference to FIGS. 1A-1B, the local grid optimizer 140 can determine the objective function value(s) based on the constraint points, the weighting factor, and the offset. The local grid optimizer 140 can determine the objective function value(s) in any appropriate manner, such as those described in reference to block 318 of FIG. 3. The local grid optimizer 140 can also interpolate or estimate the value(s) of the objective function based on the values of the objective function at the points of the sparse global grid or the local grid edges which bookend the local grid. The local grid optimizer 140 can also interpolate or estimate the value(s) of the objective function based on the values of the objective function at the points which bookend the local grid and on values of one or more additional seismic attributes.

At block 520, optionally, the objective function value(s) is determined based on an additional seismic attribute. For example, with reference to FIGS. 1A-1B, the local grid optimizer 140 can determine the objective function value(s) based on the additional seismic attribute. The local grid optimizer 140 can determine the objective function value(s) in any appropriate manner, such as those described in reference to block 320 of FIG. 3. The local grid optimizer 140 can also interpolate or estimate the value(s) of the objective function with the additional seismic attribute based on the values of the objective function or the values of the additional seismic attribute at the points of the sparse global grid or the local grid edges which bookend the local grid.

At block 522, it is determined if the objective function optimization criteria is reached. For example, with reference to FIGS. 1A-1, the local grid optimizer 140 can determine if the objective function optimization criteria is reached. The local grid optimizer 140 can determine if the objective function optimization criteria is reached in any appropriate manner, including those described in reference to block 322 of FIG. 3. If local grid optimizer 140 determines that the objective function optimization criteria is reached, flow continues to block 530 where the local grid is output for the selected horizon. If local grid optimizer 140 determines that the objective function optimization criteria is not reached, flow continues to block 524.

At block 524, the depths of the local grid are adjusted based on the objective function to minimize the objective function value(s). For example, with reference to FIGS. 1A-1B, the local grid optimizer 140 can adjust the depth of the local grid based on the objective function to minimize the objective function value(s). The local grid optimizer 140 can adjust the depth of the points of the local grid in any appropriate manner, such as those described in reference to block 324 of FIG. 3.

At block 526, it is determined if the optimization iteration criteria is reached. For example, with reference to FIGS. 1A-1B, the local grid optimizer 140 can determine if the optimization iteration criteria is reached. The local grid optimizer 140 can determine if the optimization iteration criteria is reached in any appropriate manner, including those described in reference to block 326 of FIG. 3. If local grid optimizer 140 determines that the optimization iteration criteria is reached, flow continues to block 530 where the local grid is output for the selected horizon. If local grid optimizer 140 determines that the objective function optimization criteria is not reached, flow continues to block 514, where the weighting factor is determined.

At block 530, the local grid for the selected horizon is output. For example, with reference to FIGS. 1A-1B, the local grid optimizer 140 can output the local grid for the selected horizon. The local grid optimizer 140 can output the local grid to an operator or user. The local grid optimizer 140 can output the local grid to a set of seismic data or otherwise attach the local grid edges to a set of seismic data. The local grid optimizer 140 can operate upon the multiple local grids to reconstruct a map of the selected horizon. The local grid optimizer 140 can also output the local grid to a program or processor for construction or reconstruction of a map of the selected horizon. The local grid optimizer 140 can rejoin the local grids or cause the local grids to be rejoined to generate the map of the selected horizon, where the maps can be rejoined based on the locations and identification of the points of the sparse global grid or the local grid edges which belong to multiple local grids.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 318 and 320 can be performed in parallel or concurrently. With respect to FIG. 2, an additional seismic attribute is not necessary. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

Example Graphs

Example graphs for horizon optimization (which are depicted in FIGS. 6, 7A-7B, 8A-8B, 9A-9B, 10A-10B, 11, 12A-12B, 13, 14A-14C, and 15) are now described.

Figure 6:
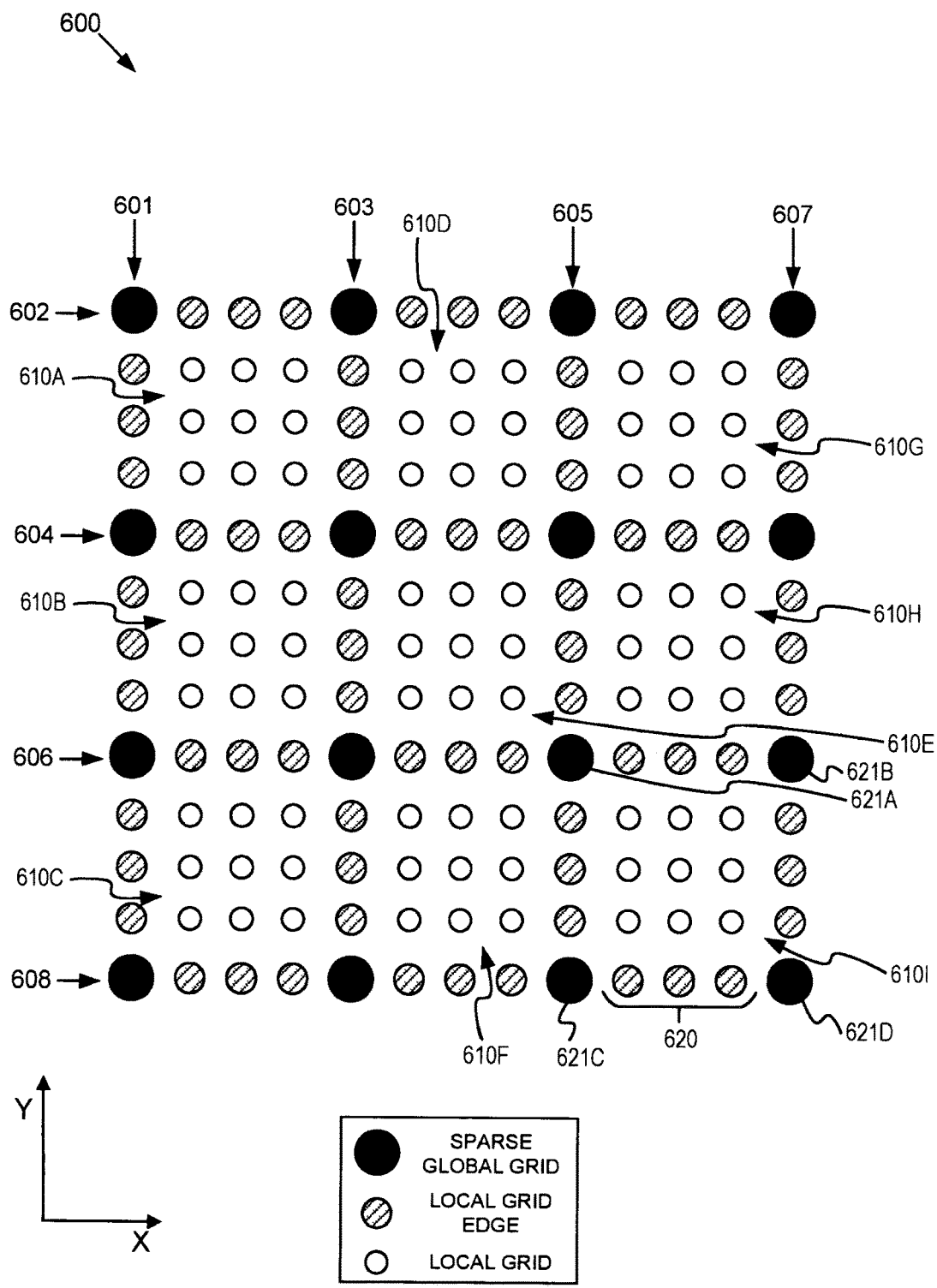
FIG. 6 depicts an example diagram of a sparse global grid and its constituent local grids for horizon optimization, according to some embodiments.

FIG. 6 depicts an example diagram of a sparse global grid and its constituent local grids for horizon optimization, according to some embodiments. FIG. 6 depicts a diagram 600 which depicts example points 621A, 621B, 621C and 621D of a sparse global grid. The diagram 600 also identified columns 601, 603, 605, and 607 and rows 602, 604, 606, and 608 of the sparse global grid. The diagram 600 depicts example points 620 of the local grid edges, where the points of the local grid edges also lie within the columns 601, 603, 605, and 607 and the rows 602, 604, 606, and 608 of the sparse global grid. The diagram 600 further identified example local grids 610A, 610B, 610C, 610D, 610E, 610F, 610G, 610H, and 610I interpolated between the columns 601, 603, 605, and 607 and the rows 602, 604, 606, and 608 of the sparse global grid.

Figure 7B:
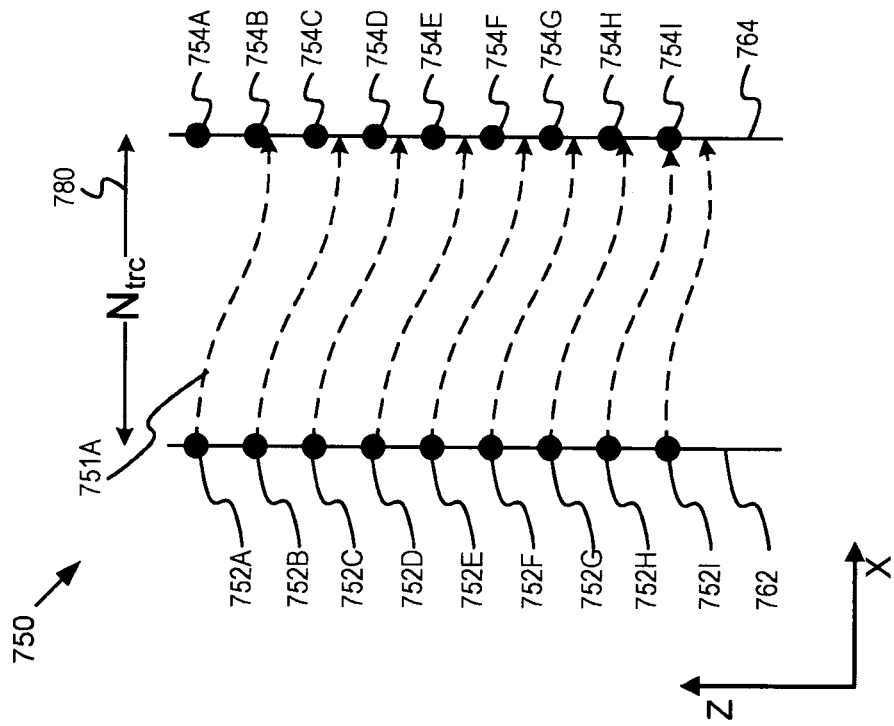
FIGS. 7A and 7B depict example diagrams of sparse offset volume generation operations, according to some embodiments.
Figure 7A:
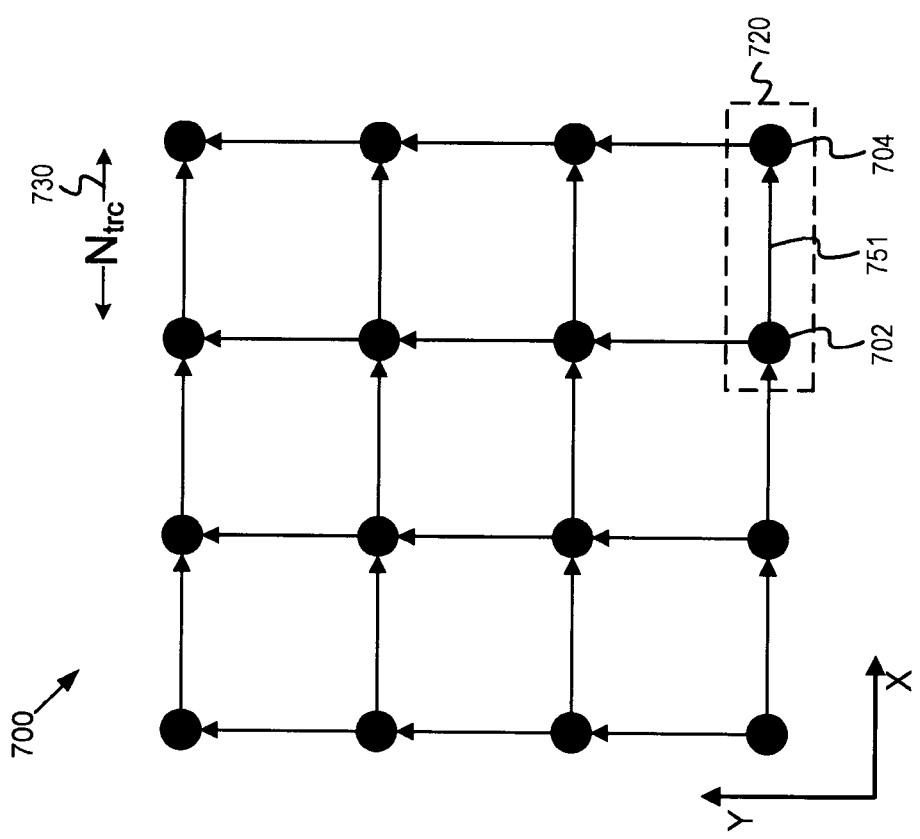

FIGS. 7A and 7B depict example diagrams of sparse offset volume generation operations, according to some embodiments. FIG. 7A depicts a diagram 700 depicting multiple grid points, including grid points 702 and 704, which can be points of the sparse global grid, of the local grid edges, or of one or more local grids. The grid points 702 and 704 are separated by a number of traces ($N_{trc}$) indicated by an arrow 730. The number of traces $N_{trc}$ can be n for the sparse global grid (where in an example embodiment n can be 5 or 6). The number of traces $N_{trc}$ can be zero or one for a local grid (depending on how separation is defined), where the traces can be adjacent traces. The distance between the grid points 702 and 704 is indicated by a tracker vector 751. The tracker vectors indicate the distance between two adjacent grid points are can be perpendicular to each of the horizontal directions of the seismic data or the seismic volume. The dotted line encompasses an area 720 including the grid points 702 and 704 and the tracker vector 751 and represents identifies a surface area under which many grid points may be stacked within the depth of the seismic volume.

FIG. 7B depicts a diagram 750 depicting a vertical slice of the seismic volume (i.e., a cross-section of the seismic volume with respect to depth) showing multiple grid points as a function of depth within the area 720 of FIG. 7A. The diagram 750 depicts grid points 752A, 752B, 752C, 752D, 752E, 752F, 752G, 752H, and 752I along a depth vector 762, which corresponds to the grid point 702 of FIG. 7A. The diagram 750 depicts grid points 754A, 754B, 754C, 754D, 754E, 754F, 754G, 754H, and 754I along a depth vector 764, which corresponds to the grid point 704 of FIG. 7A. The grid points 752A-752I of depth vector 762 are connected to the depth vector 764 by a dip vector, where an example dip vector 751A is labeled. The dip vectors represent the movement of the horizon or a number of horizons between the depth vector 762 and the depth vector 764. The grid points 752A-752I and the grid points 754A-754I are separated by a number of traces ($N_{trc}$) indicated by an arrow 780. The number of traces $N_{trc}$ can be n for the sparse global grid (where in an example embodiment n can be 5 or 6). The number of traces $N_{trc}$ can be zero or one for a local grid (depending on how separation is defined), where the traces can be adjacent traces. The seismic dip records the shift in the horizon, as determined based on an image tensor vector or other appropriate method, between a grid point of a first depth vector and a grid point of a second depth vector.

The relationship between the grid points 752A-752I of depth vector 762 and the grid points 754A-754I of the depth vector 764 can also or instead be determined using dynamic time warping (DTW). With DTW, a warping path between the depth vector 762 and the depth vector 764 can be determined. Based on values of seismic intensity (or another seismic attribute such as phase, relative phase, etc.), a pattern of behavior for the series of values of the depth vector 762 can be determined. By the same method, an additional pattern of behavior for the series of values of the depth vector 764 can be determined. A warping path can then be determined which represents the offset between each portion of the pattern of the depth vector 762 and its matching portion of the pattern of the depth vector 764. The warping path can measure an offset for between each of the grid points 752A-752I and their respective points on the depth vector 764—i.e., the grid points 754A-754I. The offset for each set of points (e.g., the grid point 752A and the grid point 754A) can vary as a function along the depth vectors 762 and 764 and can be information contained within the warping path.

DTW can be used instead of or in addition to seismic dip-such as using a warping path determined offset as an additional seismic attribute. Because DTW does not calculate intermediate values for voxels between the grid points (i.e., for voxels between depth vector 762 and the depth vector 764), DTW can improve offset calculation over faults. Correlation between traces on either side of faults can be made without calculation of seismic dip or image tensors at or along faults where such values can be poorly defined or difficult to calculate due to noise.

FIGS. 8A and 8B depict example diagrams of dip optimization operations, according to some embodiments. FIG. 8A depicts a diagram 800 depicting a vertical slice of the seismic volume (i.e., a cross-section of the seismic volume with respect to depth) showing multiple grid points as a function of depth within the seismic volume. The diagram 800 depicts grid points 852A and 852B along a depth vector 862, and grid points 854A and 854B along a depth vector 864. The grid points 852A and 852B and the grid points 854A and 854B are separated by a number of traces $N_{trc}$ indicated by an arrow 830. The grid point 852A is connected to the depth vector 864 by a dip vector 851A, representing a horizon. The dip vector 851A intersects the depth vector 864 at a depth $d_i$ 806A from the grid point 854A and at a depth $d_j$ 806B from the grid point 854B. The grid points 852A and 852B and the grid points 854A and 854B are separated by a number of traces $N_{trc}$ indicated by an arrow 830.

FIG. 8B depicts a diagram 850 depicting the vertical slice of the seismic volume (i.e., a cross-section of the seismic volume with respect to depth) of FIG. 8B in which depths of showing multiple grid points have been adjusted based on the seismic dip. The diagram 850 depicts the grid points 852A and 852B along the depth vector 862, and previous locations of grid points 854A and 854B along the depth vector 864. In the diagram 850, the depth vector 864 has been adjusted by a distance 808A in the direction indicated by the arrow 870. Grid points along the depth vector 864 are now indicated by grid points 856A and 856B. The grid point 852A is connected to the depth vector 864 at the grid point 856A by a dip vector 851A, representing a horizon. The grid points 852A and 852B and the grid points 856A and 856B are separated by a number of traces $N_{trc}$ indicated by an arrow 830. The grid point 852B is connected to the depth vector 864 at the grid point 856B by a dip vector 851B, which may represent a neighboring horizon. In some embodiments, adjustment of the depth of a grid point can adjust other grid points along the same horizontal location. In some embodiments, grid points for a single horizon are optimized without adjustment of other grid points. The grid point 864B is a distance 808B from the previous location of the grid point 852B. The distance 808B may or may not be the distance 808A, depending on the depth optimization operation. The distance 808A can be determined based on the seismic dip. For the sparse global grid, the distance 808A can be determined based on the sparse offset dip volume, which is a function of the seismic dip and the number of traces $N_{trc}$ of separation between the grid points of the sparse global grid.

Figure 9B:
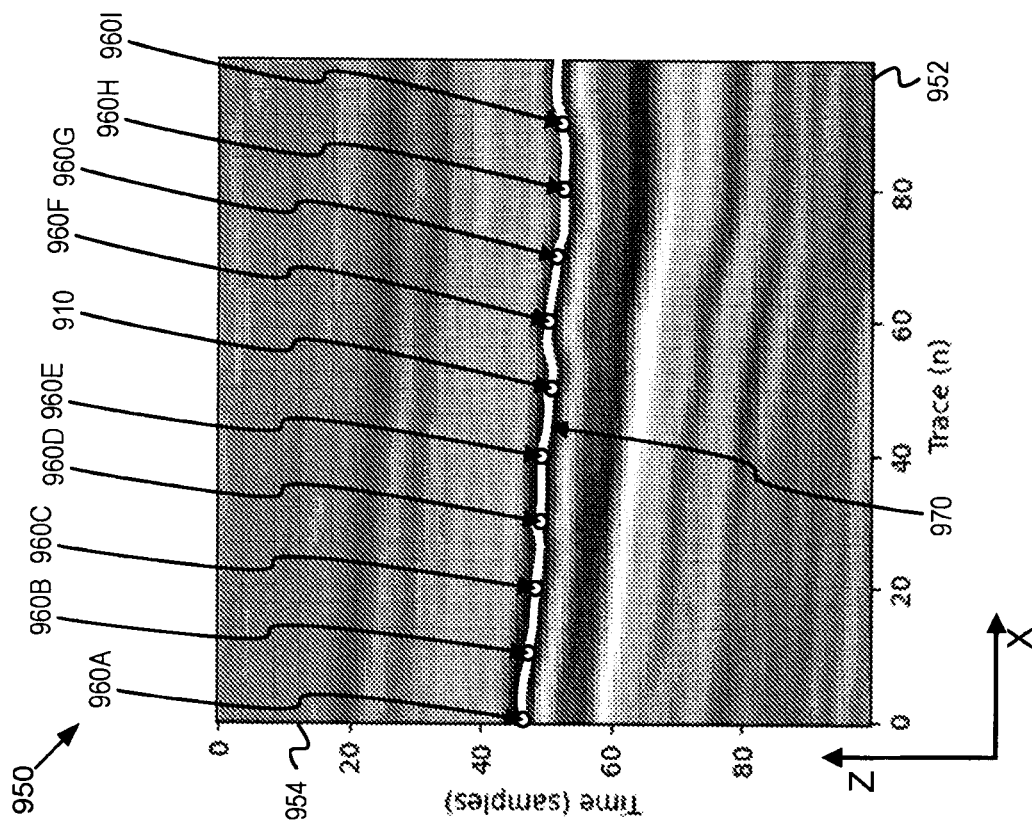
FIG. 9B depicts an example graph of seismic data for which an example horizon has been optimized, according to some embodiments.
Figure 9A:
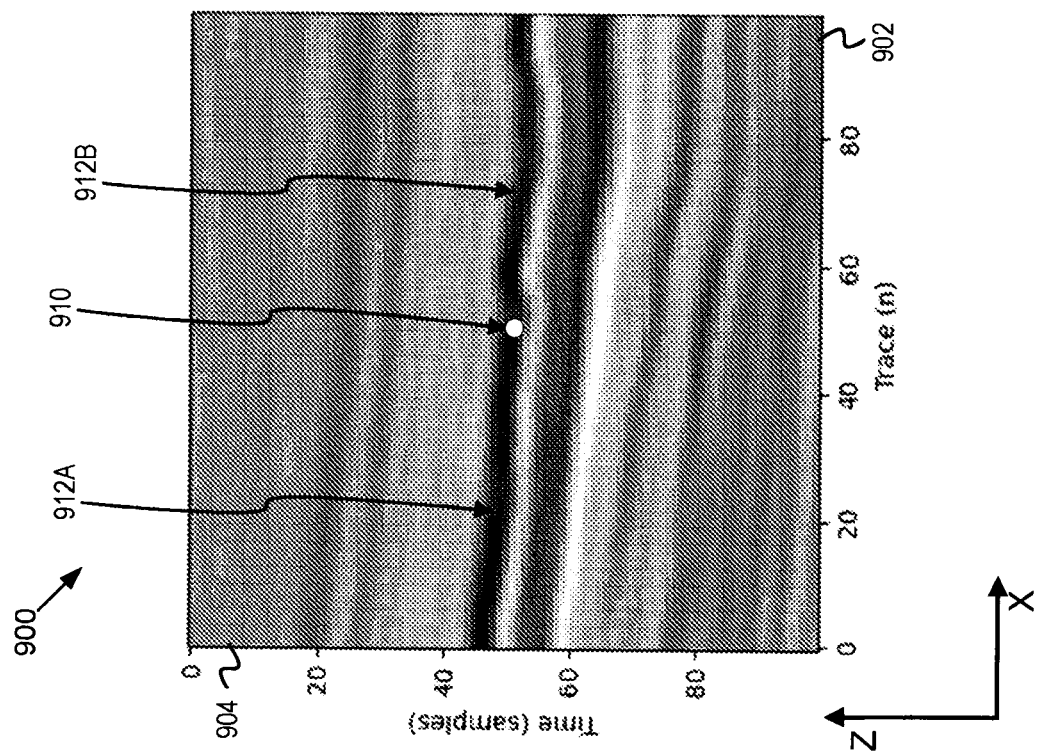
FIG. 9A depicts an example graph of seismic data for which an example horizon has been selected through the use of a constraint point, according to some embodiments.

FIG. 9A depicts an example graph of seismic data for which an example horizon has been selected through the use of a constraint point, according to some embodiments. FIG. 9A depicts a graph 900 of seismic values for vertical slice of the seismic volume (i.e., a cross-section of the seismic volume with respect to depth). The seismic data is plotted along one horizontal axis as a function of trace number (on x-axis 902) and along the depth axis as a function of sample time (on y-axis 904). The graph 900 contains a strong reflector which produces a horizon indicated by arrows 912A and 912B. A constraint point 910 has been selected for the horizon indicated by the arrows 912A and 912B.

FIG. 9B depicts an example graph of seismic data for which an example horizon has been optimized, according to some embodiments. FIG. 9B depicts a graph 950 of the seismic values of the graph 900 of FIG. 9A onto which a mapped horizon has been projected. The seismic data is plotted along one horizontal axis as a function of trace number (on x-axis 952) and along the depth axis as a function of sample time (on y-axis 954). Based on the constraint point 910, additional points 960A, 960B, 960C, 960D, 960E, 960F, 960G, 960H, and 960I of the sparse global grid have been generated. Based on the constraint point 910 and the additional points 960A-960I, a mapped horizon 970 has been optimized. The mapped horizon 970 conforms to the horizon of the graph 900 of FIG. 9A.

Figure 10A:
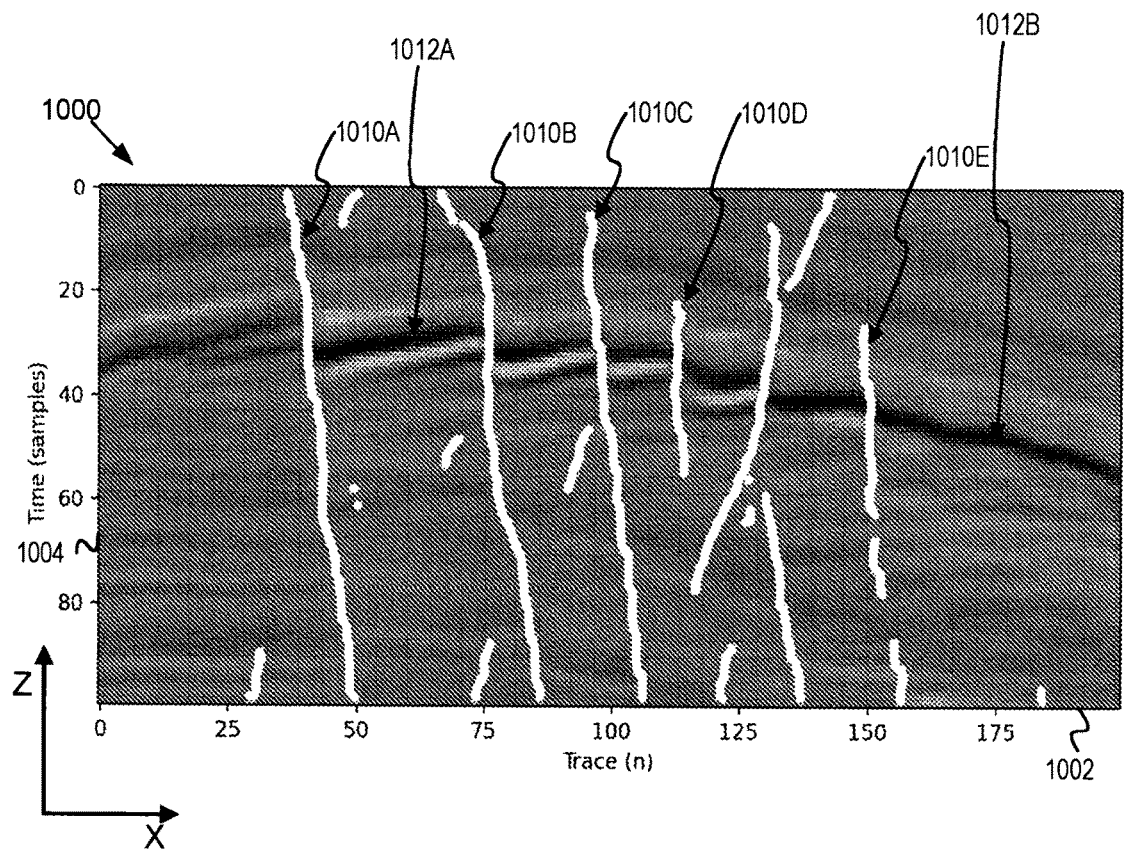
FIGS. 10A and 10B depict example graphs of seismic data for horizon optimization for which geological faults have been identified, according to some embodiments.
Figure 10B:
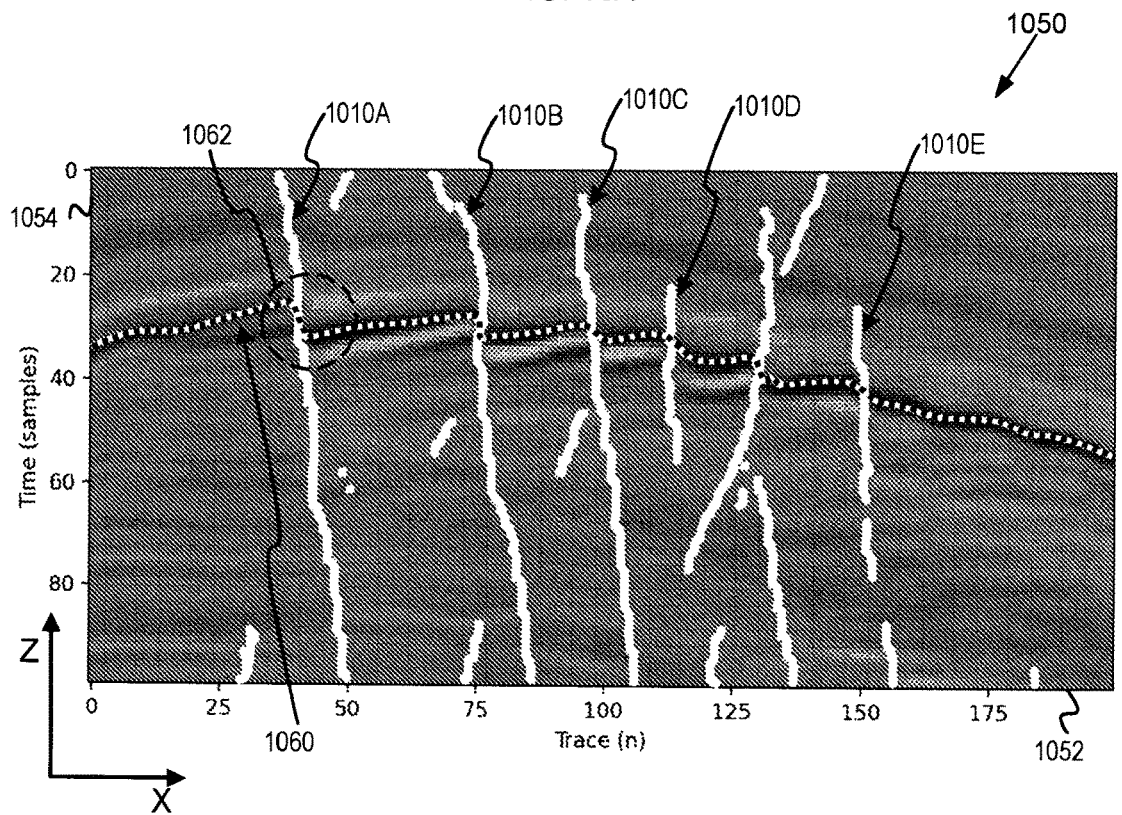

FIGS. 10A and 10B depict example graphs of seismic data for horizon optimization for which geological faults have been identified, according to some embodiments. FIG. 10A depicts a graph 1000 of seismic values for vertical slice of the seismic volume (i.e., a cross-section of the seismic volume with respect to depth). The seismic data is plotted along one horizontal axis as a function of trace number (on x-axis 1052) and along the depth axis as a function of sample time (on y-axis 1054). The graph 1000 contains a strong reflector which produces a horizon indicated by arrows 1012A and 1012B. The graph 1000 also contains faults (which are depicted as white lines), some of which are indicated by the arrows 1010A, 1010B, 1010C, and 1010E. The faults cause (or correspond to) discontinuity in the indicated horizon.

FIG. 10B depicts a graph 1050 of seismic values of the graph 1000 of FIG. 10A. The seismic data is plotted along one horizontal axis as a function of trace number (on x-axis 1002) and along the depth axis as a function of sample time (on y-axis 1004). Based on at least one constraint point and a discontinuity weighting factor, a mapped horizon 1060 has been optimized. The mapped horizon 1060 conforms to the horizon of the graph 1000 of FIG. 10A. A circle 1062 indicates where the mapped horizon 1060 follows the horizon across the fault 1010A. The discontinuity of the mapped horizon 1060 is generated by the use of a discontinuity weighting factor or a fault proximity weighting factor which allows the mapped horizon 1060 to be less continuous near the fault 1010A, and other identified faults.

Figure 11:
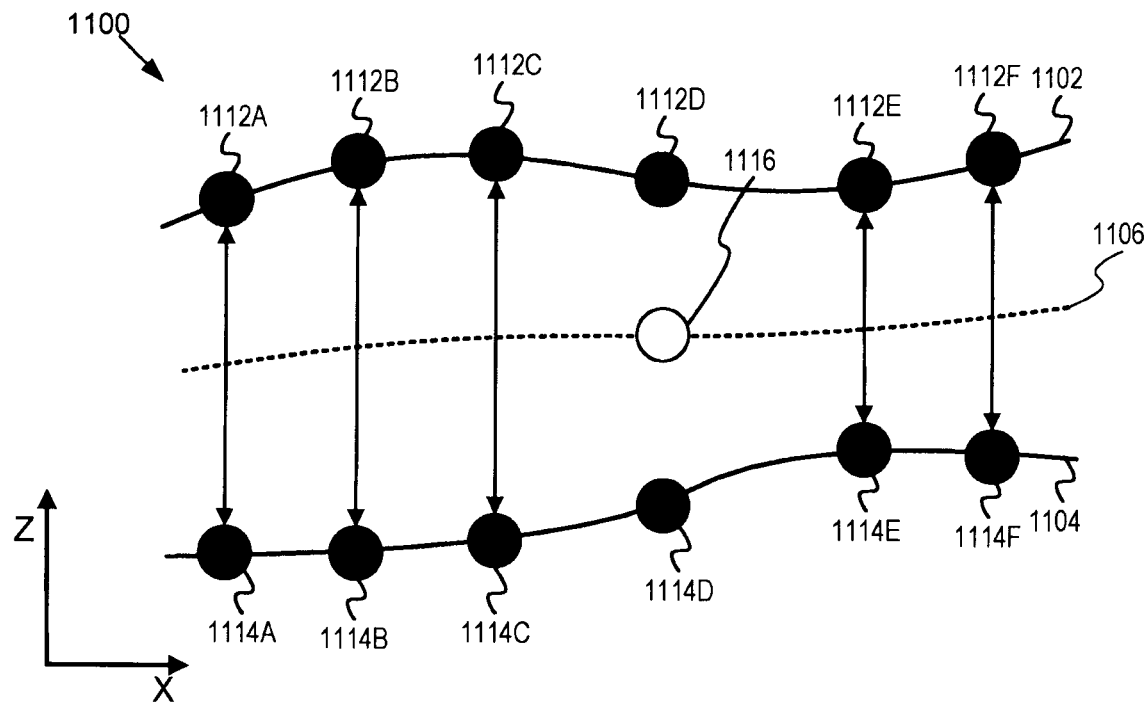
FIG. 11 depicts an example diagram of upper and lower bounds used to constrain horizon optimization, according to some embodiments.

FIG. 11 depicts an example diagram of upper and lower bounds used to constrain horizon optimization, according to some embodiments. FIG. 11 depicts a diagram 1100 displaying grid points 1112A, 1112B, 1112C, 1112D, 1112E, and 1112F of a constraint surface 1102 and grid points 1114A, 1114B, 1114C, 1114D, 1114E, and 1114F of a constraint surface 1104 in cross-section with respect to depth. The constraint surfaces 1102 and 1104 can represent a constraint surface or plain, including a mapped seismic horizon. The constrain surfaces 1102 and 1104 can be generated using multi-scale optimization or through any other appropriate method of constraint generation or seismic horizon mapping. The diagram 1110 also displays a grid point 1116 on a potential horizon 1106. The constraint surface 1102 can function as an upper bound or any other constraint point or surface for depth of the potential horizon 1106. The constraint surface 1104 can function as a lower bound or any other constraint point or surface for the potential horizon 1106. Although both an upper bound and a lower bound are depicted, it should be understood that only an upper bound or a lower bound or any portion thereof may be present.

Figure 12A:
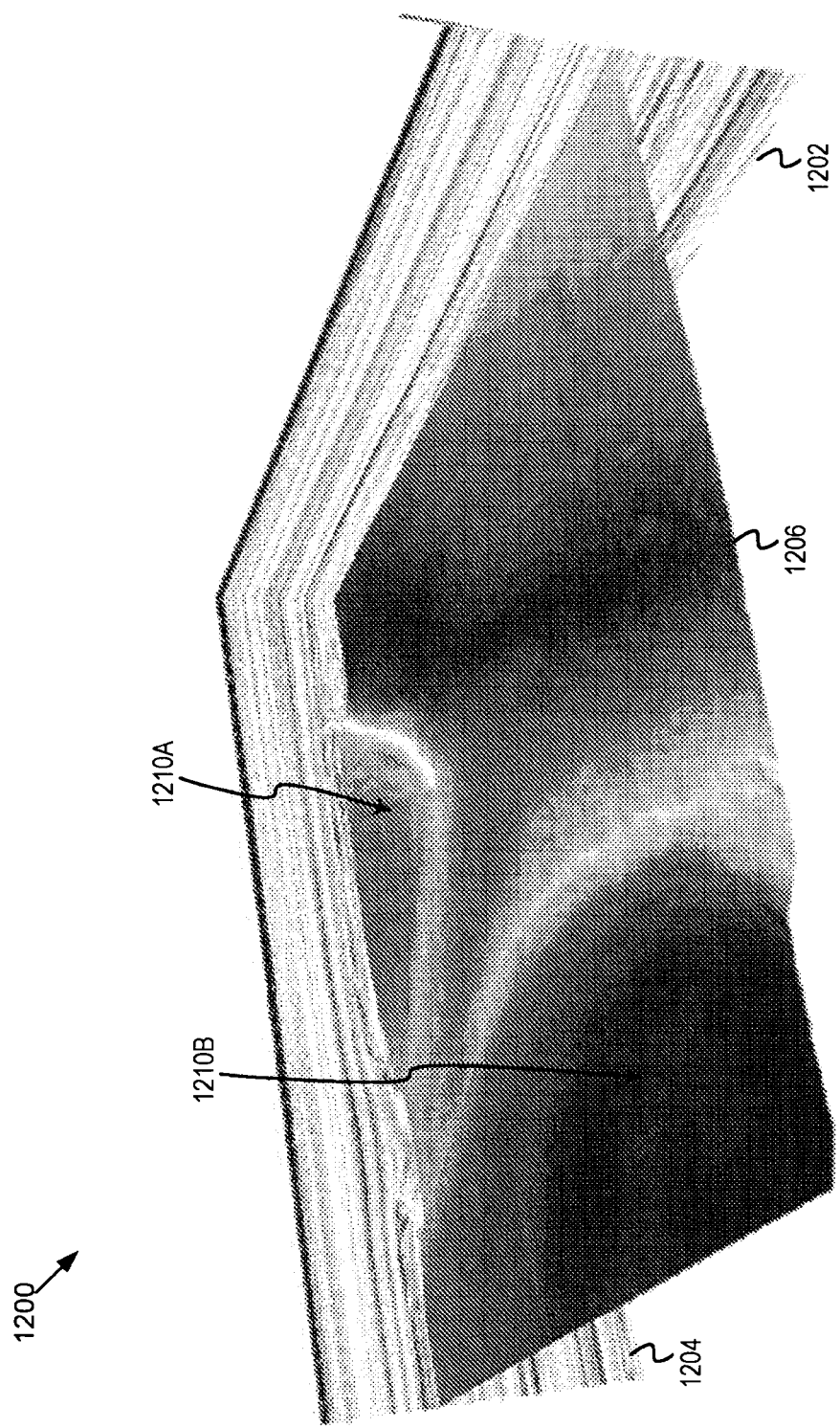
FIGS. 12A and 12B depict example graphs of seismic horizons extracted from three-dimensional (3D) seismic volumes using seismic horizon mapping with multi-scale optimization, according to some embodiments.
Figure 12B:
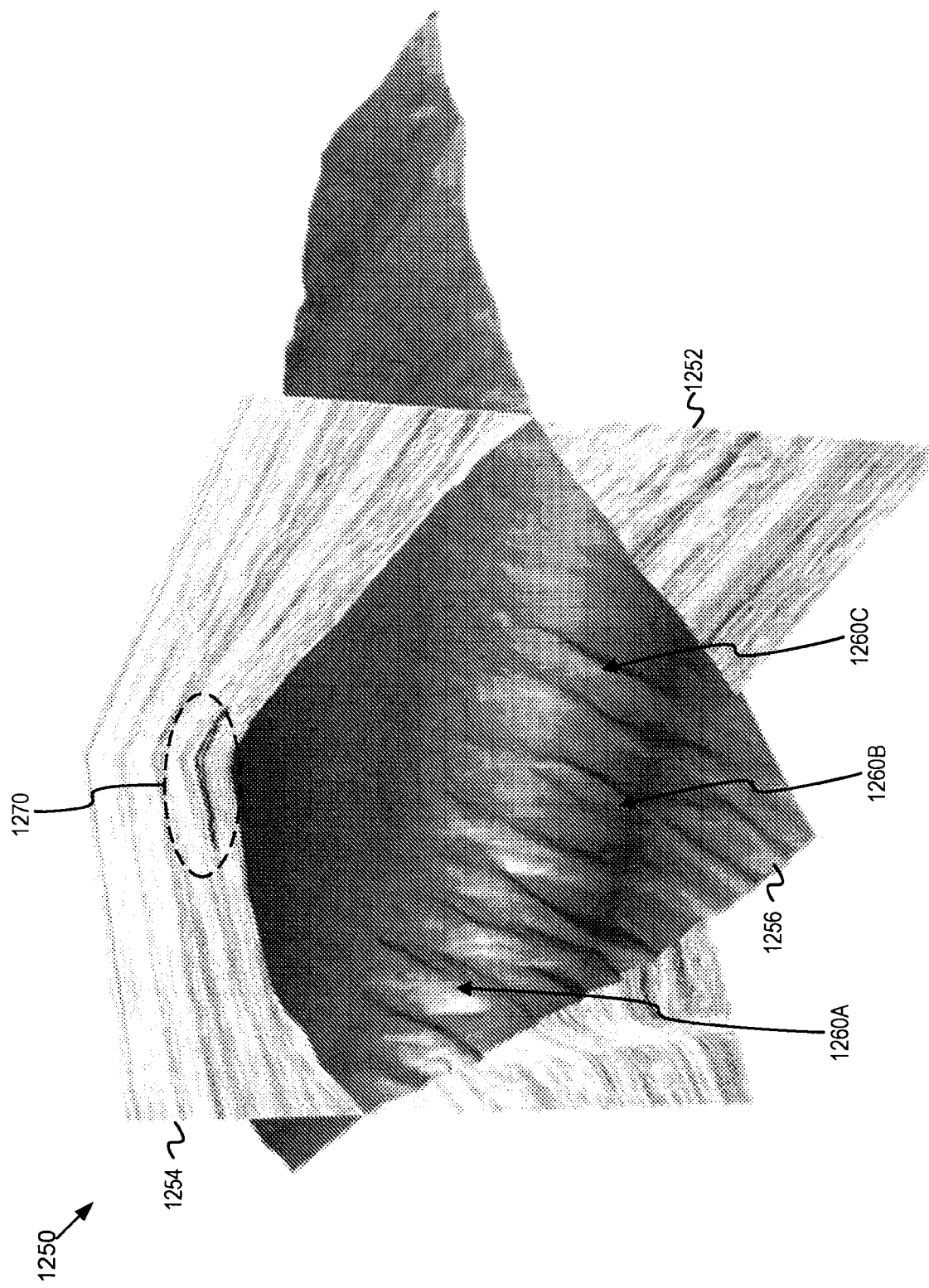

FIGS. 12A and 12B depict example graphs of seismic horizons extracted from three-dimensional (3D) seismic volumes using seismic horizon mapping with multi-scale optimization, according to some embodiments. FIG. 12A depicts 3D graph 1200 containing two orthogonal cross-sectional seismic maps (2D map 1202 and 2D map 1204) for a seismic volume. Each of the 2D maps 1202 and 1204 display seismic intensity as a function of depth and one of the horizontal distances of the seismic volume. In the 2D maps 1202 and 1204, multiple horizons are visible as seismic reflectors. The 3D graph 1200 also displays a 3D projection of a mapped horizon 1206. The mapped horizon 1206 shows the structure of two carbonate build ups present in the seismic volume indicated by arrows 1210A and 1210B.

FIG. 12B depicts 3D graph 1250 containing two orthogonal cross-sectional seismic maps (2D map 1252 and 2D map 1254) for a seismic volume. Each of the 2D maps 1252 and 1254 display seismic intensity as a function of depth and one of the horizontal distances of the seismic volume. In the 2D maps 1252 and 1254, multiple horizons are visible as seismic reflectors-including a very strong reflector indicated by an oval 1270. The 3D graph 1250 also displays a 3D projection of a mapped horizon 1256. The mapped horizon 1256 shows the structure multiple channels incised into a rise of the horizon, as indicated by arrows 1260A, 1260B, and 1260C.

Figure 13:
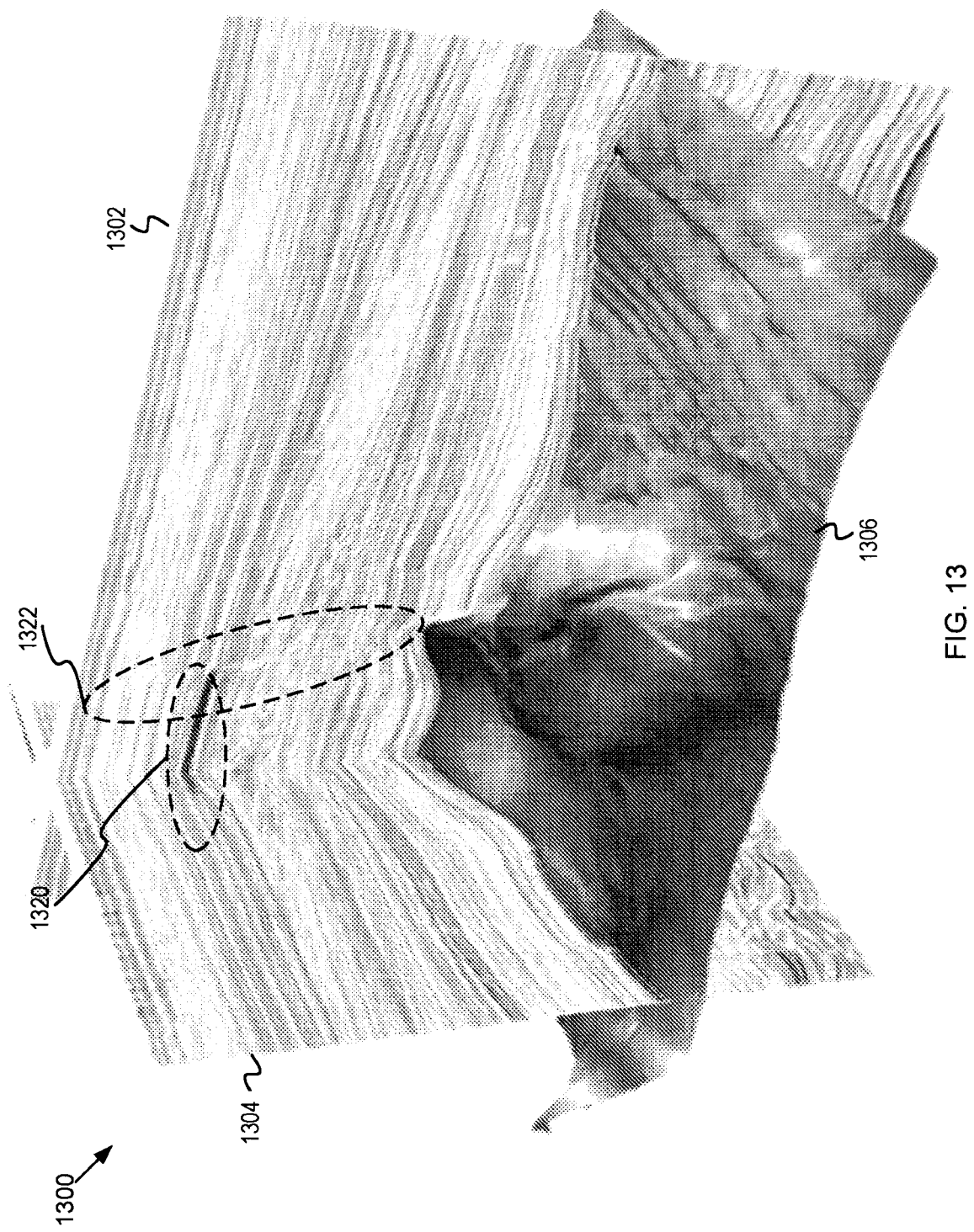
FIG. 13 depicts an example graph of a seismic horizon extract from three-dimensional (3D) seismic volumes using seismic horizon mapping with multi-scale optimization with dynamic time warping based on a single constraint point, according to some embodiments.

FIG. 13 depicts an example graph of a seismic horizon extract from three-dimensional (3D) seismic volumes using seismic horizon mapping with multi-scale optimization with dynamic time warping based on a single constraint point, according to some embodiments. FIG. 13 depicts 3D graph 1300 containing two orthogonal cross-sectional seismic maps (2D map 1302 and 2D map 1304) for a seismic volume. Each of the 2D maps 1302 and 1304 display seismic intensity as a function of depth and one of the horizontal distances of the seismic volume. In the 2D maps 1302 and 1304 multiple horizons are visible as seismic reflectors, including a very strong reflector indicated by an oval 1320. A fault is also visible, where the fault is contained within an oval 1322. The 3D graph 1300 also displays a 3D projection of a mapped horizon 1306. The mapped horizon 1306 displays a large offset across the fault of the oval 1322.

Figure 14A:
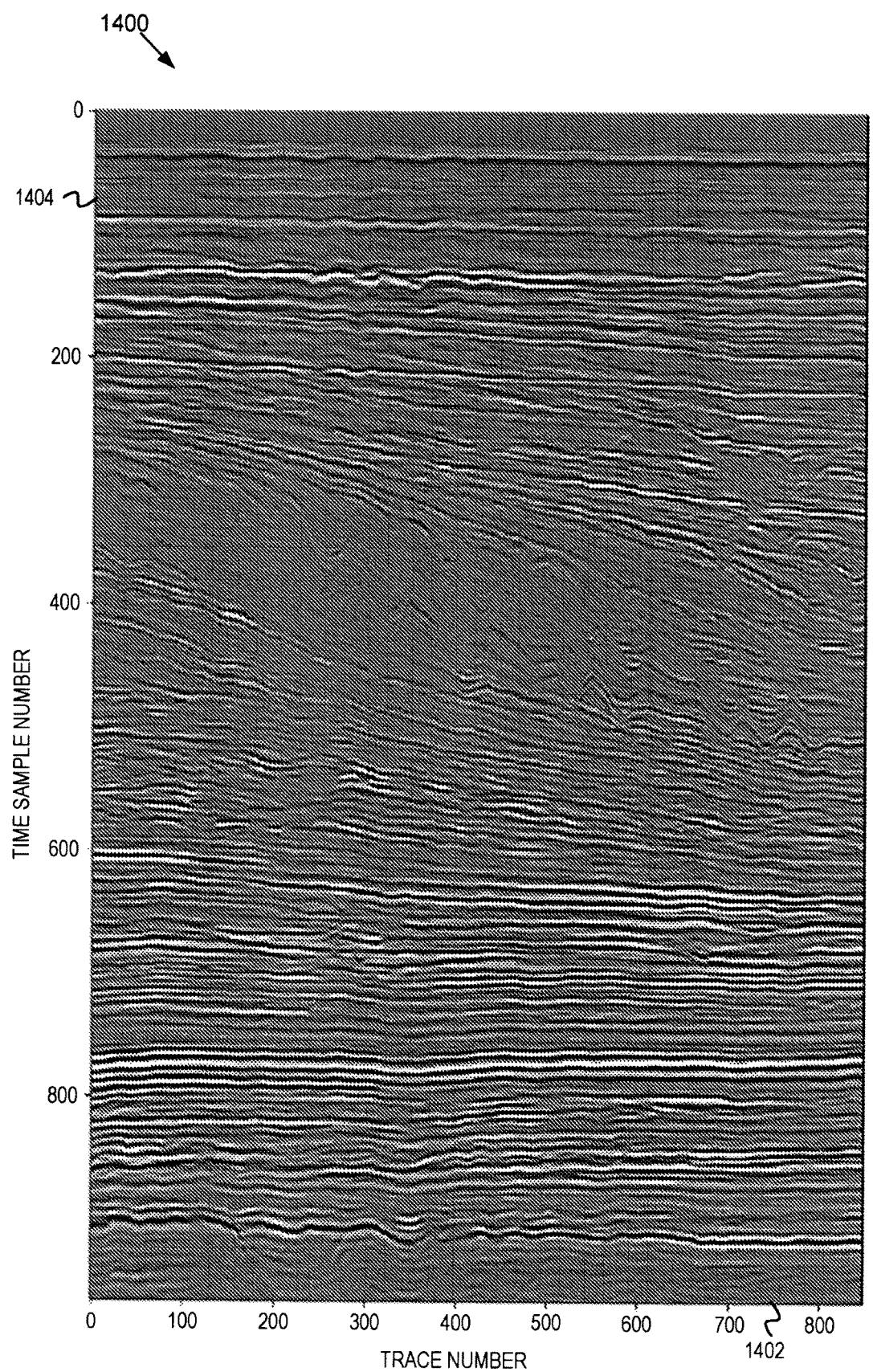
FIGS. 14A-14C depict graphs for generation of an example continuous geological age volume using seismic horizon mapping with multi-scale optimization, according to some embodiments.
Figure 14B:
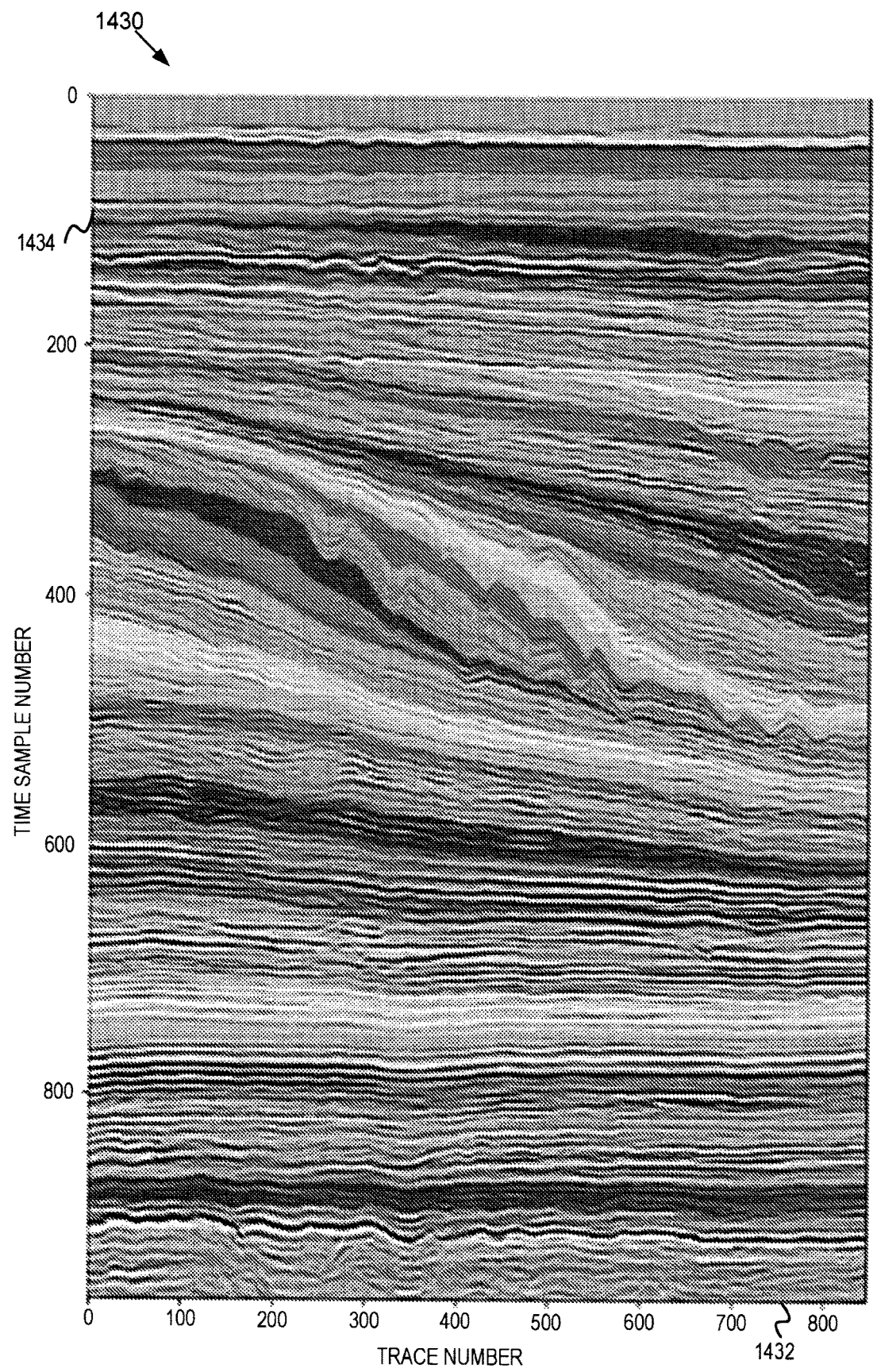
Figure 14C:
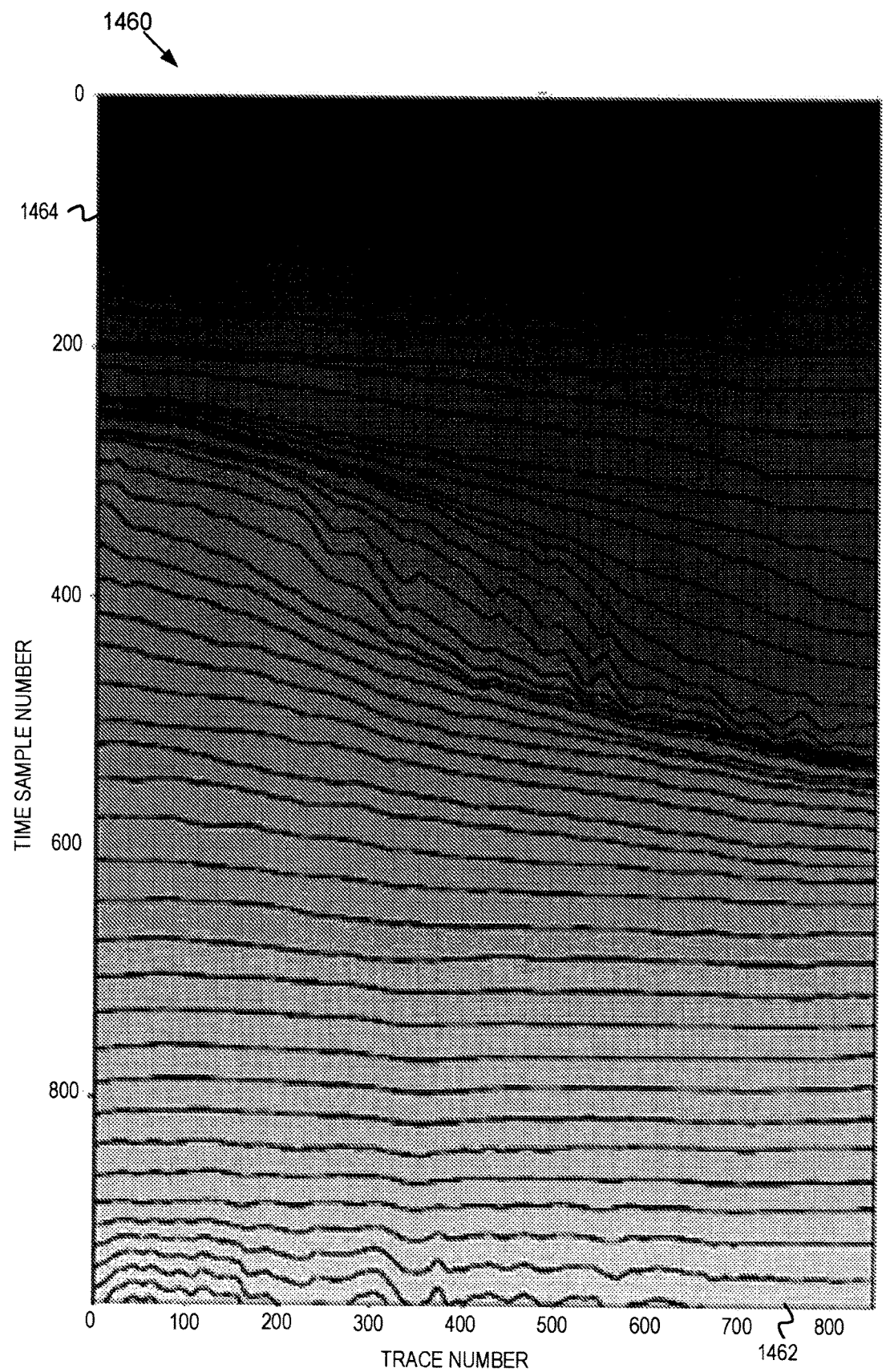

FIGS. 14A-14C depict graphs for generation of an example continuous geological age volume using seismic horizon mapping with multi-scale optimization, according to some embodiments. FIG. 14A depicts a graph 1400 of input seismic data as a function of trace number (along x-axis 1402) along a horizontal direction and as a function of time sample dumber (along y-axis 1404) along the depth direction. The graph 1400 shows input seismic data for a seismic volume. FIG. 14B depicts a graph 1430 of seismic horizons as a function of trace number (along x-axis 1432) along a horizontal direction and as a function of time sample number (along y-axis 1434) along the depth direction. The graph 1430 shows mapped horizons (in various shades of grayscale) for the input seismic data for the seismic volume shown in the graph 1400 of FIG. 14A. FIG. 14C depicts a graph 1460 of continuous geological age as a function of trace number (along x-axis 1462) along a horizontal direction and as a function of time sample dumber (along y-axis 1464) along the depth direction. The graph 1460 shows continuous geological age (in various shades of grayscale) and mapped horizons (as black lines) for the input seismic data for the seismic volume shown in the graph 1400 of FIG. 14A.

Figure 15:
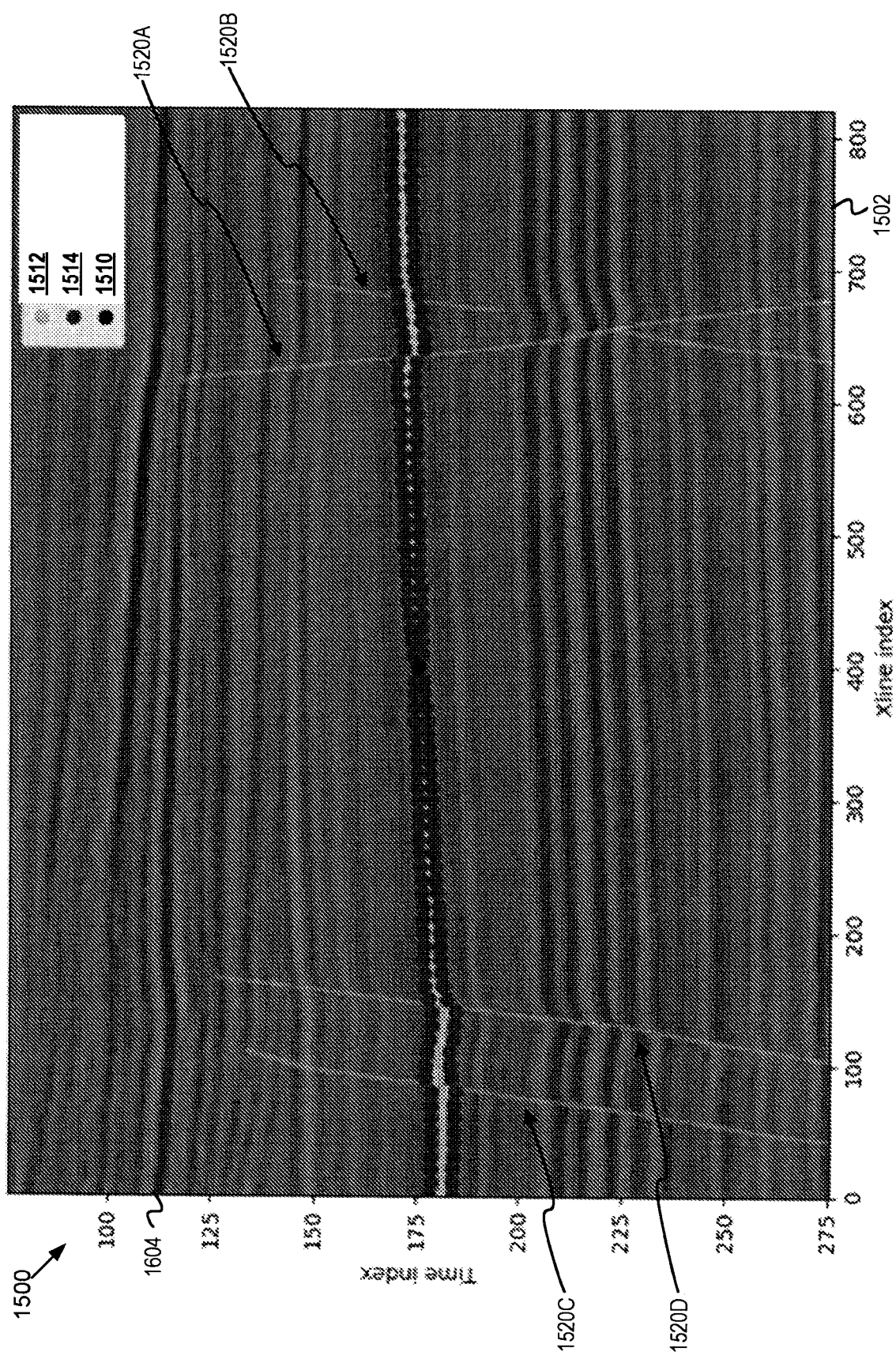
FIG. 15 depicts an example graph of an uncertainty estimate test for a seismic horizon mapped with multi-scale optimization, according to some embodiments.

FIG. 15 depicts an example graph of an uncertainty estimate test for a seismic horizon mapped with multi-scale optimization, according to some embodiments. FIG. 15 depicts a graph 1500 of seismic values for a vertical slice of the seismic volume (i.e., a cross-section with respect to depth). The seismic data is plotted along one horizontal axis as a function of trace number (on x-axis 1502) as x-line index and along the depth axis as a function of time index (on y-axis 1504). The graph 1500 also displays a seed point 1510, a best fit model for a horizon represented by points 1512, and a variance represented by points 1514 at plus or minus two standard deviations (i.e., ±2σ). The graph 1500 shows faults (indicated by arrows 1520A, 1520B, 1520C, and 1520D). The standard deviation in the model uncertainty increases as a function of distance from the seed point, and also for values separated by a fault from the seed point. Generally, the margin of error (or the standard deviation) approximates the horizon even across fault discontinuities.

Example embodiments can include a covariance estimate of uncertainty for a seismic horizon mapped with multi-scale optimization, which are now described. For a linear system of equations given by the relationship shown in Equation 17, below:

$$Ax = B \qquad (17)$$

where A, x, and B are matrices or vectors, a generalized solution can be given by Equation 18, below:

$$x = (A'C_B^{-1}A)^{-1}(A'C_B^{-1}A) \qquad (18)$$

where $C_B$ is the covariance matrix of uncertainties of B. The model uncertainties for Eq. 5 can then be estimated using the covariance matrix, where an example is given by Equation 19, below:

$$C_x = (A'C_B^{-1}WA)^{-1} \qquad (19)$$

where $C_x$ covariance matrix of x. Then the variance of the model parameters can be given by the diagonal elements of the covariance matrix, following Equation 20, below:

$$\sigma_x^2 = [C_x]_{ii} \qquad (20)$$

where $\sigma_x^2$ is the variance and $[C_x]_{ii}$ is the $i^{th}$ diagonal element of the matrix $C_x$.

Figure 16:
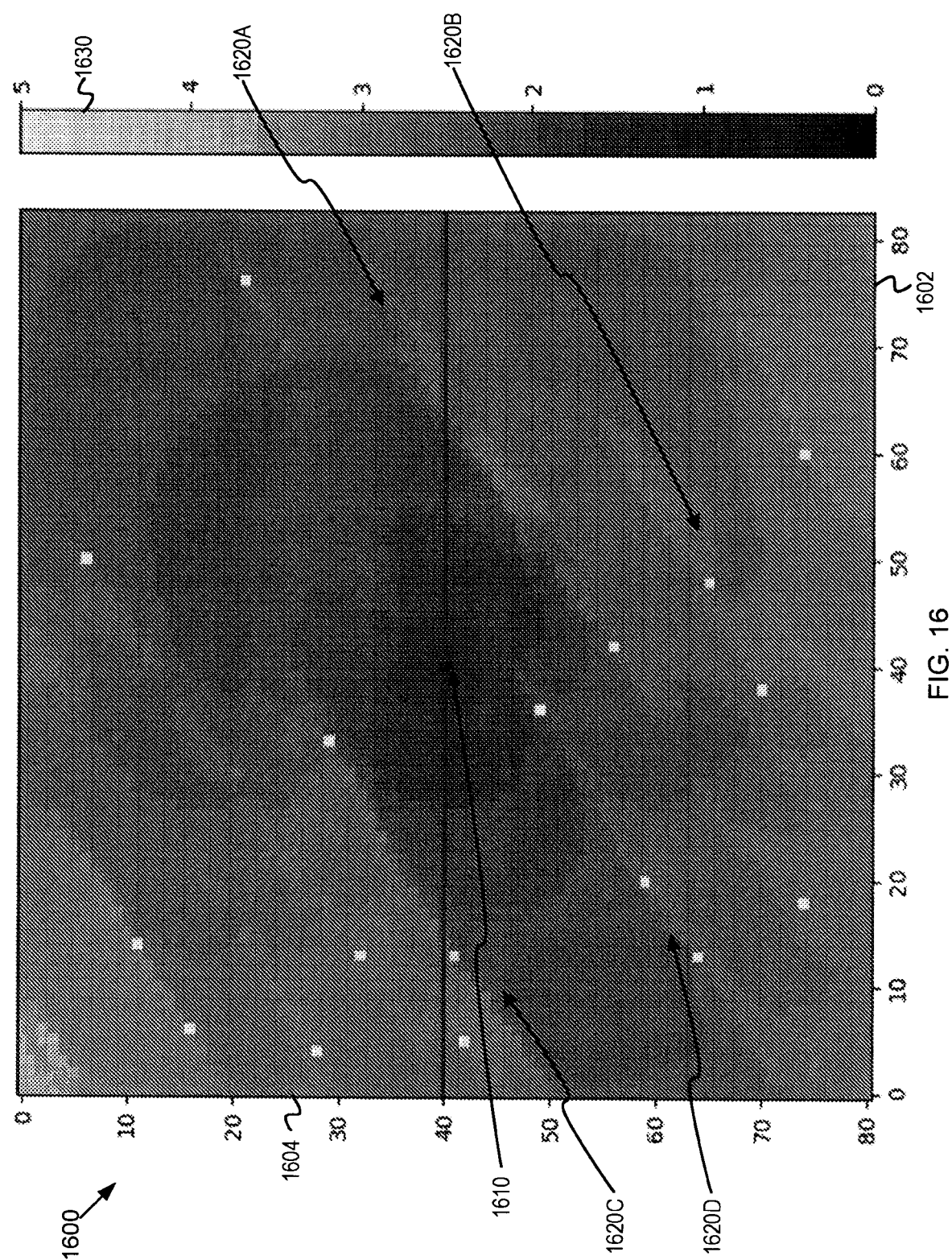
FIG. 16 depicts an example graph of values of a covariance estimate of uncertainty for a seismic horizon mapped with multi-scale optimization, according to some embodiments.

FIG. 16 depicts an example graph of values of a covariance estimate of uncertainty for a seismic horizon mapped with multi-scale optimization, according to some embodiments. FIG. 16 depicts a graph 1600 of covariance values as a function of the horizontal locations within the seismic volume for the horizon mapped in the graph 1500 of FIG. 15. The seismic data is plotted along one horizontal axis as a function of trace number (on x-axis 1602) and along another horizontal axis as a function of trace number (on y-axis 1604). The graph 1600 also displays a seed point 1610. The value of the covariance estimate is given by the shading as represented on legend 1630. The graph 1600 shows jumps in the value of the covariance which indicate faults, where fault artifacts are indicated by arrows 1620A, 1620B, 1620C, and 1620D. The value of the covariance estimate increases as a function of distance from the seed point, and also for values separated by a fault from the seed point. Generally, the value of the covariance estimate remains small even across fault discontinuities.

Example Applications

Figure 17:
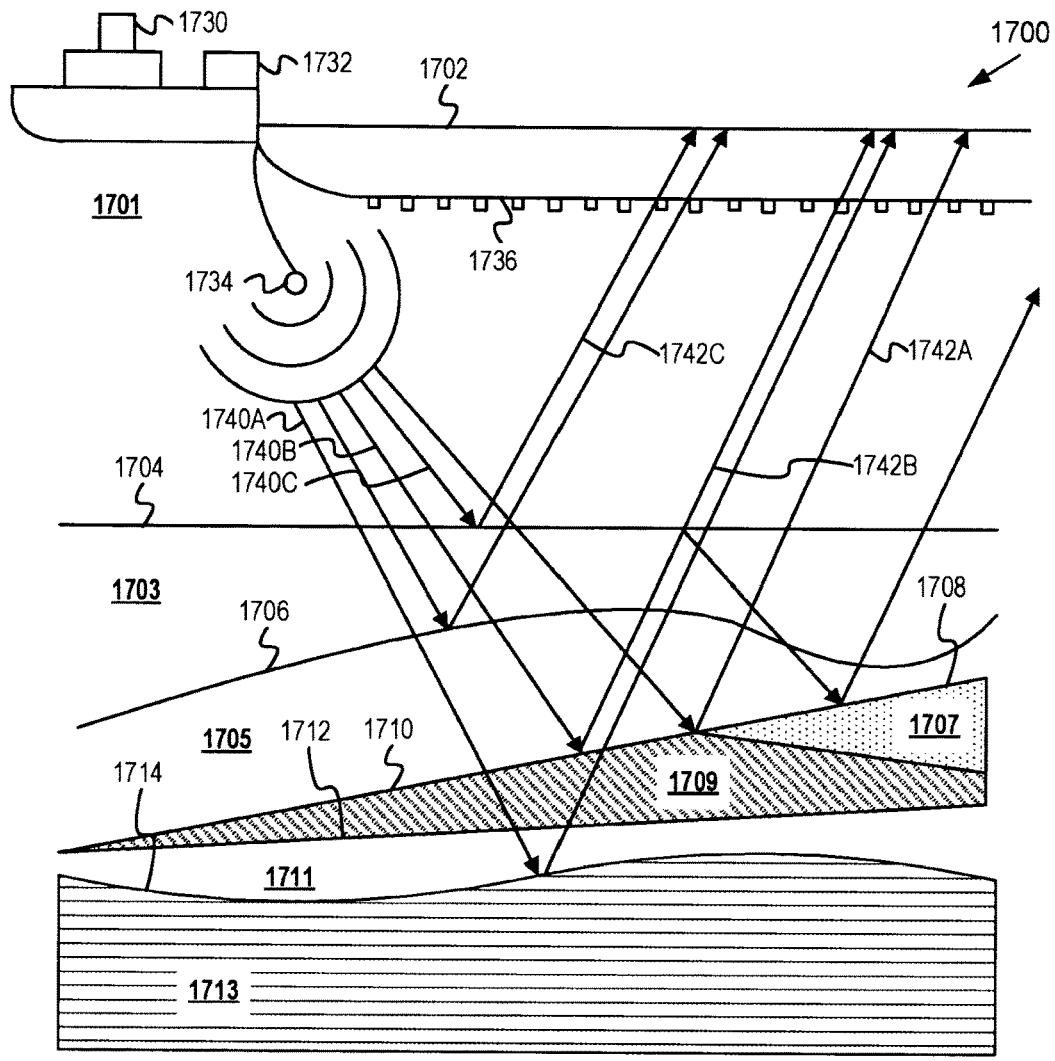
FIG. 17 depicts a schematic diagram of an example subsea seismic survey system, according to some embodiments.

FIG. 17 depicts a schematic diagram of an example subsea seismic survey system, according to some embodiments. FIG. 17 depicts a schematic diagram 1700 of an elevation view of a typical marine seismic survey that can be used to generate seismic measurements for a seismic volume.

A body of water 1701 over the first geological layer 1703 is bounded at a water surface 1702 by a water-air interface and at a water bottom 1704 by a water-earth interface. Beneath the water bottom 1704 is a first geological layer 1703. Beneath the first geological layer 1703 is a second geological layer 1705 with an upper layer 1706, a geological layer containing gas 1707 with an upper interface 1708, a geological layer containing oil 1709 with an upper interface 1710, a third geological layer 1711 with an upper layer 1712, and a geological layer containing oil sands 1713 with an upper interface 1714. A seismic vessel 1730 travels on the water surface 1702 and contains seismic acquisition control equipment 1732. The seismic acquisition control equipment 1732 includes navigation control, seismic source control, seismic sensor control, and recording equipment.

The seismic acquisition control equipment 1732 includes a seismic source 1734 to actuate at selected times. In response, the seismic source 1734 emits seismic waves. Seismic streamers 1736 contain seismic sensors to detect the reflected waves initiated by the seismic source 1734 and reflected from interfaces in the environment. The seismic streamers 1736 can contain seismic sensors such as hydrophones and/or water particle motion sensors such as geophones. The hydrophones and geophones are typically co-located in pairs or pairs of sensor arrays at regular intervals along the seismic streamers 1736.

The seismic source 1734 is activated at periodic intervals to emit seismic waves in the vicinity of seismic streamers 1736 with the hydrophones and the geophones. Each time the seismic source 1734 is actuated, an acoustic/seismic wave travels upwardly or downwardly in spherically expanding wave fronts. The traveling waves will be illustrated by ray paths normal to the expanding wave fronts. The downwardly traveling wave from the seismic source 1734 traveling along a ray path (i.e., ray paths 1740A, 1740B, 1740C) will reflect off one of the water bottom 1704, the upper layers 1706, 1712, and the upper interfaces 1708, 1710, 1714 and then travel upwardly along ray path (i.e. ray paths 1742A, 1742B, 1742C), where the wave can be detected by the hydrophones and geophones of the seismic streamers 1736. Such a reflection contains information about the various layers under the water bottom 1704 and can be retained for further processing. Additionally, the downwardly traveling wave traveling along ray path (i.e., the ray paths 1742A, 1742B, 1742C) can transmit through the water bottom 1704 and travel along ray path before reflecting off a layer boundary (i.e., the upper layers 1706, 1712, and the upper interfaces 1708, 1710, 1714). A wave reflected thus can then travel upward until it is detected by the hydrophones and geophones. Such a reflection can contain useful information about subterranean formations of interest that can be used to generate seismic measurements.

In addition, a portion of the wave traveling upwardly can be reflected by the water bottom 1704 and travel downward, and so on and so forth as the waves can be both transmitted and reflected by various boundaries. The measurements made of the waves traveling along multiple ray paths are measurements of seismic multiples, which have reflected off of various boundaries. The measurements of the various seismic waves and reflections can be conglomerated to create a seismic volume.

Figure 18:
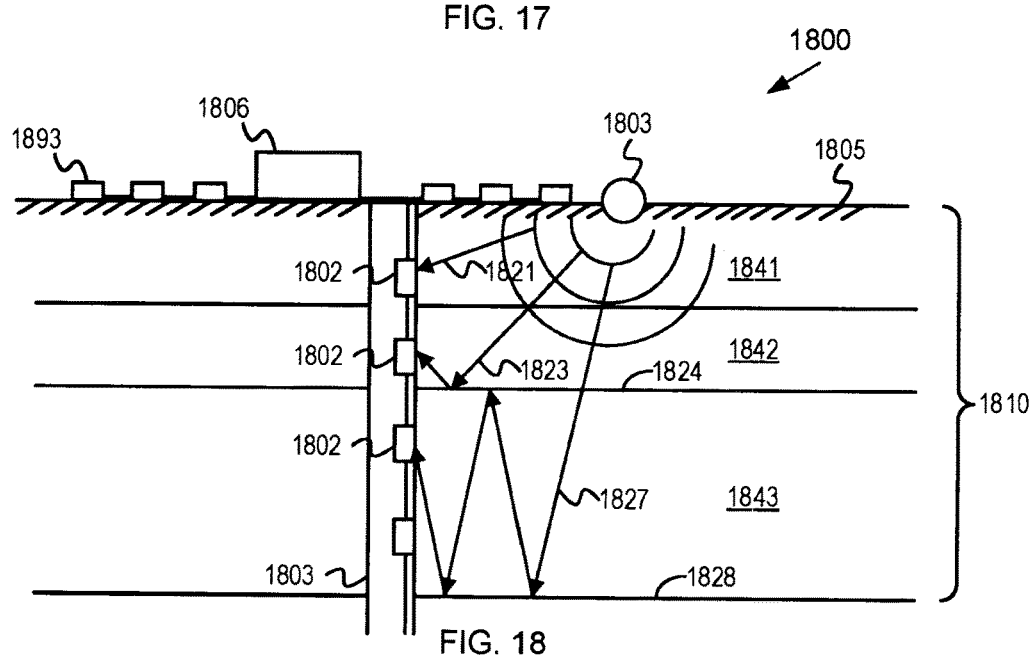
FIG. 18 depicts a schematic diagram of an example wellbore-based seismic survey system, according to some embodiments.

FIG. 18 depicts a schematic diagram of an example wellbore-based seismic survey system, according to some embodiments. FIG. 18 depicts a schematic diagram 1800 of an onshore borehole seismic survey environment. Subsurface seismic sensors 1802 are in a spaced-apart arrangement within a borehole 1803 to detect seismic waves. The subsurface seismic sensors 1802 can be fixed in place by anchors to facilitate sensing seismic waves. In other embodiments, the subsurface seismic sensors 1802 can be attached to or integrated into a tubing (e.g. well casing or drill pipe), part of a logging-while-drilling (LWD) tool string, part of a bottomhole assembly, incorporated into a wireline logging tool, or attached to a wireline logging tool string. Furthermore, the subsurface seismic sensors 1802 communicate wirelessly or via cable to a data acquisition system 1806 at a surface 1805, where the data acquisition system 1806 receives, processes, and stores seismic measurements collected by the subsurface seismic sensors 1802. In addition, the data acquisition system 1806 can collect seismic measurements from the surface seismic sensors 1893, which are positioned on the surface 1805.

A seismic source 1808 generates a seismic wave which is then measured and added to a set of seismic measurements. The seismic wave propagates through a formation 1810. The formation 1810 includes an upper layer 1841, middle layer 1842, and lower layer 1843. A first seismic wave propagates along the wave trajectory 1821 as a direct wave, which proceeds directly through the upper layer 1841 to the subsurface seismic sensors 1802 without reflection. A second seismic wave propagates along the wave trajectory 1823, which shows a reflection at the interlayer boundary 1824 before arriving at the subsurface seismic sensors 1802. A third seismic wave is a seismic multiple that propagates along the wave trajectory 1827, which travels through the upper layer 1841, middle layer 1842, and lower layer 1843 before being reflected twice off the interlayer boundary 1828 and once off the interlayer boundary 1824 before arriving at the subsurface seismic sensors 1802. Such waves reflect from acoustic impedance discontinuities or boundary layers to reach the subsurface seismic sensors 1802 and are seismic multiples due to the plurality of reflections off of interlayer boundaries. Illustrative discontinuities include faults, boundaries between formation beds, and boundaries between formation fluids. The collected seismic measurements can be considered seismic data and can be used to create a seismic volume.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Example Computer

Figure 19:
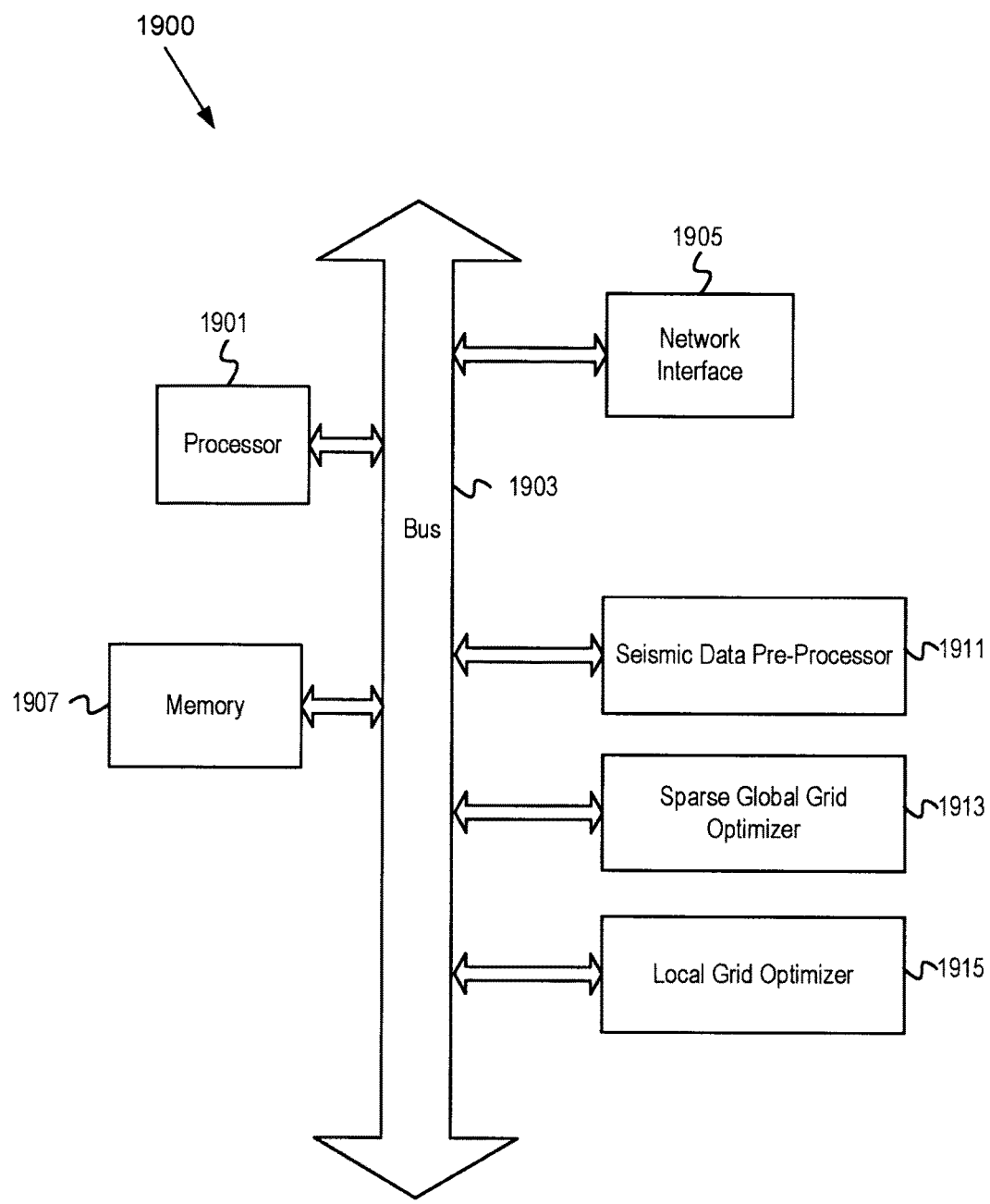
FIG. 19 depicts an example computer, according to some embodiments.

FIG. 19 depicts an example computer, according to some embodiments. FIG. 19 depicts a computer 1900 for seismic horizon mapping with multi-scale optimization. The computer 1900 includes a processor 1901 (possibly including multiple processors, multiple cores, multiple nodes, and/or implementing multi-threading, etc.). The computer 1900 includes memory 1907. The memory 1907 may be system memory or any one or more of the above already described possible realizations of machine-readable media. The computer 1900 also includes a bus 1903 and a network interface 1905. The computer 1900 can communicate via transmissions to and/or from remote devices via the network interface 1905 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.).

The computer 1900 also includes a seismic data pre-processor 1911, a sparse global grid optimizer 1913, and a local grid optimizer 1915 (which can perform the operations described herein). For example, the seismic data pre-processor 1911 can process seismic attributes, including seismic dip, or a seismic volume. The sparse global grid optimizer 1913 can generate a sparse global grid and optimize the sparse global grid for a selected horizon. The local grid optimizer 1915 can optimize a seismic horizon map over one or more local grids. The seismic data pre-processor 1911, the sparse global grid optimizer 1913, and the local grid optimizer 1915 can be in communication. The seismic data pre-processor 1911 can be part of the sparse global grid optimizer 1913. The local grid optimizer 1915 can be part of the sparse global grid optimizer 1913. Any one of the previously described functionalities may be partially (or entirely) implemented in hardware and/or on the processor 1901. For example, the functionality may be implemented with an application specific integrated circuit, in logic implemented in the processor 1901, in a co-processor on a peripheral device or card, etc. Further, realizations may include fewer or additional components not illustrated in FIG. 19 (e.g., video cards, audio cards, additional network interfaces, peripheral devices, etc.). The processor 1901 and the network interface 1905 are coupled to the bus 1903. Although illustrated as being coupled to the bus 1903, the memory 1907 may be coupled to the processor 1901.

While the aspects of the disclosure are described with reference to various implementations and exploitations, it will be understood that these aspects are illustrative and that the scope of the claims is not limited to them. In general, techniques for seismic horizon mapping as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Example Embodiments

Embodiment 1: A method comprising: obtaining seismic data corresponding to a seismic volume that corresponds to a subsurface formation having a horizon; determining a seismic attribute for voxels of the seismic volume; identifying the horizon in the seismic volume; generating a sparse global grid that includes the horizon and that includes a number of points having a depth in the seismic volume; determining a value of the seismic attribute for each point of the sparse global grid based, at least in part, on the seismic attributes of the voxels; adjusting the depth of each point in the sparse global grid based, at least in part, on the value of the seismic attribute for the point; and generating a sparse global map of the horizon based, at least in part, on the adjusted depth of each point.

Embodiment 2: The method of embodiment 1, wherein the number of points included in the sparse global grid is a fraction of a total number of the voxels of the seismic volume.

Embodiment 3: The method of embodiment 1 or 2, wherein determining a value of the seismic attribute for each point of the sparse global grid comprises determining a value of the seismic attribute for each point based, at least in part, on the value of the seismic attribute for the voxels between each point and is respective neighboring points.

Embodiment 4: The method of any one of embodiments 1 to 3, wherein identifying the horizon in the seismic volume comprises determining a constraint point, wherein the constraint point lies on the horizon and wherein the sparse global grid includes the constraint point.

Embodiment 5: The method of any one of embodiments 1 to 4, wherein adjusting the depth of each point in the sparse global grid based, at least in part, on the value of the seismic attribute for the point comprises: generating an objective function based, at least in part, on the depth of each point in the sparse global grid and the value of the seismic attribute for each point; and minimizing a value of the objective function, wherein minimizing a value of the objective function comprises, adjusting the depth of each point; determining a value of the objective function based, at least in part, on the adjusted depth of each point and the value of the seismic attribute for each point at the adjusted depth; and determining if the value of the objective function is smaller than a threshold; based on a determination that the value of the objective function is not smaller than the threshold, iteratively the adjusting of the depth of each point; and based on a determination that the value of the objective function is smaller than the threshold, generating the sparse global map based, at least in part, on the adjusted depth of each point.

Embodiment 6: The method of embodiment 5, wherein minimizing the value of the objective function further comprises minimizing the value of the objective function based on a least mean square algorithm.

Embodiment 7: The method of any one of embodiments 1 to 6, wherein the seismic attribute is seismic dip.

Embodiment 8: The method of any one of embodiments 1 to 7, wherein determining a seismic attribute for voxels of the seismic volume comprises determining the seismic attribute and at least one additional seismic attribute for voxels of the seismic volume, wherein determining a value of the seismic attribute for each point of the sparse global grid comprises determining a value of the seismic attribute and a value of the at least one additional seismic attribute for each point of the sparse global grid, and wherein adjusting the depth of each point in the sparse global grid comprises adjusting the depth based, at least in part, on the value of the seismic attribute and the value of the at least one additional seismic attribute for the point.

Embodiment 9: The method of any one of embodiments 1 to 8, wherein determining the value of the seismic attribute for each point of the sparse global grid comprises determining the value of the seismic attribute by dynamic time warping.

Embodiment 10: The method of embodiment 9, wherein the seismic attribute is a seismic offset.

Embodiment 11: The method of any one of embodiments 1 to 10, further comprising: selecting multiple points of the sparse global grid; generating a local grid for a portion of the horizon based, at least in part, on the selected points of the sparse global grid; wherein the local grid includes a number of points having a depth in the seismic volume; wherein the number of points included in the local grid is equal to a number of voxels included in the portion of the horizon; adjusting the depth of each point of the local grid based, at least in part, on the value of the seismic attribute for the voxels; and generating a local map of the portion of the horizon based, at least in part, on the adjusted depth of each point.

Embodiment 12: The method of embodiment 11, further comprising: joining the local map of the portion of the horizon to the sparse global map of the horizon based, at least in part, on the selected points of the sparse global grid.

Embodiment 13: The method of any one of embodiments 1 to 10, further comprising: dividing the sparse global grid into a plurality of local grids, wherein each of the plurality of local grids includes multiple points of the sparse global grid and a number of points having a depth in the seismic volume; wherein the number of points included in each of the plurality of the local grids is equal to a number of voxels included in a portion of the horizon corresponding to the included multiple points of the sparse global grid; adjusting the depth of each point of the plurality of local grids based, at least in part, on the value of the seismic attribute for the voxels; and generating a plurality of local maps of the horizon based, at least in part, on the adjusted depth of each point.

Embodiment 14: The method of embodiment 13, further comprising: joining the plurality of local maps to form a global map of the horizon.

Embodiment 15: The method of any one of embodiments 1 to 14, further comprising: identifying a second horizon in the seismic volume; generating a second sparse global grid that includes the second horizon and that includes a number of points having a depth in the seismic volume; determining a value of the seismic attribute for each point of the second sparse global grid based, at least in part, on the seismic attributes of the voxels; constraining the depth of each point in the second sparse global grid based, at least in part, on the sparse global map of the horizon; adjusting the depth of each point in the second sparse global grid based, at least in part, on the value of the seismic attribute for the point; generating a sparse global map of the second horizon based, at least in part, on the adjusted depth of each point; and generating a map of multiple horizons of the seismic volume based, at least in part, on the sparse global map of the horizon and the sparse global map of the second horizon.

Embodiment 16: The method of embodiment 15, further comprising: identifying a third horizon in the seismic volume; generating a third sparse global grid that includes the third horizon and that includes a number of points having a depth in the seismic volume; determining a value of the seismic attribute for each point of the third sparse global grid based, at least in part, on the seismic attributes of the voxels; constraining the depth of each point in the third sparse global grid based, at least in part, on the sparse global map of the horizon and the sparse global map of the second horizon; adjusting the depth of each point in the third sparse global grid based, at least in part, on the value of the seismic attribute for the point; generating a sparse global map of the third horizon based, at least in part, on the adjusted depth of each point; and generating a map of multiple horizons of the seismic volume based, at least in part, on the sparse global map of the horizon, the sparse global map of the second horizon, and the sparse global map of the third horizon.

Embodiment 17: The method of embodiment 16, wherein constraining the depth of each point in the third sparse global grid comprises constraining the depth of each point in the third sparse global grid between the sparse global map of the horizon and the sparse global map of the second horizon.

Embodiment 18: The method of any one of embodiments 1 to 17, further comprising: determining an estimate of uncertainty based, at least in part, on the sparse global map of the horizon.

Embodiment 19: The method of embodiment 18, wherein determining the estimate of uncertainty comprises determining a covariance matrix based, at least in part, on the value of the seismic attribute for each point of the sparse global grid.

Embodiment 20: The method of any one of embodiments 1 to 19, further comprising: controlling at least one of a subsurface formation operation based on the sparse global map of the horizon.

Embodiment 21: A non-transitory, machine-readable medium having instructions stored thereon that are executable by a computing device to perform operations comprising instructions to: obtain seismic data corresponding to a seismic volume of a subsurface formation having a horizon; determine a seismic attribute for voxels of the seismic volume; identify the horizon in the seismic volume; generate a sparse global grid that includes the horizon and that includes a number of points having a depth in the seismic volume; determine a value of the seismic attribute for each point of the sparse global grid based, at least in part, on the seismic attributes of the voxels; adjust the depth of each point in the sparse global grid based, at least in part, on the value of the seismic attribute for the point; and generate a sparse global map of the horizon based, at least in part, on the adjusted depth of each point.

Embodiment 22: The non-transitory, machine-readable medium of embodiment 21, wherein instruction to identify the horizon in the seismic volume comprises instruction to determine a constraint point, wherein the constraint point lies on the horizon and wherein the sparse global grid includes the constraint point.

Embodiment 23: The non-transitory, machine-readable medium of embodiment 21 or 22, wherein instruction to adjust the depth of each point in the sparse global grid based, at least in part, on the value of the seismic attribute for the point comprise instruction to: generate an objective function based, at least in part, on the depth of each point in the sparse global grid and the value of the seismic attribute for each point; and iteratively minimize a value of the objective function, wherein instruction to minimize a value of the objective function comprise instruction to, adjust the depth of each point; determine a value of the objective function based, at least in part, on the adjusted depth of each point and the value of the seismic attribute for each point at the adjusted depth; and determine if the value of the objective function is smaller than a threshold; based on a determination that the value of the objective function is not smaller than the threshold, iteratively minimize the value of the objective function; and based on a determination that the value of the objective function is smaller than the threshold, generate the sparse global map based, at least in part, on the adjusted depth of each point.

Embodiment 24: The non-transitory, machine-readable medium of any one of embodiments 21 to 23, further comprising instruction to: divide the sparse global grid into a plurality of local grids, wherein each of the plurality of local grids includes multiple points of the sparse global grid and a number of points having a depth in the seismic volume; wherein the number of points included in each of the plurality of the local grids is equal to a number of voxels included in a portion of the horizon corresponding to the included multiple points of the sparse global grid; adjust the depth of each point of the plurality of local grids based, at least in part, on the value of the seismic attribute for the voxels; generate a plurality of local maps of the horizon based, at least in part, on the adjusted depth of each point; and join the plurality of local maps to form a global map of the horizon.

Embodiment 25: An apparatus comprising: a processor; and a computer-readable medium having instructions stored thereon that are executable by the processor to cause the apparatus to, obtain seismic data corresponding to a seismic volume of a subsurface formation having a horizon; determine a seismic attribute for voxels of the seismic volume; identify the horizon in the seismic volume; generate a sparse global grid that includes the horizon and that includes a number of points having a depth in the seismic volume; determine a value of the seismic attribute for each point of the sparse global grid based, at least in part, on the seismic attributes of the voxels; adjust the depth of each point in the sparse global grid based, at least in part, on the value of the seismic attribute for the point; and generate a sparse global map of the horizon based, at least in part, on the adjusted depth of each point.

Embodiment 26: The apparatus of embodiment 25, further comprising instruction to: divide the sparse global grid into a plurality of local grids, wherein each of the plurality of local grids includes multiple points of the sparse global grid and a number of points having a depth in the seismic volume; wherein the number of points included in each of the plurality of the local grids is equal to a number of voxels included in a portion of the horizon corresponding to the included multiple points of the sparse global grid; adjust the depth of each point of the plurality of local grids based, at least in part, on the value of the seismic attribute for the voxels; generate a plurality of local maps of the horizon based, at least in part, on the adjusted depth of each point; and join the plurality of local maps to form a global map of the horizon.

Embodiment 27: The apparatus of embodiment 25 or 26, further comprising instruction to: identify a second horizon in the seismic volume; generate a second sparse global grid that includes the second horizon and that includes a number of points having a depth in the seismic volume, and wherein the global map of the horizon acts as a constraint on the depth of each point of the second sparse global grid; determine a value of the seismic attribute for each point of the second sparse global grid based, at least in part, on the seismic attributes of the voxels; adjust the depth of each point in the second sparse global grid based, at least in part, on the value of the seismic attribute for the point; generate a sparse global map of the second horizon based, at least in part, on the adjusted depth of each point; and generate a map of multiple horizons of the seismic volume based, at least in part, on the sparse global map of the horizon and the sparse global map of the second horizon.

Embodiment 28: The apparatus of embodiment 27, further comprising instruction to: identify a third horizon in the seismic volume; generate a third sparse global grid that includes the third horizon and that includes a number of points having a depth in the seismic volume, and wherein the global map of the horizon and the global map of the second horizon act as constraints on the depth of each point of the third sparse global grid; determine a value of the seismic attribute for each point of the third sparse global grid based, at least in part, on the seismic attributes of the voxels; adjust the depth of each point in the third sparse global grid based, at least in part, on the value of the seismic attribute for the point; generate a sparse global map of the third horizon based, at least in part, on the adjusted depth of each point; and generate a map of multiple horizons of the seismic volume based, at least in part, on the sparse global map of the horizon, the sparse global map of the second horizon, and the sparse global map of the third horizon.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Processing Seismic Data in Graph Format

Figure 20:
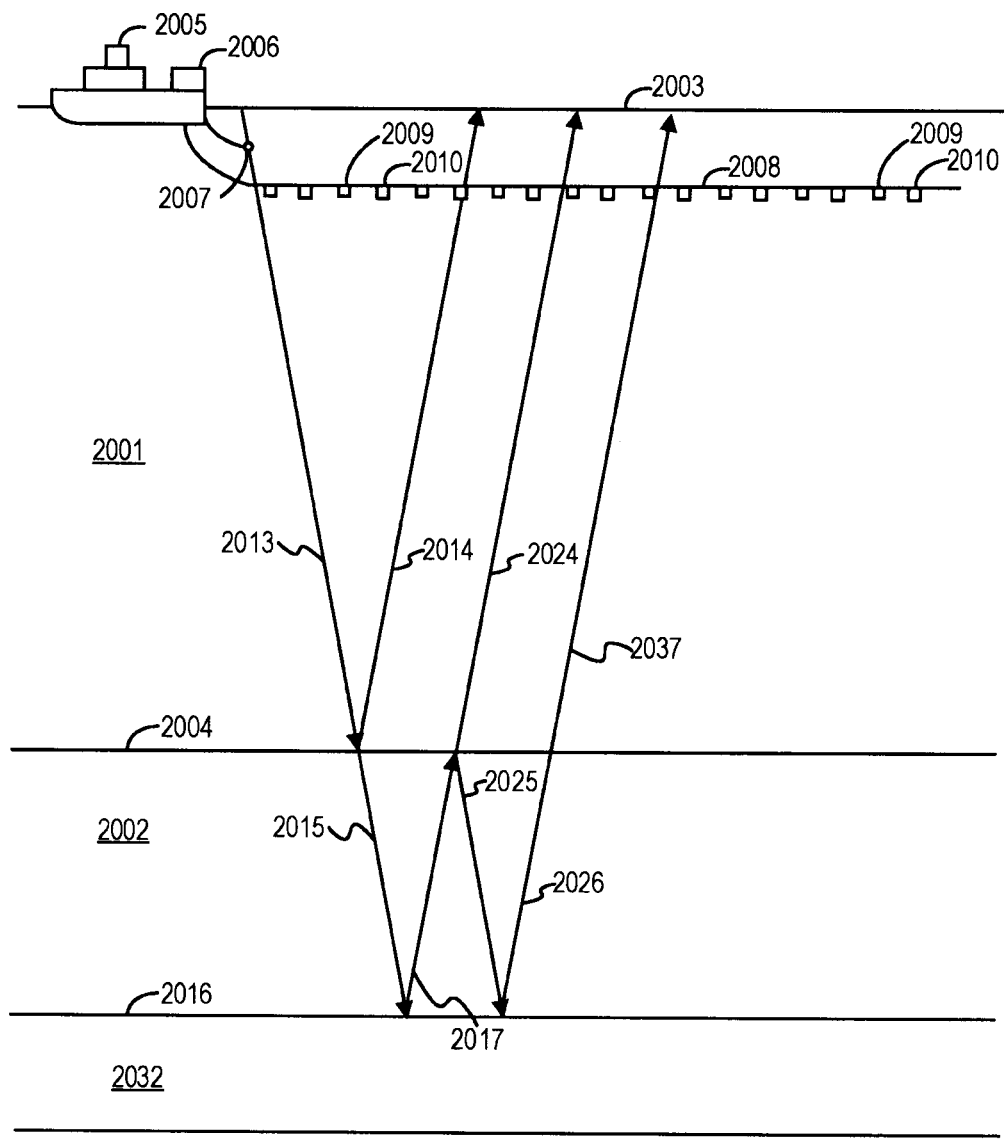
FIG. 20 depicts an example seismic data system, according to some embodiments.

FIG. 20 depicts an example seismic data system, according to some embodiments. A body of water 2001 over a first geological layer 2002 is bounded at a water surface 2003 by a water-air interface and at a water bottom 2004 by a water-earth interface. Beneath the water bottom 2004 is a subsurface formation that may include one or more formation layers such as first geological layer 2002 and second geological layer 2032. A seismic vessel 2005 located on the water surface 2003 and contains seismic data system 2006. The seismic data system 2006 may include a seismic data processor, navigation control, seismic source control, seismic sensor control, and recording equipment.

The seismic data system 2006 may include a seismic source 2007 to actuate at selected times. In response, the seismic source 2007 emits seismic waves. Seismic streamers 2008 contain seismic sensors to detect the reflected waves initiated by the seismic source 2007 and reflected from interfaces in the environment. The seismic streamers 2008 may contain seismic sensors such as hydrophones 2009 and/or water particle motion sensors such as geophones 2010. The hydrophones 2009 and geophones 2010 are typically co-located in pairs or pairs of sensor arrays at regular intervals along the seismic streamers 2008.

The seismic source 2007 may be activated at periodic intervals to emit seismic waves in the vicinity of the seismic streamers 2008 with the hydrophones 2009 and the geophones 2010. Each time the seismic source 2007 is actuated, an acoustic/seismic wave may travel upwardly or downwardly in spherically expanding wave fronts. In this example system, the traveling waves are depicted as ray paths normal to the expanding wave fronts. The downwardly traveling wave from the seismic source 2007 traveling along a ray path 2013 may reflect off the earth-water interface at the water bottom 2004 and then travel upwardly along ray path 2014, where the wave may be detected by the hydrophones 2009 and geophones 2010. Such a reflection at the water bottom 2004, as in ray path 2014, may contain information about the water bottom 2004 and hence may be retained for further processing. Additionally, the downwardly traveling wave traveling along ray path 2013 may transmit through the water bottom 2004 and travel along ray path 2015 before reflecting off a layer boundary 2016 (i.e., horizon). This wave may then travel upwardly along ray path 2017, transmit through the water bottom 2004, and travels upwardly along ray path 2024 until it is detected by the hydrophones 2009 and geophones 2010. The reflection detected by the hydrophones 2009 and geophones 2010 may be represented as one or more seismic traces. Seismic traces may contain useful information about the first geological layer 2002. The traces of the waves traveling along ray path 2014 and ray path 2024 may traces of primary reflection waves.

In addition, a portion of the wave traveling upwardly along ray path 2017 may be reflected by the water bottom 2004 and travel downwardly along the ray path 2025. The wave traveling downwardly along ray path 2025 may then be reflected by the layer boundary 2016 again, travel upwardly along the ray path 2026 until it transmits through the water bottom 2004, and travel upwardly along the ray path 2037 until it is detected by the hydrophones 2009 and geophones 2010. The reflection detected by the hydrophones 2009 and geophones 2010 may also be represented as one or more seismic traces. The seismic traces of the waves traveling along ray path 2037 may be traces of seismic multiples, which have reflected off of the layer boundary 2016 and the water bottom 2004.

The seismic data (i.e., traces) detected by the hydrophones 2009 and geophones 2010 may be transmitted to the seismic data system 2006. The seismic data processor of the seismic data system 2006 may format the seismic data as one or more graphs. The seismic data processor may perform additional graph-related operations, such as combining two or more graphs, enhance resolution by adding vertices to a graph, etc.

Example diagrams for expressing seismic data in a graph format (which are depicted in FIGS. 21A-21C, 22A-22B, 23, 24A-24C, and 25A-25C) are now described.

Figures 21, 21A, 21B, 21C:
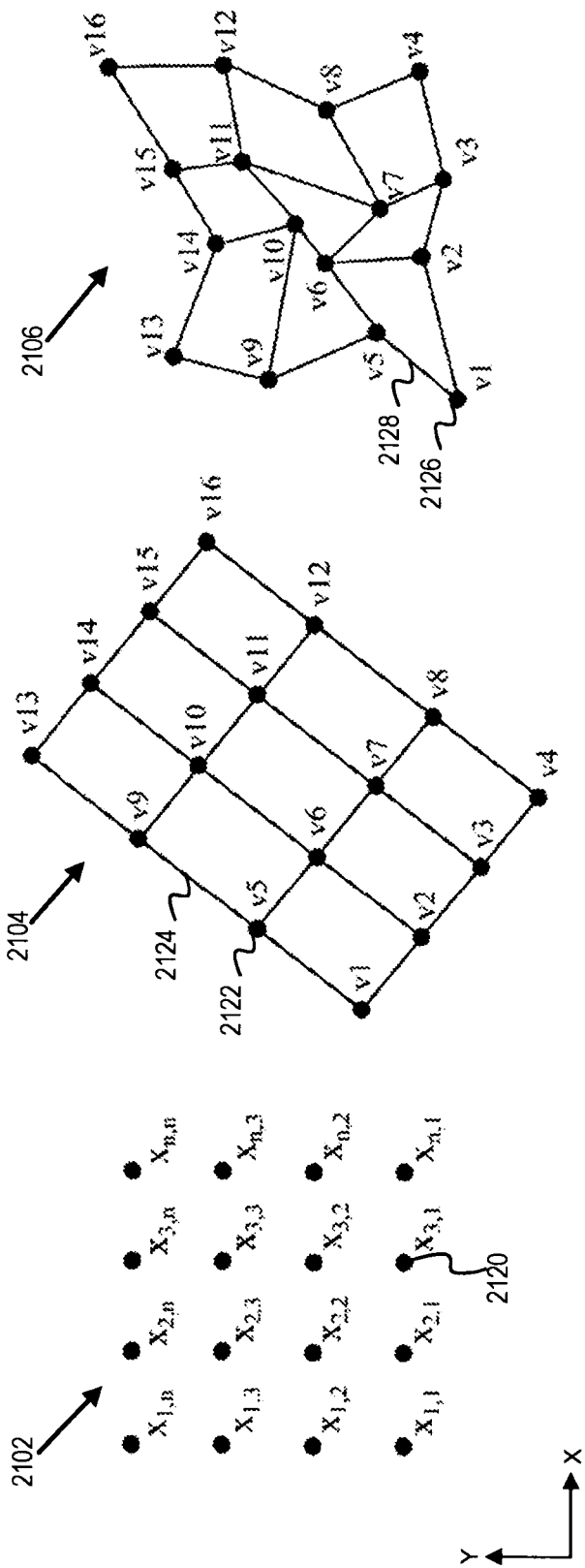
FIGS. 21A-21C depict example diagrams of possible expressions of a seismic data set, according to some embodiments.
Figure 22:
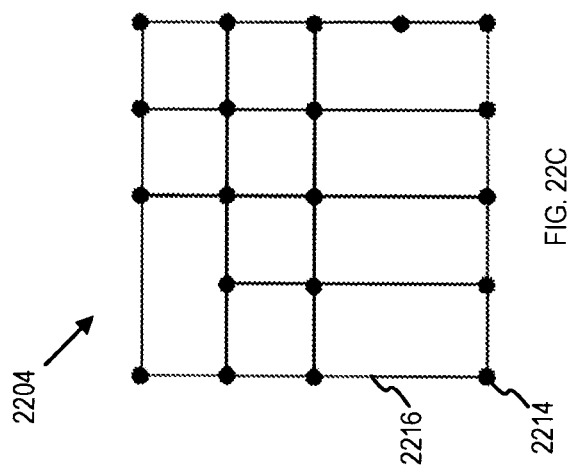
FIGS. 22A-22C depict example diagrams of down sampling seismic data sets, according to some embodiments.
Figure 22:
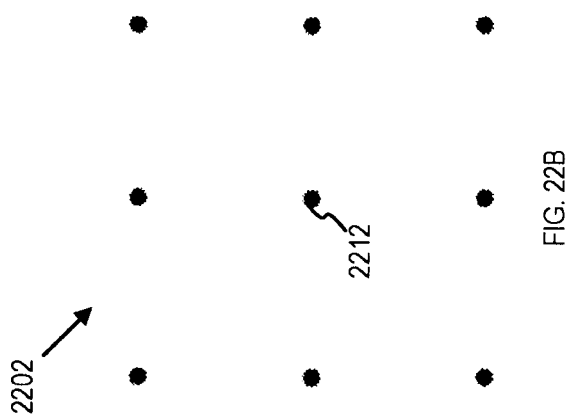
Figure 22:
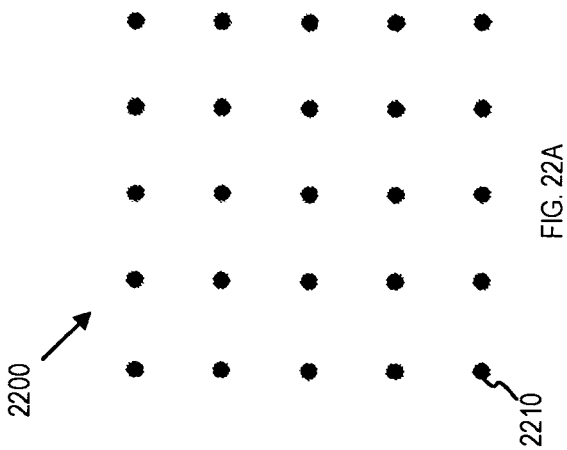

FIGS. 21A-21C depict example diagrams of possible expressions of a seismic data set, according to some embodiments. FIG. 21A depicts a map view of a three dimensional (3D) seismic data set arranged in a grid 2102. In some instances, the seismic data set may be two-dimensional, which may then be arranged in a line. In some instances, the seismic data set may be a post-stack seismic data set. Axes of the grid 2102 may be relative to the seismic survey geometry. For instance, the local coordinate system of the grid 2102 may correspond to the inline and crossline (i.e., Xline) number when the data set was acquired. The x-axis of the grid 2102 may correspond to the inline (i.e., direction parallel to the streamers 2008 of FIG. 20) and the y-axis may correspond to the crossline (i.e., direction normal to the streamers 2008 of FIG. 20). The seismic data set may include traces such as trace 2120. The spatial position of the traces may correspond to the location in the seismic survey where the trace was acquired. In some implementations, the seismic data set in grid 2102 may be processed as a matrix, where the local coordinates of the grid 2102 may be used as the spatial information between the traces. In this process, the relative information about the location of the traces in the subsurface formation may be lost due to the seismic data set having a local coordinate system that is relative to the seismic survey geometry.

FIG. 21B depicts a seismic dataset expressed in a graph format. The seismic data set may be 2D or 3D and may comprise a series of traces. The traces may be expressed as a graph using Equation 21.

$$G(V,E) \qquad (21)$$

Where G represents the graph, V represents the vertices of the graph, and E represents the edges that connect the vertices. The seismic data processor of seismic data system 2006 may perform this operation to express the traces in terms of vertices and edges.

Each trace may have a corresponding location on the Earth's surface. For instance, the location on the Earth's surface may be defined by an x-y coordinate pair. The trace may be formed by n number of points, where each of the n points corresponds with a depth in the subsurface formation. Therefore, the x-y coordinate pair may be associated with the corresponding depths, where each of the depths may be represented by a z-coordinate.

The trace in the seismic data set may be expressed as a vertex (V), such as vertex 2122, and plotted in the graph 2104 with the respective trace location.

In some implementations, the vertex 2122 may represent a trace having a location on the surface at the x-y coordinate pair. The vertex 2122 also may be associated with one or more attributes, such as one or more attributes representing one or more depths associated with the trace. The one or more depths may be represented as z-coordinates that may be combined with the x-y coordinate pair of the vertex 2122. In some embodiments, the attributes (e.g., depths) may be stored in an array or other data structure associated with the vertex 2122. Each of the vertices may have unique attributes (i.e., surface location and depth in the subsurface formation) such that a determination of spatial positions between vertices may be made. For example, two vertices may have similar x coordinates and y coordinates, but different z coordinates, indicating that each respective vertex is at a different depth in the subsurface formation. In some implementations vertices may have similar x coordinates, y coordinates, and z-coordinates. The graph 2104 may not include every trace from the seismic data set. Edges (E) in the graph 2104, such as edge 2124, may connect adjacent vertices. For example, the edge 2124 connects vertices v5 and v9. In some implementations, the edges 2124 may not connect adjacent vertices. There may be more than one edge connected to a vertex. Edges may indicate relative spatial information of the seismic data set such that the true survey geometry is formed by the graph 2104 when the vertices and edges are plotted with their corresponding trace location. The vertices and edges may be associated with other attributes such as vertical difference in depth between two vertices, waveform information, etc.

With a graph constructed comprising of one or more seismic data sets, subsequent workflows may now leverage the data structure. One example being horizon optimization, where a system of equations, which is solved iteratively during the optimization, can be built directly from the graph. Each edge representing an equation to solve and each vertex and parameter to solve for. The system being solved at each iteration can therefore be described in Equation 22.

$$w_i e_i = w_i d_i \qquad (22)$$

Where $w_i$ represents a weighting term used to weight observations when solving the system, and $e_i$ represents an edge connecting two vertices from a seismic data set, which encodes the vertical difference in depth between the two vertices of the horizon surface to be solved for, and $d_i$ is the corresponding observed vertical difference, calculated from the seismic data or seismic attributes, for example seismic dip, based on the current guess at the depth of the vertices on the horizon surface. When $e_i$ is an edge connecting two vertices from different seismic data sets, $d_i$ may incorporate the mis-tie correction between the two seismic data sets at that trace location. $w_i$ is a weighting term allowing the observational data to be weighted accorded to some measure of quality.

Graphs of seismic data sets may have various geometries. For instance, the graph 2104 depicts a rectilinear geometry. In some implementations, the graph geometry may be non-rectilinear. For example, FIG. 21C depicts a seismic dataset expressed in a graph format with a non-rectilinear geometry. Graph 2106 includes vertices, such as vertex 2126, and edges connecting vertices, such as edge 2128. The vertices of graph 2106 are plotted similarly to methods described in FIG. 21B. However, the geometry of graph 2106 may be non-rectilinear due to the trace locations of the vertices.

FIGS. 22A-22C depict example diagrams of down sampling seismic data sets, according to some embodiments. FIG. 22A depicts a grid 2200 of traces, such as trace 2210, from a seismic data set. The grid 2200 is similar to the grid 2102 of FIG. 21. FIG. 22B depicts a sparse grid 2202 made up of traces 2212. The sparse grid 2202 includes the same seismic data set as the seismic data set of FIG. 22A, but down sampled by a factor of two. In some instances, features within the seismic data may be lost using this technique. A seismic data set in graph format may be constructed from any combination of traces from the original seismic data set because the edges may have an arbitrary length. FIG. 22C depicts a graph 2204 of a seismic data set of FIG. 22A, that has been converted to graph format. The graph 2204 is formed by vertices 2214 (representing traces) and edges 2216 connecting the vertices 2214. Traces may be removed from the seismic data set before converting the traces to vertices to down sample the data set. With sparse vertices, edges connecting the vertices still include the relative spatial information between the remaining vertices such that features within the seismic data may not be lost. In some instances, this may be advantageous for global optimization methods, such as horizon optimization, which may be too compute-intensive to run at full seismic resolution. The variable down sampling across the seismic data set may allow the resolution of the seismic data to match the complexity of the seismic data set. For example, FIG. 23B (described below) depicts an example of variable down sampling to match the complexity of the seismic data such that geologic features are captured. Down sampling the seismic data set may include randomly removing traces, down sampling the seismic data set by a factor (i.e., by a factor of 2), removing individual or specific groups of traces based on domain knowledge of the subsurface formation, etc. Down sampling may be done using any adaptive gridding or mesh refinement method which includes, but is not limited, to quadtree/octree gridding and local adaptive mesh refinement.

Figures 23, 23A, 23B:
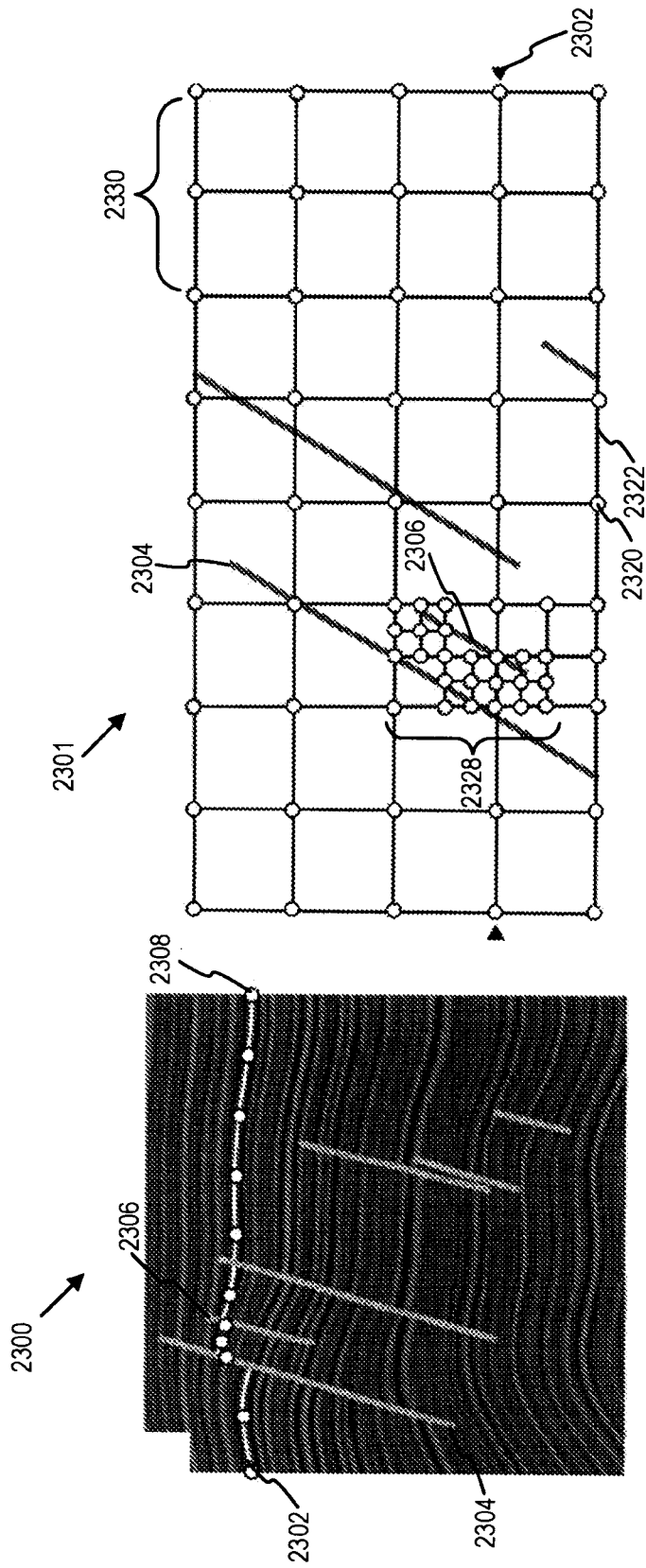
FIGS. 23A-23B depict example diagrams of constructing a graph for a seismic data set, according to some embodiments.

FIGS. 23A-23B depict example diagrams of constructing a graph for a seismic data set, according to some embodiments. FIG. 23A depicts a section of a 3D seismic data set 2300. A horizon 2302 may be identified in the section of the 3D seismic data set 2300, where the 3D seismic data set 2300 is represented with sparse vertices including vertex 2308. Geologic features, such as fault 2304 and fault 2306, may also be seen in the section of the 3D seismic data set 2300. FIG. 23B depicts a graph 2301 of a portion of the 3D seismic data set of FIG. 23A. Ends of a portion of the horizon 2302 of FIG. 23A are identified by arrows on the left and right sides of the graph 2301. Vertices, such as vertex 2320, may be plotted at their corresponding trace location. Edges, such as edge 2322, connect the vertices. The resolution of the graph may be variable to capture geological structures such as folds, faults, reefs, salt, etc. For example, area 2330 of the graph 2301 maybe kept sparse because no geologic structures may be in that area based on domain knowledge of the subsurface formation. Resolution may be increased around an area of interest 2328 by increasing the density of vertices around the area of interest 2328. With a higher resolution, geologic features such as fault 2304 and fault 2306 may be captured.

Figure 24:
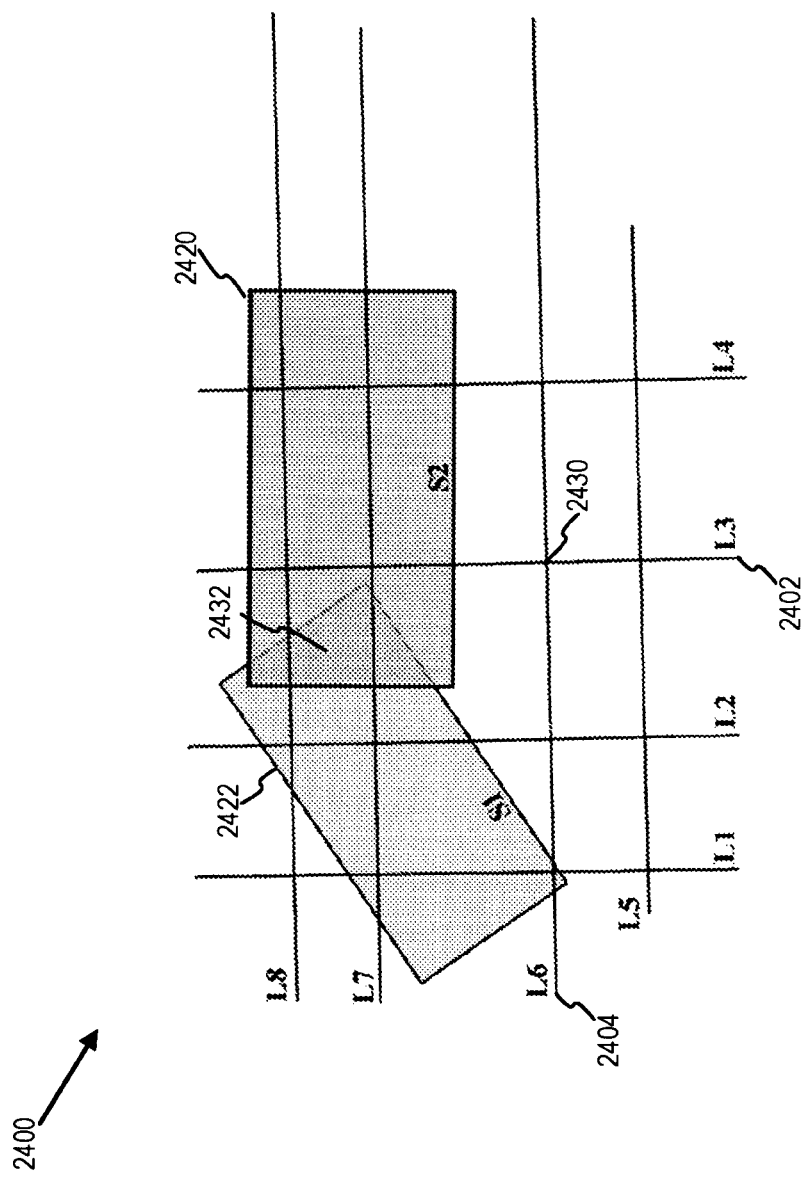
FIG. 24 depicts an example diagram of overlapping seismic data sets, according to some embodiments.
Figure 25:
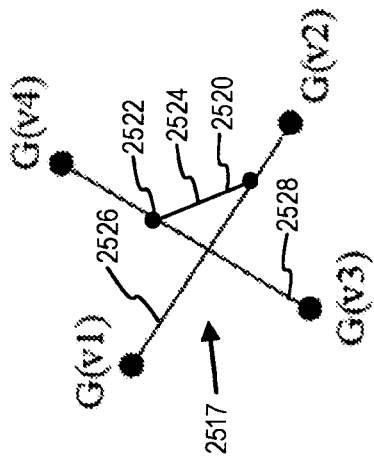
FIGS. 25A-25C depict an example diagrams of overlapping graphs, according to some embodiments.
Figure 25:
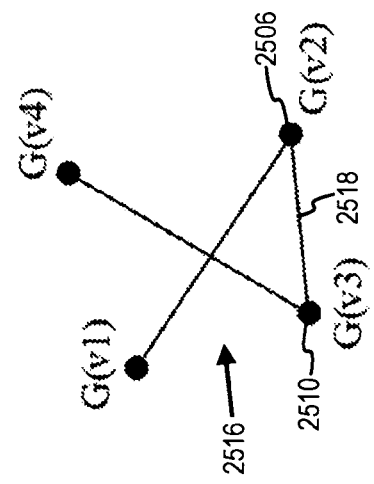
Figure 25:
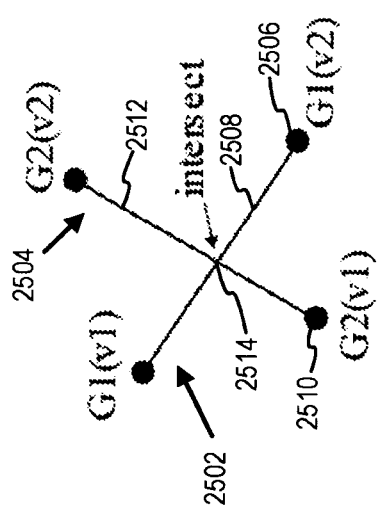

FIG. 24 depicts an example diagram of overlapping seismic data sets, according to some embodiments. In some instances, a plurality of seismic data sets across a given region may be collected over time. The plurality of seismic data sets across the given region may overlap. For example, an overlapping space (such as area 2432) may refer to a space in which traces for both the first and second seismic data sets reside. A region may include n number of seismic data sets. For example, the n number of seismic data sets may include 2D seismic data sets, 3D seismic data sets, and a combination of 2D and 3D seismic data sets. Region 2400 depicts, in a two-dimensional plane, multiple seismic datasets. 2D seismic datasets may be represented as lines, such as 2D seismic data set 2402 and 2D seismic data set 2404. 3D seismic data sets may be represented by rectangles, such as 3D seismic data set 2420 and 3D seismic data set 2422, or other polygons. Overlapping of two or more seismic data sets may occur when 2D and/or 3D seismic data sets occupy an overlapping space in the region 2400. For example, 2D seismic data set 2402 and 2D seismic data set 2404 overlap at point 2430. As another example, 3D seismic data set 2420, 3D seismic data set 2422, 2D seismic data set L7, and 2D seismic data set L8 overlap at area 2432.

FIGS. 25A-25C depict an example diagrams of overlapping graphs, according to some embodiments. FIG. 25A depicts a graph 2502 representing a 2D seismic data set and a graph 2504 representing a 2D seismic data set. Two vertices linked by an edge 2508 form graph 2502. Two vertices linked by an edge 2512 form a graph 2504. The graph 2502 and graph 2504 intersect where the edges 2508 and 2512 overlap at an intersection point 2514. The vertex 2506 is the closest vertex, of all vertices in graph 2502, to the intersection point 2514. Similarly, the vertex 2510 is the closest vertex, of all vertices in graph 2504, to the intersection point 2514. To combine overlapping graphs 2502 and 2504, the respective vertices from the overlapping edges that are closest to the intersection point 2514 may be connected with a new edge. FIG. 25B depicts a combined graph 2516. A connecting edge 2518 links vertices 2510 and 2506 to form combined graph 2516 such that the combined graph 2516 represents a composite seismic data set. The seismic data processor of seismic data system 2006 may perform this operation to integrate multiple seismic data sets and form a composite seismic data set. In some implementations, the graphs 2502 and 2504 may comprise down sampled seismic data sets such that the graphs 2502 and 2504 may include sparse edges and may not correspond to a particular seismic resolution. An edge may be considered sparse if vertices exist between the two vertices at the ends of the edge (i.e., there may be additional traces that may be added to the graph as vertices). These vertices positioned along the edge may have been omitted during down sampling of the seismic data set (such as down sampling described in FIG. 22A-22C) or a subset of traces may have been selected from the data set to define the vertices and linked via edges to from the graph. For example, FIG. 25C depicts a combined graph 2517 formed by two sparse edges 2526 and 2528. Vertex 2520 may have been omitted during the down sampling process. Likewise, vertex 2522 may have been omitted during the down sampling process. In some implementations, if an intersection point is identified between sparse edges, then the connecting edge should connect the vertices from each respective seismic data set that are closest to the intersection point, even if the vertices have been omitted during down sampling and are not initially plotted on the graph. For example, edge 2526 and edge 2528 may be considered sparse since vertices 2520, 2522 exist between the end vertices of edge 2526 and edge 2528, respectively. Since vertices 2520, 2522 are closest to the intersection point, the vertices 2520, 2522 may be added to each respective graph and connecting edge 2524 may be formed between vertices 2520, 2522 to form the combined graph 2517. In some instances, original edges may be modified in order to consider the new vertices.

In some implementations, at least one connecting edge may be added between graphs comprising overlapping 2D seismic data sets. One or more connecting edges may be formed when 3D seismic data sets and a combination of 2D and 3D seismic data sets overlap, such as the overlapping of area 2332 depicted in FIG. 23. In some instances, with overlapping 3D seismic data sets, a subset of vertices along inlines and crosslines of the seismic data sets may be analyzed for overlap and connecting edges. In some instances, an edge can connect the two vertices from different graphs that may be located at the same location in the subsurface formation.

Figure 26:
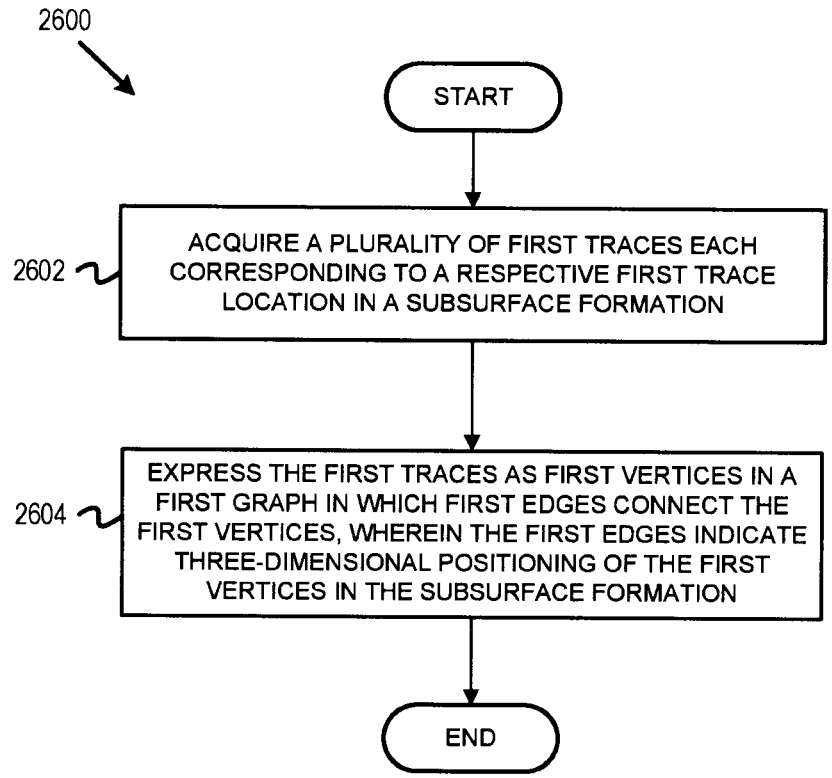
FIG. 26 depicts a flowchart of example operations to express a seismic data set in graph format, according to some embodiments.

FIG. 26 depicts a flowchart of example operations to express a seismic data set in graph format, according to some embodiments. FIG. 26 relates to a seismic data system configured to express seismic data sets in a graph format. Operations of flowchart 2600 of FIG. 26 are described in reference to the seismic data system 2006 of FIG. 20. Operations of the flowchart 2600 start at block 2602.

At block 2602, the seismic data system acquires a plurality of traces each corresponding to a respective trace location in a subsurface formation.

At block 2604, the seismic data system expresses the traces as vertices in a graph in which edges connect the vertices, wherein the first edges indicate three-dimensional positioning of the first vertices in the subsurface formation.

Figure 27:
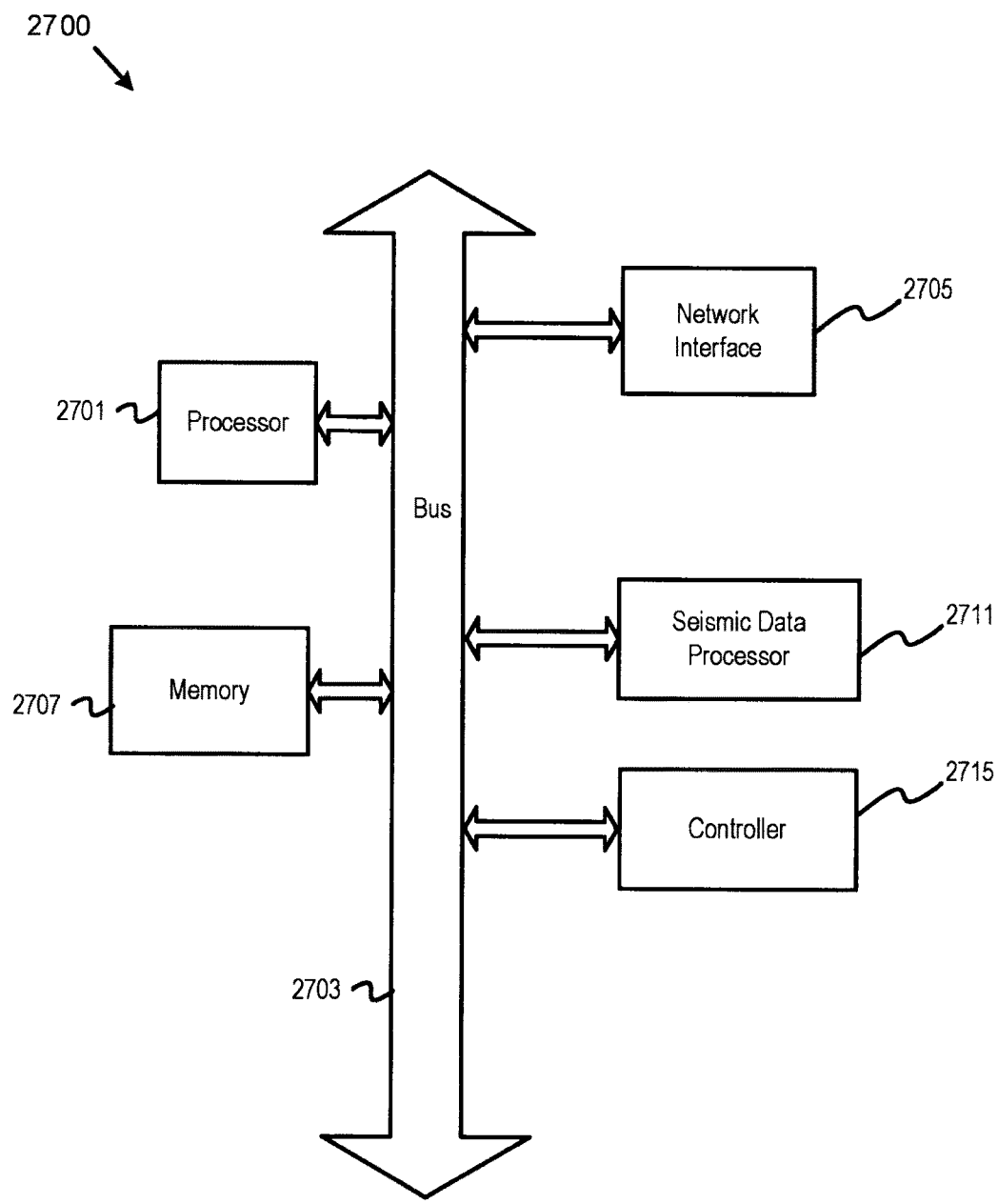
FIG. 27 depicts an example computer, according to some embodiments.

FIG. 27 depicts an example computer, according to some embodiments. FIG. 27 depicts a computer 2700 that includes a processor 2701 (possibly including multiple processors, multiple cores, multiple nodes, and/or implementing multi-threading, etc.). The computer 2700 includes a memory 2707. The memory 2707 may be system memory or any one or more of the above already described possible realizations of machine-readable media. The computer 2700 also includes a bus 2703 and a network interface 2705.

The computer 2700 also includes a signal processor 2711 and a controller 2715. The signal processor 2711 and the controller 2715 can perform one or more of the operations described herein. For example, the seismic data processor 2711 may convert seismic data sets to a graph format. The seismic data processor 2711 may also identify an intersection point of two or more overlapping graphs and combine the two or more overlapping graphs to form a composite seismic data set. The controller 2715 can perform various control operations to a subsurface operation based on the output from the seismic data processor 2711. For example, the controller 2715 can adjust the placement of a wellbore in a subsurface formation or modify drilling operations based on horizon identification with seismic data sets in graph format.

Any one of the previously described functionalities may be partially (or entirely) implemented in hardware and/or on the processor 2701. For example, the functionality may be implemented with an application specific integrated circuit, in logic implemented in the processor 2701, in a co-processor on a peripheral device or card, etc. Further, realizations may include fewer or additional components not illustrated in FIG. 27 (e.g., video cards, audio cards, additional network interfaces, peripheral devices, etc.). The processor 2701 and the network interface 2705 are coupled to the bus 2703. Although illustrated as being coupled to the bus 2703, the memory 2707 may be coupled to the processor 2701.

While the aspects of the disclosure are described with reference to various implementations and exploitations, it will be understood that these aspects are illustrative and that the scope of the claims is not limited to them. In general, expressing a seismic data set in graph format and combining multiple graphs as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

This description includes example systems, methods, techniques, and program flows that embody embodiments of the disclosure. However, this disclosure may be practiced without these specific details. For instance, this disclosure refers to predicting the phase flow rates based on the power spectral density of acoustic signals in the frequency domain. Embodiments of this disclosure may also be used to predict the phase flow rates based on other transformations of the acoustic signals. In other instances, well-known instruction instances, protocols, structures, and techniques have not been shown in detail in order not to obfuscate the description. In some embodiments, the graph may replace the grids representing seismic data sets for mapping seismic horizons using seismic data. For example, a graph may replace the sparse global grid, the local grids, etc. To further illustrate, the diagram 600 of the sparse global grid of FIG. 6 was previously used in the first operation to solve for a horizon efficiently at the course resolution. Each of the graph edges described above may be equivalent to tracker vector 751 of FIG. 7A and the sparse attributes such as dip may be calculated on the edge in the same way (as shown in FIG. 7B). Similar to operations described in the operations mapping seismic horizons using seismic data, these sparse attributes may be pre-computed for all possible depths so that the relevant attribute term for each edge may become a look up at each iteration of the optimization dependent on the depth of the vertices which may represent points on the horizon surface.

Each edge may then represent a single equation (e.g., Equation 22) where the edge $e_i = \{v_j, v_k\}$ is the relative difference between adjacent vertices in the graph, to describe Equation 23:

$$w_i(v_k - v_j) = w_i d_i \quad (23)$$

Equation 23 is equivalent to rearranging Equation 3, the only difference is that Equation 3 does not contain the weighting term.

Additional Example Embodiments

Embodiment #1: A method for processing seismic data by a seismic data system, comprising: acquiring a plurality of first traces each corresponding to a respective first trace location; and expressing the first traces as first vertices in a first graph in which first edges connect the first vertices, wherein the first edges indicate positioning of the first vertices.

Embodiment #2: The method of Embodiment #1 further comprising: locating a horizon surface based on the first graph; and perform a subsurface operation based the location of the horizon surface.

Embodiment #3: The method of Embodiments #1 or #2, wherein the each of the first vertices is associated with an attribute indicating a three-dimensional position in a subsurface formation, wherein the three-dimensional position has an X coordinate, Y coordinate, and Z coordinate.

Embodiment #4: The method of any one or more of Embodiments #1-3 further comprising: acquiring a plurality of second traces each corresponding to a respective second trace location; and expressing the second traces as second vertices in a second graph in which second edges connect the second vertices, wherein the second edges indicate positioning of the second vertices; wherein the first traces correspond to a first seismic data set and the second traces correspond to a second seismic data set; and combining the first graph with the second graph to form a third graph including the first seismic data set and the second seismic data set, the third graph representing a composite seismic data set.

Embodiment #5: The method of Embodiment #4 wherein the combining includes: identifying an intersection point formed by one of the first edges intersecting one of the second edges; and connecting one of the first vertices to one of the second vertices with a connecting edge, wherein the one of the first vertices is closer to the intersection point than all other first vertices, and wherein the one of the second vertices is closer to the intersection point than all other second vertices.

Embodiment #6: The method of Embodiment #4 wherein the combining includes: determining that one of the first vertices and one of the second vertices occupy a location in the subsurface formation; connecting the one of the first vertices to the one of the second vertices with a connecting edge.

Embodiment #7: The method of Embodiment #4 further comprising: reducing a number of first traces to include fewer first traces before expressing the first traces as first vertices in the first graph. The method of claim 1, wherein the first graph has non-rectilinear shape form.

Embodiment #8: The method of any one or more of Embodiments #1-7, wherein the first graph has non-rectilinear shape form.

Embodiment #9: A non-transitory computer-readable medium including computer-executable instructions comprising: instruction to acquiring a plurality of first traces each corresponding to a respective first trace location; and instructions to express the first traces as first vertices in a first graph in which first edges connect the first vertices, wherein the first edges indicate positioning of the first vertices.

Embodiment #10: The non-transitory computer-readable medium of Embodiment #9 further comprising: instructions to locate a horizon surface based on the first graph; and perform a subsurface operation based the location of the horizon surface.

Embodiment #11: The non-transitory computer-readable medium of Embodiments #9 or #10, wherein the each of the first vertices is associated with an attribute indicating a three-dimensional position in a subsurface formation, wherein the three-dimensional position has an X coordinate, Y coordinate, and Z coordinate.

Embodiment #12: The non-transitory computer-readable medium of any one or more of Embodiments #9-11 further comprising: instruction to acquire a plurality of second traces each corresponding to a respective second trace location; and instructions to express the second traces as second vertices in a second graph in which second edges connect the second vertices, wherein the second edges indicate positioning of the second vertices; wherein the first traces correspond to a first seismic data set and the second traces correspond to a second seismic data set; and instructions to combine the first graph with the second graph to form a third graph including the first seismic data set and the second seismic data set, the third graph representing a composite seismic data set.

Embodiment #13: The non-transitory computer-readable medium of Embodiment #12 wherein the combining includes: instructions to identify an intersection point formed by one of the first edges intersecting one of the second edges; and instructions to connect one of the first vertices to one of the second vertices with a connecting edge, wherein the one of the first vertices is closer to the intersection point than all other first vertices, and wherein the one of the second vertices is closer to the intersection point than all other second vertices.

Embodiment #14: The non-transitory computer-readable medium of Embodiment #12 wherein the combining includes: instructions to determine that one of the first vertices and one of the second vertices occupy a location in the subsurface formation; instructions to connect the one of the first vertices to the one of the second vertices with a connecting edge.

Embodiment #15: The non-transitory computer-readable medium of Embodiment #12 further comprising: instructions to reduce a number of first traces to include fewer first traces before expressing the first traces as first vertices in the first graph.

Embodiment #16: The non-transitory computer-readable medium of any one or more of Embodiments #9-15, wherein the first graph has non-rectilinear shape form.

Embodiment #17: A system comprising: a processor; and a computer-readable medium having instructions stored thereon that are executable by the processor, the instructions including instruction to acquiring a plurality of first traces each corresponding to a respective first trace location; and instructions to express the first traces as first vertices in a first graph in which first edges connect the first vertices, wherein the first edges positioning of the first vertices.

Embodiment #18: The system of Embodiment #17, wherein the each of the first vertices is associated with an attribute indicating a three-dimensional position in a subsurface formation, wherein the three-dimensional position has an X coordinate, Y coordinate, and Z coordinate.

Embodiment #19: The system of Embodiments #17 or #18 further comprising: instructions to acquire a plurality of second traces each corresponding to a respective second trace location; and instructions to express the second traces as second vertices in a second graph in which second edges connect the second vertices, wherein the second edges indicate positioning of the second vertices; wherein the first traces correspond to a first seismic data set and the second traces correspond to a second seismic data set; and instructions to combine the first graph with the second graph to form a third graph including the first seismic data set and the second seismic data set, the third graph representing a composite seismic data set.

Embodiment #20: The system of Embodiment #19 wherein the combining includes: instructions to identify an intersection point formed by one of the first edges intersecting one of the second edges; and instructions to connect one of the first vertices to one of the second vertices with a connecting edge, wherein the one of the first vertices is closer to the intersection point than all other first vertices, and wherein the one of the second vertices is closer to the intersection point than all other second vertices.

The invention claimed is:

1. A method for processing seismic data by a seismic data system, comprising:
    acquiring a plurality of first traces each corresponding to a respective first trace location;
    expressing the first traces as first vertices in a first graph in which first edges connect the first vertices, wherein the first edges indicate positioning of the first vertices;
    generating a system of equations from the first graph, wherein each of the first edges represents an equation to solve and each of the first vertices represents a parameter to solve;
    solving the system of equations to identify a position of a horizon surface on the first vertices of the first graph; and
    performing a subsurface operation based on the horizon surface.

2. The method of claim 1, wherein the each of the first vertices is associated with an attribute indicating a three-dimensional position in a subsurface formation, wherein the three-dimensional position has an X coordinate, Y coordinate, and Z coordinate.

3. The method of claim 1 further comprising:
    acquiring a plurality of second traces each corresponding to a respective second trace location; and
    expressing the second traces as second vertices in a second graph in which second edges connect the second vertices, wherein the second edges indicate positioning of the second vertices;
    wherein the first traces correspond to a first seismic data set and the second traces correspond to a second seismic data set; and
    combining the first graph with the second graph to form a third graph including the first seismic data set and the second seismic data set, the third graph representing a composite seismic data set.

4. The method of claim 3 wherein the combining includes:
    identifying an intersection point formed by one of the first edges intersecting one of the second edges; and
    connecting one of the first vertices to one of the second vertices with a connecting edge, wherein the one of the first vertices is closer to the intersection point than all other first vertices, and wherein the one of the second vertices is closer to the intersection point than all other second vertices.

5. The method of claim 3 wherein the combining includes:
    determining that one of the first vertices and one of the second vertices occupy a location in a subsurface formation;
    connecting the one of the first vertices to the one of the second vertices with a connecting edge.

6. The method of claim 3 further comprising:
    reducing a number of first traces to include fewer first traces before expressing the first traces as first vertices in the first graph.

7. The method of claim 1, wherein the first graph has non-rectilinear shape form.

8. A non-transitory computer-readable medium including computer-executable instructions comprising:
    instruction to acquire a plurality of first traces each corresponding to a respective first trace location;
    instructions to express the first traces as first vertices in a first graph in which first edges connect the first vertices, wherein the first edges indicate positioning of the first vertices;
    instructions to generate a system of equations from the first graph, wherein each of the first edges represents an equation to solve and each of the first vertices represents a parameter to solve;
    instructions to solve the system of equations to identify a position of a horizon surface on the first vertices of the first graph; and
    instructions to perform a subsurface operation based on the horizon surface.

9. The non-transitory computer-readable medium of claim 8, wherein the each of the first vertices is associated with an attribute indicating a three-dimensional position in a subsurface formation, wherein the three-dimensional position has an X coordinate, Y coordinate, and Z coordinate.

10. The non-transitory computer-readable medium of claim 8 further comprising:
    instruction to acquire a plurality of second traces each corresponding to a respective second trace location; and
    instructions to express the second traces as second vertices in a second graph in which second edges connect the second vertices, wherein the second edges indicate positioning of the second vertices;
    wherein the first traces correspond to a first seismic data set and the second traces correspond to a second seismic data set; and
    instructions to combine the first graph with the second graph to form a third graph including the first seismic data set and the second seismic data set, the third graph representing a composite seismic data set.

11. The non-transitory computer-readable medium of claim 10 wherein the combining includes:
    instructions to identify an intersection point formed by one of the first edges intersecting one of the second edges; and
    instructions to connect one of the first vertices to one of the second vertices with a connecting edge, wherein the one of the first vertices is closer to the intersection point than all other first vertices, and wherein the one of the second vertices is closer to the intersection point than all other second vertices.

12. The non-transitory computer-readable medium of claim 10 wherein the combining includes:
    instructions to determine that one of the first vertices and one of the second vertices occupy a location in a subsurface formation;
    instructions to connect the one of the first vertices to the one of the second vertices with a connecting edge.

13. The non-transitory computer-readable medium of claim 10 further comprising:
    instructions to reduce a number of first traces to include fewer first traces before expressing the first traces as first vertices in the first graph.

14. The non-transitory computer-readable medium of claim 8, wherein the first graph has non-rectilinear shape form.

15. A system comprising:
    a processor; and
    a computer-readable medium having instructions stored thereon that are executable by the processor, the instructions including
        instruction to acquire a plurality of first traces each corresponding to a respective first trace location; and
        instructions to express the first traces as first vertices in a first graph in which first edges connect the first vertices, wherein the first edges positioning of the first vertices instructions to generate a system of equations from the first graph, wherein each of the first edges represents an equation to solve and each of the first vertices represents a parameter to solve;

instructions to solve the system of equations to identify a position of a horizon surface on the first vertices of the first graph; and instructions to perform a subsurface operation based on the horizon surface.

16. The system of claim 15, wherein the each of the first vertices is associated with an attribute indicating a three-dimensional position in a subsurface formation, wherein the three-dimensional position has an X coordinate, Y coordinate, and Z coordinate.

17. The system of claim 15 further comprising:

instructions to acquire a plurality of second traces each corresponding to a respective second trace location; and instructions to express the second traces as second vertices in a second graph in which second edges connect the second vertices, wherein the second edges indicate positioning of the second vertices;

wherein the first traces correspond to a first seismic data set and the second traces correspond to a second seismic data set; and instructions to combine the first graph with the second graph to form a third graph including the first seismic data set and the second seismic data set, the third graph representing a composite seismic data set.

18. The system of claim 17 wherein the combining includes:

instructions to identify an intersection point formed by one of the first edges intersecting one of the second edges; and instructions to connect one of the first vertices to one of the second vertices with a connecting edge, wherein the one of the first vertices is closer to the intersection point than all other first vertices, and wherein the one of the second vertices is closer to the intersection point than all other second vertices.

* * * * *